(12) United States Patent
Larsson et al.

(10) Patent No.: US 12,097,825 B2
(45) Date of Patent: Sep. 24, 2024

(54) LOAD CARRIER

(71) Applicant: Thule Sweden AB, Hillerstorp (SE)

(72) Inventors: Fredrik Larsson, Vaggeryd Jonkoping (SE); Tobias Jönsson, Varnamo (SE); Simon Helmersson, Varnamo (SE); Johan Larsson, Jonkoping (SE); Henrik Alm, Vederslov (SE); Stig-Johan Larsson, Ljungby (SE); Sachin Rawool, Hillerstorp (SE); Alexander Fritjofsson, Jonkoping (SE)

(73) Assignee: Thule Sweden AB, Hillerstorp (SE)

( * ) Notice: Subject to any disclaimer, the term of this patent is extended or adjusted under 35 U.S.C. 154(b) by 320 days.

(21) Appl. No.: 17/615,742

(22) PCT Filed: Jun. 10, 2020

(86) PCT No.: PCT/EP2020/066106
§ 371 (c)(1),
(2) Date: Dec. 1, 2021

(87) PCT Pub. No.: WO2020/254170
PCT Pub. Date: Dec. 24, 2020

(65) Prior Publication Data
US 2022/0242331 A1 Aug. 4, 2022

(30) Foreign Application Priority Data
Jun. 19, 2019 (EP) ..................... 19181348

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .............. B60R 9/10; B60R 9/06; B60R 9/048
See application file for complete search history.

(56) References Cited

U.S. PATENT DOCUMENTS 6,422,443 B1 * 7/2002 Erickson ................... B60R 9/10
224/532
9,649,987 B2 * 5/2017 Prescott ................... B60R 9/06
(Continued)

FOREIGN PATENT DOCUMENTS

CN          2686938 Y    3/2005
DE   10 2007 035 135 B3  2/2009
(Continued)

OTHER PUBLICATIONS

International Search Report of the International Searching Authority in International Application No. EP2020/066106, mailed Jul. 27, 2020 (3 pages).

*Primary Examiner* — Brian D Nash
(74) *Attorney, Agent, or Firm* — Sterne, Kessler, Goldstein & Fox P.L.L.C.

(57) ABSTRACT

The present disclosure relates to improvements in load carriers mountable on the rear of a vehicle. Furthermore, the present disclosure relates to load carriers having a load support arrangement which may be moved between a use position and a non-use position. The present disclosure also relates to configurations of a base frame for a load carrier, a tightening mechanism for mounting a load carrier on a vehicle, an arrangement for mounting a load support arrangement on a non-round cross beam of a load carrier, an attachment device for coupling a force transfer member to a mounting portion on the vehicle, a specific configuration of a coupling mechanism for supporting a vehicle coupling portion of a load carrier on a vehicle, and a spacer for guiding a force transfer member around damageable parts of a vehicle such as a spoiler.

27 Claims, 33 Drawing Sheets

(56) References Cited

U.S. PATENT DOCUMENTS

| | | | |
|---|---|---|---|
| 9,776,575 B1* | 10/2017 | Liu | B60R 9/06 |
| 9,815,415 B2* | 11/2017 | Condon | B60R 9/06 |
| 2002/0096546 A1* | 7/2002 | Bogoslofski | B60R 9/10 |
| | | | 224/500 |
| 2010/0127031 A1* | 5/2010 | Sautter | B60R 9/06 |
| | | | 224/500 |
| 2011/0068138 A1 | 3/2011 | Flaherty et al. | |
| 2012/0234883 A1* | 9/2012 | Sautter | B60R 9/10 |
| | | | 224/502 |
| 2012/0298707 A1* | 11/2012 | Sautter | B60R 9/10 |
| | | | 224/510 |
| 2013/0105534 A1* | 5/2013 | Farber | B60R 9/10 |
| | | | 224/314 |
| 2014/0125045 A1* | 5/2014 | Nusbaum | B60R 9/10 |
| | | | 280/769 |
| 2016/0185304 A1 | 6/2016 | Pedrini | |
| 2019/0084492 A1* | 3/2019 | Bowles | B60R 9/10 |
| 2020/0307465 A1* | 10/2020 | Williams | B60R 9/10 |

FOREIGN PATENT DOCUMENTS

| | | |
|---|---|---|
| WO | 03/080395 A1 | 10/2003 |
| WO | 2004/039635 A2 | 5/2004 |

* cited by examiner

LOAD CARRIER

TECHNICAL FIELD

The present disclosure relates to load carriers mountable on the rear of a vehicle. In particular, the present disclosure relates to load carriers mountable on a trunk lid of a vehicle. Furthermore, the present disclosure relates to load carriers having a load support arrangement which may be moved between a use position and a non-use position. The present disclosure also relates to configurations of a base frame for a load carrier, a tightening mechanism for mounting a load carrier on a vehicle, an arrangement for mounting a load support arrangement on a non-round cross beam of a load carrier, an attachment device for coupling a force transfer member to a mounting portion on the vehicle, a specific configuration of a coupling mechanism for supporting a vehicle coupling portion of a load carrier on a vehicle, a spacer for guiding a force transfer member around damageable parts of a vehicle such as a spoiler, an anti-sway device for fixing bikes on hanging type bike carriers and to specific types of vehicle supports for supporting a load carrier on a vehicle.

BACKGROUND OF THE INVENTION

Load carriers of the type mountable to the rear of a vehicle are known in the art. Besides load carriers which are mounted on trailer couplings of a vehicle, load carriers of the type mountable directly on the rear of a vehicle, in particular on the car body of the vehicle, are known. Such load carriers have the benefit that they may be used on vehicles without requiring a trailer coupling on the vehicle. Accordingly, such load carriers are a cost-efficient alternative to load carriers requiring a trailer coupling on the vehicle.

SUMMARY

The mounting of load carriers mountable directly on the rear of a vehicle is often a cumbersome task for the user. Furthermore, such load carriers have to be securely mountable on the rear of the vehicle in order to fulfil the latest security requirements. At the same time, it is necessary to provide low weight constructions and aerodynamic constructions to minimize an increase of fuel consumption due to a mounted load carrier.

A further important aspect is that such load carriers may be compactly folded in a stowage configuration for storage purposes.

It is the object of the invention to provide enhanced features and aspects for load carriers which at least partially overcome the drawbacks of the known prior art and provide the above beneficial features as well as load carriers comprising one or more of such enhanced features and configurations.

The object is solved by a load carrier according to claim 1 as well as by load carriers and different specific configurations for load carriers as described in the following summary and detailed description of embodiments and modifications. Advantageous further formations are subject of the dependent claims and are further set out in the following summary and the detailed description of embodiments and modifications.

According to a first aspect, a load carrier mountable on the rear of a vehicle is provided. Preferably, the load carrier is configured to be directly mounted on a car body of a vehicle, for example on a trunk lid or rear door of the vehicle. The load carrier may comprise a base frame having a cross beam and at least one lower vehicle support portion. The lower vehicle support portion may be coupled to the cross beam at first end portion and may be supportable on the vehicle at a vehicle coupling portion thereof. Accordingly, the lower vehicle support portion may serve for supporting the cross beam against the vehicle. Preferably, the vehicle coupling portion is a lowermost portion of the load carrier when the load carrier is mounted on the rear of the vehicle. In particular, the vehicle coupling portion may be configured to support the load carrier on a lower edge region of a trunk lid of the vehicle. For example, the vehicle coupling portion may be configured to encompass or clasp a lower edge region of a trunk lid.

The at least one lower vehicle support portion can be coupled to the cross beam at the first end portion of the at least one lower vehicle support portion. For example, the lower vehicle support portion can be non-translatory movably coupled to the cross beam. Accordingly, a translatory adjustment of the position of the cross beam relative to the lower vehicle support portion is impossible. However, the lower vehicle support portion may be rotatably coupled to the cross beam in order to allow a rotation of the cross beam relative to the first end portion of the lower vehicle support portion. Preferably, the at least one lower vehicle support portion is fixedly coupled to the cross beam at the first end portion. In such a configuration, the cross beam is completely immovably fixed to the at least one lower vehicle support portion. In this way, the cross beam and the lower vehicle support portion form an integral unit.

The lower vehicle support portion may comprise an adjustment mechanism for adjusting a distance between the first end portion and the vehicle coupling portion. Accordingly, a distance between the first end portion and the vehicle coupling portion may be changed. Thus, a position of the cross beam relative to the portion of the vehicle were the vehicle coupling portion is supported on the vehicle may be changed. In this way, a load carrier having a base frame which is easily configurable according to different vehicle types or car body shapes is achieved. For example, an adjustment of the vertical position of the load carrier relative to the vehicle can be changed in order to not block the number plate and/or a rear window of a vehicle.

The lower vehicle support portion may be configured as a leg for supporting the cross beam on the vehicle. Preferably, the load carrier comprises two lower vehicle support portions arranged at a distance with respect to each other on the cross beam. Preferably, each lower vehicle support portion is coupled to an end portion of the cross beam. Each lower vehicle support portion may be configured as an elongated unit extending preferably in a substantially straight manner. Each lower vehicle support portion may comprise substantially elongated frame members coupled to each other. Each frame member can be made from extruded aluminum. Accordingly, a configuration may be provided in which the cross beam and two lower vehicle support portions form a U-shape.

Preferably, the at least one lower vehicle support portion is length adjustable, preferably telescopable.

As already mentioned above, each lower vehicle support portion can comprise two or more frame members. One frame member may define an upper portion of the lower vehicle support portion and another frame member may define a lower portion of the lower vehicle support portion.

Preferably, the lower vehicle support portion comprises an upper portion and a lower portion, preferably defined by the above-mentioned frame members. The lower portion may be translatory movable along a main extension direction of the upper portion.

Accordingly, the lower portion and the upper portion may be coupled to each other allowing a translatory movement of the lower portion along the main extension direction of the upper portion. Thus, the lower portion may be translatory moved with respect to the upper portion so that the vehicle coupling portion provided on the lower portion is movable with respect to the first end portion provided on the upper portion. In this way, the distance between the first end portion and the vehicle coupling portion may be changed by translatory moving the lower portion with respect to the upper portion.

Preferably, one of the lower portion and the upper portion is at least partially accommodatable in the other one of the upper portion and the lower portion. In a preferable configuration, the upper portion comprises a dimension allowing to at least partially and slidably accommodate the lower portion within the upper portion.

The lower vehicle support portion may comprise a pretensioning mechanism urging the vehicle coupling portion to move in such a manner that the distance between the first end portion and the vehicle coupling portion is reduced. In other words, the pretensioning mechanism may render the lower vehicle support portion self-retractable so that the distance between the first end portion and the vehicle coupling portion may be enlarged only against an urging force generated by said pretensioning mechanism. The pretensioning mechanism may comprise an urging member, for example a spring. According to an embodiment, the urging member operatively couples the lower portion of the lower vehicle support portion to the upper portion of the lower vehicle support portion. The pretensioning mechanism may be provided as an independent mechanism, in particular independent from other mechanisms like a tightening mechanism that is also described in the present disclosure. In particular, the pretensioning mechanism may comprise elements that are not shared with other mechanisms or form part of other mechanisms as described herein.

According to a further preferred embodiment, the adjustment mechanism comprises a locking mechanism for releasably arresting the position of the vehicle coupling portion relative to the position of the first end portion of a lower vehicle support portion. In this way, the distance between the first end portion and the vehicle coupling portion may in a first step be adjusted to the dimension of the vehicle and then be arrested by the help of the locking mechanism.

Preferably, the locking mechanism is configured to lock a movement of the vehicle coupling portion relative to the first end portion by means of positive locking. Positive locking, also referred to as a form fit locking, is a preferable way of securing a position of the vehicle coupling portion relative to the first end portion in order to prevent any movement between those portions relative to each other. However, a non-positive locking, also referred to as friction fit locking, may be used instead. A positive locking may be provided by engaging the above described lower portion with the above described upper portion of the at least one lower vehicle support portion.

According to a preferred embodiment, the locking mechanism comprises an engaging member movably coupled to the upper portion and an engagement section fixedly provided on the lower portion. Preferably, the engaging member comprises a toothed locking plate. In a preferable configuration, the engagement section comprises a toothed section which is matingly contactable with the toothed locking plate. In this way, a reliable configuration for achieving an engagement between the engaging member and the engagement section for blocking a movement of the vehicle coupling portion relative to the first end portion is achieved.

According to a further preferred embodiment, the engaging member is rotatably coupled to the upper portion.

According to a further preferred embodiment, the engaging member is translatory coupled to the upper portion.

According to a further preferred embodiment, the locking mechanism comprises a pivotable operating member, preferably pivotable about a pivot axis extending parallel with, diagonal or transversal to an extension direction of the lower vehicle support portions, or a translatable operating member operatively coupled to the engaging member. As a pivotable operating member, a lever pivotably held on the upper portion may be provided. As a translatable operating member, a sleeve like member encompassing the upper portion and slidably movable along the upper portion may be used.

According to a further preferred embodiment, the load carrier may in addition or alternatively further comprise an upper vehicle support portion for supporting the base frame on the vehicle at a position above the coupling portion, wherein the upper vehicle support portion is preferably fixedly coupled to the cross beam and/or fixedly coupled to one of the at least one lower vehicle coupling portions. In addition or alternatively the upper vehicle support portion may be provided pivotable with respect to the cross beam and/or the lower vehicle support portion or may be fixed to the cross beam or to the lower vehicle support portion at a specific angle. In addition or alternatively a length of the upper vehicle support portion is shorter than a length of the lower vehicle support portion. In addition or alternatively the upper vehicle support portion is inclined with respect to a vertical plane when the load carrier is mounted on the vehicle at an inclination which is greater than an inclination of a lower vehicle support portion.

The upper vehicle support portion, the lower vehicle support portion and the cross beam may be coupled to each other by means of a connecting member. The connecting member may be integrally formed from a plastics material and may in particular comprise an accommodating section for accommodating an upper portion of the lower vehicle support portion, for example the above mentioned first end portion, and an accommodating section for accommodating and end portion of the cross beam. The upper portion of the lower vehicle support portion and the cross beam may be fixed to the connecting member by means of positive locking, in particular by means of a screw or by means of a rivet. A releasable latching connection is also possible. Such a connection may comprise a latching member which engages with a corresponding counter portion on the connecting member as soon as the element to be fixed, i.e. the cross beam or the upper portion of the lower vehicle support portion, is correctly inserted in the respective opening. The upper vehicle support portion may be attached to the connecting member, for example by screwing or with another one of the latter mentioned fixation options. At least a portion of the upper vehicle support portion may be integrally formed with the connecting member. The upper vehicle support portion and the lower vehicle support portion may be formed at least partially from different materials.

The connecting member may be formed such that the lower vehicle support portion and the upper vehicle support portion may extend from the same at an angle smaller than 180 degrees, for example at an angle which is smaller than 90 degrees and is preferably about 30 degrees. If such angle is smaller than 90 degrees, a configuration may be achieved in which the connecting member forms the uppermost portion of the base frame. The upper vehicle support portion and the lower vehicle support portion may comprise a curvature which is provided in only one direction. In other words, the upper vehicle support portion and the lower vehicle support portion may extend following a curved path which may be circular. The radius of the such circular path may be greater than one meter. A configuration may be provided in which the upper vehicle support portion and the lower vehicle support portion are curved towards each other. According to an embodiment, one of the upper vehicle support portion and the lower vehicle support portion may be formed straight.

With the possibilities as described above and as can be further gleaned from the following further aspects, embodiments and modifications as described herein and exemplary shown in the drawings, a configuration may be achieved in which the cross beam is provided as a hub or center portion from which the upper vehicle support portion, the lower vehicle support portion, a support arrangement for supporting loads to be transported, preferably bikes, an optional support device, and one or more attachment devices coupled to a tightening mechanism protrude in respective use directions. In particular, the configuration may be such that end portions of the respective latter members are coupled to each other in the region of the cross bar when the load carrier is viewed from the side so that those members are substantially only provided on one side of the cross beam.

According to a further preferable embodiment, the upper vehicle support may be configured as a balancing upper vehicle support or as a fixed upper vehicle support. The balancing upper vehicle support can be configured to automatically adapt to a contact portion on a vehicle on which the balancing upper vehicle support is to be supported. The fixed upper vehicle support can be manually adjusted to the contact portion of the vehicle.

The balancing upper vehicle support may comprise a contact member, preferably a support pad, pivotably held movably about two pivot axes. The pivot axes may extend skew to each other, preferably substantially perpendicular to each other. In addition or alternatively the balancing vehicle support may comprise a first support member pivotably arranged about a pivot pin and a second support member pivotably arranged on the first support member about a pivot pin. In addition or alternatively the second support member may be configured to support the contact member wherein preferably the contact member may comprise an engaging portion configured to be engaged with an accommodating recess provided in the second support member.

The fixed upper vehicle support may comprise a mounting portion configured to non-rotatably receive a contact member. The mounting portion may be configured to slidably receive the contact member with a specific orientation with respect to an extension direction of the fixed upper vehicle support, preferably with respect to an extension direction of a frame member being coupled to the cross beam at one end portion and comprising the mounting portion at an opposite end portion. The mounting portion may preferably comprise a splined portion engageable with a splined portion of the contact member in an extension direction of splines. In addition or alternatively the mounting portion comprises a concave shape with splines arranged in parallel to each other along a curved path. The contact member may be configured as a two-part contact member comprising a first contact member and a second contact member. Each of the first contact member and the second contact member may comprise an abutment portion and an engaging portion. Each engaging portion may comprise splined disk segments spaced from each other such that the engaging portions are nestable into each other at different angles to form a common engaging portion insertable into the mounting portion.

According to a further preferred embodiment, the load carrier further comprises a load support arrangement for supporting goods to be transported wherein the load support arrangement may be coupled to the cross beam. The load support arrangement may be configured as a bike support arrangement. Accordingly, the load carrier may be a bike carrier. Different support arrangements for supporting bikes on the load carrier are available. For example, the load support arrangement may comprise a wheel support for supporting wheels of the bike thereon. Instead of wheel support, the load support arrangement may comprise a supporting portion allowing to support a bike in a hanging manner. For example, the supporting portion may comprise limbs for supporting sections of the frame of a bike. In addition or alternatively the cross beam may comprise a non-round cross section at least in a mounting portion thereof at which the load support arrangement is coupled to the cross beam. Preferably the cross section in the mounting portion is asymmetric. More details as to a possible shape and configuration of the non-round cross beam can be found in other aspects, embodiments and modifications of this disclosure and may be used and combined with this and other configurations. The same applies for specific features and arrangements allowing to mount the load support arrangement on such non-round cross beam.

According to a further preferable embodiment, the load carrier may further comprise an attachment device and/or a tightening mechanism for retracting a force transfer member of the attachment device. The tightening mechanism may be configured to retract the force transfer member into an elongate base frame member or base frame element, preferably into the cross beam of the base frame. This may preferably be done in a manner that the force transfer member is at least partially pulled in an extension direction of the elongate base frame member of said base frame. Accordingly, a pulling force may act in an extension direction of the elongate base frame member.

If the load carrier comprises a tightening mechanism for retracting a force transfer member of the attachment device as described herein, and a locking mechanism as described herein, both mechanisms may be configured as independent mechanisms. In other words, both mechanisms may be operated independently from each other. Accordingly, locking and tightening may be carried out as separate steps. In particular, according to an embodiment, operating the locking mechanism does not provide any tightening of the load carrier at all.

The connecting member may comprise an opening for receiving the force transfer member of the attachment device. The opening may be configured to guide the force transfer member into an interior space of the connecting member. The connecting member can be configured such that the opening is located in an upper end portion of the connecting member, for example, when the load carrier is mounted on a vehicle, at a position above the cross beam, preferably vertically above the cross beam. With such a configuration, when the force transfer member is tightened, a force is applied on said connecting member in the region of the opening so that said connecting member receives the tightening force. The connecting member may thus push the upper vehicle support portion in an extension direction of the upper vehicle support portion thereby reducing bending forces acting on the upper vehicle support.

If the connecting member and at least a portion of the upper vehicle support are integrally formed, the portion of the upper vehicle support can be partially formed as a U-shaped portion in cross section with an open end facing downwards towards the vehicle mounting portion. In the interior space defined by the U-shaped portion, reinforcing ribs may be provided. Accordingly, when viewing the load carrier, in particular the upper vehicle support from below, the reinforcing ribs may be visible. In this way, a lightweight but stiff structure may be achieved. Preferably, the at least one reinforcing rib, preferably two or more reinforcing ribs extend in extension direction of the upper vehicle support. Thus, if the force application portion is configured as described before and in particular such that the tightening force is applied on the connecting member, preferably at a position above the cross beam, such reinforcing ribs extend in force transfer direction of the upper vehicle portion and are able to transfer a pushing force along the upper vehicle support.

According to a further preferable embodiment, the lower vehicle support portion is non-translatory movably coupled to the cross beam and preferably non-rotatably movably coupled to the cross beam.

According to an embodiment, the lower vehicle support portion may comprise a base frame as described before comprising the pretensioning mechanism as described before as well as a tightening mechanism as described herein. With such a configuration, the load carrier can be mounted to a vehicle with an operation of the locking mechanism being the last step. Thus, contrary to other constructions, a pre-locking of the movement of the vehicle mounting portion with respect to the first end portion, for example locking a movement of the lower portion with respect to the upper portion, before tightening by means of the tightening mechanism is not carried out. The vehicle mounting portion thus remains movable with respect to the first end portion during tightening the load carrier by means of the tightening mechanism. More precisely, in a first step, the vehicle mounting portion may be coupled to the vehicle and the upper part of the base frame may be pulled upwards such that the above-described extendible, preferably telescopic, lower vehicle support portions or lower vehicle supports extend and allow an upper vehicle support portion to be arranged on a suitable surface of the vehicle. After that, the attachment device as described herein may be coupled to the vehicle and the tightening mechanism may be operated for tightening the attachment device, in particular a force transfer member thereof. During tightening, the vehicle coupling portion remains movable with respect to the first end portion. After the attachment device is tightened, the locking mechanism is operated to lock any movement of the vehicle mounting portion relative to the first end portion of the lower vehicle support. This provides a more dynamic and easier to mount arrangement as a user may not set the length of the lower vehicle support portions before mounting the load carrier.

The load carrier may be particularly suitable for being mounted to a sedan type vehicle as well as to a hatch-back type vehicle if the upper vehicle support portion and the lower vehicle support portion are arranged at a fixed angle. In this connection, the upper vehicle support may be configured to be adapted to the corner or edge of a trunk lid. Thus, the upper vehicle support may be configured to be supported against a strong supporting part of the vehicle. It may be specifically designed to accommodate the corner or edge of the trunk lid so that a movement of the upper vehicle support portion along the trunk lid is prevented. This difference is beneficial in that during tightening, the upper vehicle support portion remains at a predetermined position on the trunk lid and does not move along the trunk thereby reducing the risk of damaging the trunk lid contrary to know scissor-style arrangement in which the upper vehicle support is pivotable with respect to the lower vehicle support portion and tightening is effected by folding the upper vehicle support portion towards the lower vehicle support portion.

According to a second aspect, a load carrier mountable on the rear of the vehicle is provided. The load carrier may be configured according to the below first configuration as mentioned in the detailed description in itemized structure and/or may additionally or alternatively be configured as described in the following.

The load carrier may comprise a base frame having a cross beam and at least one lower vehicle support portion for supporting the load carrier on the vehicle. As described above with respect to the first aspect, the lower vehicle support portion may be configured to support the load carrier on a portion of a car body of the vehicle, in particular on the trunk lid of the vehicle. Preferably, the load carrier comprises two lower vehicle support portions. Each support portion can be configured as described above with respect to the first aspect.

The load carrier may further comprise an attachment portion and a coupling portion engageable with different engaging sections on the rear of the vehicle. As described before, the coupling portion may be a portion of the lower vehicle support portion, i.e. may be the vehicle coupling portion as described before. Preferably, the attachment portion and the coupling portion are engageable with different engaging sections on a trunk lid of the vehicle. For example, the coupling portion may be engageable with a lower edge region of the trunk lid of the vehicle and the attachment portion can be engageable with an upper edge portion of the trunk lid of the vehicle. In this way, the load carrier may be clamped by the attachment portion and the coupling portion.

At least the attachment portion may be retractable, for instance for tightening the load carrier on the rear of the vehicle. Accordingly, the attachment portion can be retractable while coupling portion may be non-retractable. Furthermore, it is possible to provide a configuration in which the attachment portion and the coupling portion are both retractable for tightening the load carrier. For example, a configuration may be provided in which the vehicle coupling portion and the attachment portion are tightenable by way of one and the same mechanism.

The load carrier may comprise a tightening mechanism for retracting the at least one of the attachment portion and the coupling portion. The tightening mechanism may comprise a force transfer member operatively coupled to the at least one of the attachment portion and the coupling portion. The force transfer member preferably comprises a flexible elongated member. For example, the flexible elongated member can be a wire or a strap. The force transfer member can be coupled to at least one attachment portion.

The tightening mechanism is further configured to pull the force transfer member into an elongated portion of the load carrier at least partially along a longitudinal extension direction of said elongated portion of the load carrier. An elongated portion, for example and elongate base frame member or base frame element, of the load carrier may be a lower vehicle support portion or the cross beam of the load carrier. Accordingly, a portion of the force transfer member may be accommodated within the cross beam when retracting the attachment portion and/or the coupling portion. In this way, a space saving accommodation of the force transfer member is possible. For example, in contrast to prior art solutions in which the force transfer member is wound up on a spool for retraction purposes thereby requiring an accommodating space for a suitable spool, the present solution provides the possibility to omit such a spool for winding up the force transfer member and use an already available accommodating space in the cross beam or another elongate element of the base frame or load carrier for storing a portion of the force transfer member.

According to a preferable embodiment, a tightening mechanism comprises a pulling device operatively coupled to the force transfer member and translatory movably held in the elongate base frame member, preferably the cross beam. The pulling device may be supported in the elongate base frame member, in particular the cross beam, so as to be movable along an extension direction of the cross beam. The pulling device may comprise a carriage which is slidably accommodated in the cross beam. The force transfer member may be fixedly coupled to the pulling device, for example by fixing an end of the force transfer member on the pulling device. On the other hand, the pulling device may comprise a pulley or deflection roll allowing to contact a portion of the force transfer member and to apply a force thereon while allowing a relative movement of the force transfer member with respect to the pulling device about the pulley. In this way, moving the pulling device within the cross beam may pull and release a portion of the force transfer member into and out of the cross beam.

The pulling device may be pre-biased in a retraction direction by means of a biasing member. The biasing member may be a spring or a rubber band provided inside of the cross beam or at least extending partially inside the cross beam. Furthermore, the biasing member may be configured as a retraction mechanism comprising a spring biased spool and a wire coupled to the pulling device. By pre-biasing the pulling device in a retraction direction, the tightening mechanism comprises a self-retracting capability providing a coarse adjustment of the force transfer member length outside of the cross beam in a self-actuating manner. With such a configuration, it is also possible to provide an arrangement that functions similar to the above described configuration according to the first aspect, in which the pretensioning mechanism pre-biases the vehicle coupling portion in retraction direction and which allows to tighten the load carrier to the vehicle prior to operating the locking mechanism.

According to a further preferable embodiment, the tightening mechanism comprises an operating member operatively coupled to the pulling device. Preferably, the operating member comprises an operating knob rotatable by a user. Preferably, the operating member is operatively coupled to the pulling device by means of a force transfer mechanism. The force transfer mechanism may be configured to translate a movement of the operating member, preferably a rotational movement, into a translatory movement of the pulling device. The operating member can be provided at a longitudinal end portion of the cross beam. In this way, the operating member is easily accessible for a user.

According to a further preferable embodiment, the force transfer mechanism comprises a driving member coupled to the pulling device in a manner allowing to apply a tightening force on the pulling device at least in the retraction direction. Preferably, the driving member comprises a threaded rod. On the other hand, other driving members may be used, for example a chain for driving the pulling device.

According to a further preferable embodiment, the tightening mechanism comprises an actuator movable towards and away from the pulling device and contactable with the pulling device to apply a tightening force on the pulling device. The tightening mechanism may comprise an operating member, preferably an operating knob, operatively coupled to the actuator by means of a force transfer mechanism, the force transfer mechanism being preferably configured to transfer a movement of the operating member, preferably a rotational movement, into a translatory movement of the actuator. The force transfer mechanism may comprise a driving member, preferably a threaded rod, and the actuator may comprise a driven portion, preferably a threaded portion, drivingly engaged with the driving member.

According to a further preferable embodiment, the pulling device may be coupled to the driving member and a coupling section so as to be freely movable with respect to the driving member in the retraction direction. Such a configuration allows a movement of the pulling device in the retraction direction without operation of the operating member. Accordingly, a connection between the pulling device and the driving member may be configured in the sense of a one-way clutch.

According to a further preferable embodiment, the force transfer member may be coupled to the attachment portion at a first end portion and to the coupling portion or to a further attachment portion at a second end portion and the pulling device may comprise a pulley for applying a pulling force on the force transfer member between the end portions. With such a configuration, it is possible to apply a retraction force on both portions. Furthermore, the retraction force is balanced so that the same retraction force is applied on the attachment portion and the coupling portion.

According to a further preferable embodiment, the load carrier may further comprise a deflection mechanism for changing an extension direction of the force transfer member to direct the same in longitudinal extension direction of the cross beam. Preferably, the deflection mechanism is configured to provide an orientation change of about 90 degrees. By using such a deflection mechanism, a force transfer member may be pulled into the cross beam independent of its extension direction outside of the cross beam. For example, the cross beam may comprise openings in its end portions allowing to pass the force transfer member there through. The deflection mechanism can be arranged in the end portion of the cross beam and can comprise a guide surface or a pulley for effecting the desired change of the extension direction upon passing the force transfer member through the deflection mechanism. The deflection mechanism can be configured for deflecting a portion of the force transfer member between the pulling device and the attachment portion and to deflect a portion of the force transfer member between the pulling device and the coupling portion. Accordingly, the deflection mechanism may comprise two portions for changing an extension direction of the force transfer member. The deflection mechanism can comprise a single deflecting member which is integrally formed, preferably by molding or 3D printing. The deflection mechanism may further be configured to support a biasing member for pre-biasing the pulling device in the retraction direction. For that, the deflection mechanism may comprise a pulley or deflection roller for supporting the biasing member.

According to a further preferable embodiment, the lower vehicle support portion may be coupled to the cross beam at a first end portion and may comprise a vehicle coupling portion at a second end portion thereof. Preferably, the coupling portion is provided movable with respect to the first end portion. In this connection, reference is made to the above described first aspect. The general construction of the cross beam and the lower vehicle support portion or portions may be configured as described above with respect to the first aspect.

According to a further aspect, a load carrier for a vehicle is provided. The load carrier may comprise a supporting frame and a load support rotatably supported on the supporting frame about a pivot axis between a use position and a non-use position. In particular the load carrier may be configured according to the second configuration as described in the detailed description in itemized structure. The load support may be a wheel support for supporting bikes. The supporting frame may be a frame construction consisting of frame members which may be coupled to each other to substantially form a U-shape. The supporting frame may be configured to be coupled to a cross beam of a base frame as described herein with respect to other aspects, embodiments and modifications.

The supporting frame may comprise an abutment portion defining the use position and comprising an abutment surface for contacting a mating contact surface of the load support when the load support is in the use position. The abutment portion may be integrally formed with the supporting frame or may be provided on a separate member fixedly mounted on the supporting frame. In particular, the abutment portion may be provided on a coupling device arranged on the supporting frame and suitable for coupling the load support to the supporting frame. In a preferable configuration, the coupling device may be configured to couple the load support to the cross beam of a load carrier. For that, the coupling device may comprise a coupling portion configured to be pivotably mountable to the cross beam, for example by means of a specific coupling device as will be described in greater detail in connection with other aspects, embodiments and modifications of the present application.

The abutment surface may face away from the pivot axis. Accordingly, the abutment surface may provide a rotational stop for the load support when the same is rotated about the pivot axis. In other words, the rotation of the load support is limited by the abutment portion, in particular by the abutment surface facing away from the pivot axis. The abutment surface is thus formed such that the mating contact surface provided on the load support faces towards the pivot axis in use position. In the context of the present disclosure, facing away from the pivot axis may be understood as a configuration in which surface normals of the abutment surface are oriented in a direction in which a distance between an imaginary point of the surface normals and the pivot axis increases when moving along the surface normal in direction of said surface normals. For example, the abutment surface may be a surface which is inclined with respect to a direction extending radially with respect to the pivot axis. Preferably, the inclination between the abutment surface or a portion of the abutment surface and the radial direction is more than 5 degrees, preferably more than 10 degrees.

According to a preferably embodiment, the abutment surface does not have to be completely flat and thus can deviate from a planar shape at least in some sections. For example, the abutment surface may at least partially be convexly formed. Accordingly, the abutment surface may be curved or rounded outwardly. In particular, the abutment surface may be curved or rounded such that it at least partially extends about the pivot axis in one extension direction. The abutment surface may be formed at least partially straight along the pivot axis in a second extension direction or may be curved along the pivot axis. The abutment surface may also be at least partially concavely formed. For example, the abutment surface may be rounded inward in a bowl like manner. With such a configuration, the abutment surface may define a recess for accommodating a portion of the load support carrying the mating contact surface.

According to a further preferable embodiment, the abutment surface comprises a substantially flat section extending in a plane which extends parallel to the pivot axis. Such a substantially flat section provides a suitable support for receiving forces acting on the abutment surface in a rotational direction about the pivot axis.

According to a further preferable embodiment, the supporting frame may comprise another abutment surface for contacting a mating contact surface of the load support when the load support is in the non-use position. The abutment portion may be integrally formed with the supporting frame or may be provided on a separate member fixedly mounted on the supporting frame. In particular, the abutment portion may be provided on a coupling device arranged on the supporting. This additional abutment surface limits the rotation of the load support about the supporting frame when rotating the load support away from the use position.

According to a further preferable embodiment, the abutment portion is formed on a coupling device non rotatably mounted on the supporting frame. The supporting frame may be coupled to a cross beam of a base frame of the load carrier. On the other hand, the supporting frame may form a bridging portion coupling two coupling devices to each other. Instead of mounting the coupling device to a cross beam by means of the supporting frame, it is possible to configure the coupling device such that it can be coupled to the cross beam of the base frame. For that, the coupling device may be configured to be coupled to a coupling device, in particular a holder of a coupling device which is configured to couple, preferably rotatable and releasably lockable couple different elements on the cross beam.

According to a further preferable embodiment, a rotation of the load support may be guided by a cylindrically formed supporting portion of the coupling device. Accordingly, the coupling device can comprise a supporting portion which is at least partially cylindrically formed and suitable to guide the load support on the coupling device. The supporting portion may comprise a supporting surface mating with a supporting surface of a guiding portion of the load support. Accordingly, a surface contact between the supporting surface on the supporting portion and the supporting surface on the guiding portion is provided, more precisely a sliding surface contact. Accordingly, a sliding bearing is provided due to the cooperation of the supporting surfaces of the different portions. In this way, the load support is securely pivotably held on the coupling device.

According to a preferable configuration, the coupling device may thus comprise at least one abutment portion in which a rotation of the load support is limited and at least one supporting portion on which the load support is rotatably guided. The abutment portion and the supporting portion are offset with respect to each other along the pivot axis. An abutment portion and a supporting portion may be provided adjacent to each other. On the other hand, it is also possible to provide the abutment portion and the supporting portion at a distance from each other. In a preferable configuration, a portion with two adjacent abutment portions is provided on the coupling device.

According to a further preferable embodiment, the wheel support may comprise a latching portion cooperating with a latching portion provided on the coupling device at least in the use position. By the cooperation of the corresponding latching portions, a defined position, for example the use position, may be indicated to a user by providing a snap in feeling.

According to a further aspect, a load carrier mountable on the rear of a vehicle is provided. The load carrier may comprise a base frame having a cross beam and load support arrangement hingedly coupled to the cross beam at a mounting portion thereof by means of an adapter. The support arrangement may be an arrangement for supporting wheels of a bike thereon, for example with a load support configured to support goods to be transported from below or a load support which allows to hang goods to be transported thereon. For example, such a load support may be a wheel support of a bike carrier support arrangement or may comprise a supporting beam or limb for hanging bikes thereon. In particular, the supporting beam or limb may be configured such that frames of bikes may be hanged thereon. The base frame may be configured as described herein with respect to other aspects, embodiments and modifications. The same applies for different configurations of the load support arrangement.

According to the present configuration, the load support arrangement may be hingedly coupled to the cross beam at a mounting portion of the cross beam by means of an adapter. Accordingly, the mounting portion of the cross beam corresponds to a portion on the cross beam where the support arrangement is hingedly coupled by means of the adapter. At least in the mounting portion, the cross beam may comprise an outer peripheral contour which at least partially deviates from an imaginary circle. In the context of the present disclosure, the outer peripheral contour may be defined by an outer contour of a cross section of the cross beam in the mounting portion. Furthermore, the outer peripheral contour may correspond to an envelop enveloping the mounting portion. In the mounting portion, the cross beam may be formed in cross section such that a convex hull of the mounting portion at least partially follows an imaginary circle but also comprises sections deviating from the imaginary circle. Accordingly, the cross beam comprises a non-round cross section in the mounting portion.

Preferably, the adapter is mounted on the mounting portion and defines an outer contour which at least partially compensates for the deviation of the outer peripheral contour from the imaginary circle such that a rounded guiding contour for supporting the load support arrangement on the mounting portion is provided. By using the adapter, the shape of the cross beam in the mounting portion can be changed to a shape which allows a pivoting support of the load support arrangement. In this way, it is possible to use cross beams which normally do not have the capability to hingedly support the load support arrangement thereon as cross beams for load carriers. In this way, it is possible, to use aerodynamically a beneficial and/or weight optimized cross beams that are not restricted to the requirement of providing an outer contour allowing to pivotably support the load support arrangement thereon.

Accordingly, the above described combination of cross beam and adapter may provide a rounded guiding contour which allows a pivotable support of the load support arrangement while the shape of the cross beam itself cannot allow for such a pivotal supporting. The cross beam can be made from extruding aluminum. Furthermore, the cross beam may comprise an inner accommodating space which is available for accommodating further elements of the load carrier, such as elements of a tightening mechanism described herein with reference to other aspects, embodiments and modifications. Preferably, the adapter alone or in combination with a portion of the cross beam provides a substantially cylindrical surface for supporting the load support arrangement thereon.

According to a preferable embodiment, at least the mounting portion of the cross beam comprises an asymmetric cross section. In the context of the present disclosure, asymmetric cross section may in particular relate to an outer peripheral shape of the cross beam in the mounting portion rather than to the shape in the interior of the cross beam in the mounting portion. For example, the cross beam may comprise reinforcing rips or mounting sections in its interior in the mounting portion which may be disregarded for the determination whether the cross section is asymmetric or not. For example, there is no mirror symmetry, symmetry with respect to a specific line, for example a middle axis of the cross beam, and thus no symmetry with respect to a point indicating such a middle axis in a cross-sectional view of the cross beam in the mounting portion.

According to a preferable embodiment, in at least the mounting portion the cross beam comprises a supporting portion defining an outer peripheral contour which follows the imaginary circle and is suitable for rotatably supporting a holder connectable to the load support arrangement at a coupling portion. Accordingly, the cross beam may be configured to provide a supporting portion or supporting surface allowing to directly contact a holder for pivotably supporting the same. Accordingly, the supporting portion of the cross beam can be provide an element of a sliding bearing. The supporting portion and the outer contour of the adapter may commonly define a rounded guiding contour for supporting the holder. In particular, the supporting portion and the adapter commonly define a rounded outer surface for supporting the holder. In this way, a pivotable support of the load support arrangement in a mounting portion of the cross beam which normally does not allow a pivoting support thereon is possible.

According to a further preferable embodiment, the holder may comprise an engaging portion configured to be releasably engaged with a corresponding receiving portion formed on the cross beam and/or with a corresponding receiving portion formed on the supporting portion. Preferably, the engaging portion on the holder comprises at least one protrusion. The receiving portion on the cross beam and/or on the supporting portion may comprise an engaging recess for accommodating at least one protrusion of the engaging portion. In this way, a positive locking between the holder and the cross beam and/or the supporting portion may be provided to arrest a load support arrangement in a use position and/or a non-use position.

Preferably, the cross beam comprises multiple engaging recesses spaced from each other in the outer circumferential direction in order to allow an engagement of the at least one protrusion at different positions thereby arresting the holder and thus a load support arrangement mounted to the holder at different angles.

According to a further preferable embodiment, the holder further comprises an operating member operatively coupled to the engaging portion for moving the engaging portion between an engaging position in which the at least one protrusion protrudes from an inner surface of the holder for an engagement with the engaging recess and a release position in which the at least one protrusion is retracted and disengaged from the engaging recess. Accordingly, an operating member is provided for establishing and releasing an engagement between the holder and the cross beam and/or the adapter. Accordingly, the operating member is provided for blocking or allowing a pivoting movement of the holder about the cross beam. The operating member may comprise an operating lever which is operatively coupled to the engaging portion. For example, the lever can comprise a handle portion operable and graspable by a user and may be mounted on the adapter pivotably about an axis extending in parallel to a middle axis of the cross beam. The lever may further comprise an operating portion which slidably contacts the engaging portion for urging the same towards and away from an engaging portion formed on the cross beam and/or on the supporting portion. Accordingly, the operating mechanism may be configured to translate a pivoting movement of the operating member or lever into a movement of the engaging portion radially towards and away from the cross beam and/or the adapter.

According to a further preferable embodiment, the cross beam may comprise a partially polygonal shape at least in the mounting portion. Accordingly, such a shape may only be provided in the mounting portion or may comprise such a shape over its entire longitudinal extension.

It is noted that the engaging portion provided on the holder and the engaging portion formed on the cross beam or on the outer surface of the adapter may be splined in order to provide an engagement between the same.

It is noted, that all features described herein with respect to different aspects, embodiments and modifications may be individually combined to form a load carrier.

According to a further aspect, a load carrier mountable on the rear of a vehicle is provided. The load carrier comprises a base frame having a cross beam. The base frame may be configured as a base frame described herein with reference to other aspects, embodiments and modifications. Furthermore, the load carrier may comprise at least one lower vehicle support portion coupled to the cross beam at a first end portion and supportable on the vehicle at a vehicle coupling portion thereof. In addition, the load carrier may comprise an attachment device having an engagement device couplable to the vehicle so as to clamp the coupling portion and the engagement device on the vehicle. At least one of the coupling portion and the engagement device comprises two engaging portions arranged at a distance from each other and both coupled to an end portion of a common force transfer member. Accordingly, the coupling portion and/or the engagement device may comprise two engaging portions spaced from each other and consequently providing to separate contact portions for contacting separate contact portions on the vehicle. For example, the coupling portion and/or the engagement device may be configured to contact an edge portion of a trunk lid or to encompass or clasp an edge portion of the trunk lid at individual separated positions.

Preferably, the engaging portions are formed in end portions of prongs of a fork like arrangement.

According to a preferable embodiment, the two engaging portions are formed so as to be integrally movable.

According to a further embodiment, the two engaging portions are commonly movable about at least one pivot axis, preferably two pivot axes.

According to a further preferable embodiment, the two engaging portions are integrally formed, preferably by forming a metal sheet.

According to a further preferable embodiment, the two engaging portions are separately formed and connected to each other by means of a bridging portion, wherein each engaging portion is preferably pivotably coupled to the bridging portion.

A method for mounting a load carrier is described in the following. First, a user may adapt a coupling portion and an upper vehicle support of a base frame to the car model to which the load carrier is to be mounted. For that, the user may provide a specific contact member or contact pad, may provide a contact member at a specific angle or may arrange a first contact member and a second contact member with a specific angle on a mounting portion. After that, the user may position the coupling portion onto a lower part of a trunk lid or rear door of a vehicle. The user may then adjust a length of the lower vehicle support portions and lock the lower portion to the upper portion by operating the locking mechanism. The user may then engage attachment devices with an upper portion of the trunk lid or rear door by pulling out the attachment devices coupled to the tightening mechanism by means of force transfer members. After the attachment devices are hooked onto the upper portion, the user may tighten the force transfer members by operating the tightening mechanism. After the load carrier is tightened on the vehicle, the user may unlock and rotate parts provided on the cross beam and may in particular rotate a load support arrangement into use position. After that, the load carrier is ready for use and may be loaded with goods to be transported, for example a bike. From the above mounting procedure, it is clear that a length adjustment of the lower vehicle support is necessary for an initial mounting on the vehicle. After the lower vehicle support is adjusted to the vehicle, the step of adjusting the lower vehicle support portions may be omitted when remounting the load carrier on a vehicle of identical type.

Other features of the present invention will be apparent from consideration of the information contained above as well as in or in combination with the following detailed description, drawings and claims and configurations given in itemized structure below. The present invention is illustrated by way of example, and not by way of limitation, in the Figures of the accompanying drawings.

DETAILED DESCRIPTION OF PREFERRED EMBODIMENTS

FIGS. 1 to 6 show different configurations of load carriers 1 comprising several aspects, embodiments, and modifications of the present disclosure. While the load carriers as described comprise multiple aspects and features as described in the following, it is to be noted that single aspects, embodiments, and features may be realized in a single load carrier or may be suitably combined in a load carrier.

Figure 7:
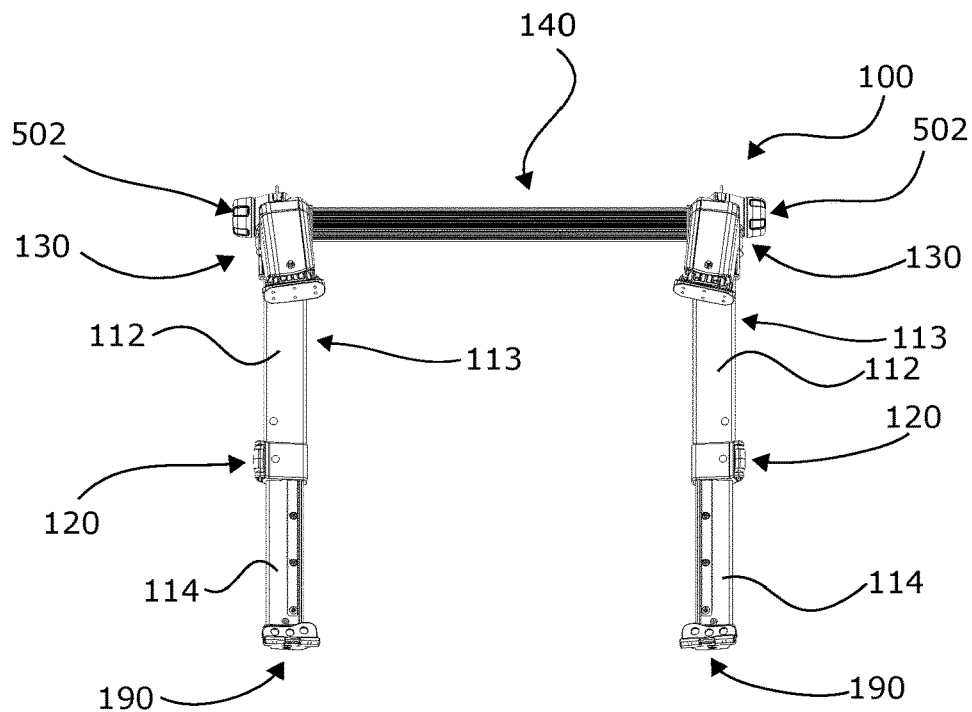
FIG. 7 and FIG. 8 show an embodiment of a configuration of a base frame of a load carrier according to an embodiment which is usable in connection with the load carriers of FIGS. 1 to 6.
Figure 8:
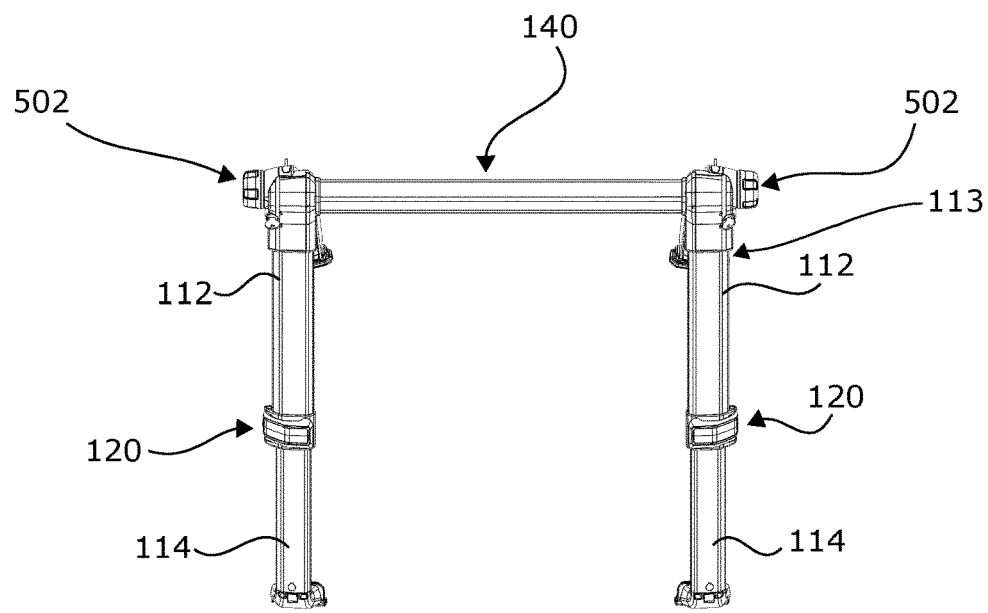

FIGS. 1 to 4 show a load carrier which according to the embodiment is realized as a bike carrier. The load carrier 1 comprises a base frame 100 comprising two lower vehicle support portions 110 also referred to as lower vehicle supports. Each lower vehicle support portion 110 comprises an upper portion 112 and a lower portion 114. The lower portion 114 is telescopably received in the upper portion 112. At a lower end of the lower vehicle support 110, a vehicle coupling portion 190 is provided for supporting the base frame 100 against a lower portion of a vehicle. The base frame 100 further comprises a cross beam 140. In a mounted condition of the load carrier 1 the cross beam 140 extends in a cross direction of the vehicle, preferably in horizontal direction. The lower vehicle support portions 110 are coupled to the cross beam 140 at first end portions 113 thereof. The two lower vehicle support portions 110, which may also be referred to as legs, may extend substantially perpendicular to the cross beam 140 and in parallel to each other. Accordingly, the lower vehicle support portions 110 and the cross beam 140 may be coupled to each other to form a substantially U-shaped configuration as is shown in FIGS. 7 and 8.

The base frame 100 may further comprise upper vehicle support portions 130. The upper vehicle support portions 130 can be configured to support the base frame on portions of the vehicle being located above the portions which are contacted by the vehicle coupling portions 190. Each upper vehicle support portion 130 is fixedly coupled to the cross beam 140 and fixedly coupled to one of the at least one lower vehicle support portions 110. The upper vehicle support portion 130 is fixedly mounted to the cross beam 140 and the lower vehicle support portion 110 at a specific angle, in particular inclined with respect to the lower vehicle coupling portions 110 so that the cross beam 140 may be located at the uppermost portion of the base frame 100 when the load carrier is mounted on a vehicle. The length of the upper vehicle support portion 130 is shorter than a length of the lower vehicle support portion 110. The upper vehicle support portion 130 is inclined with respect to a vertical plane when the load carrier is mounted on the vehicle, in the shown configuration at an inclination which is greater than an inclination of a lower vehicle support portion 110.

The base frame 100 may comprise a locking mechanism 120. In the embodiment, the locking mechanism 120 is configured to establish a positive locking between the lower portion 114 and the upper portion 112 so as to arrest the position of the vehicle coupling portion 190 with respect to the first end portion 113. Accordingly, with this configuration, the locking mechanism 120 can be unlocked so as to allow a telescoping movement of the lower portion 114 with respect to the upper portion 112 in order to adjust a distance between the first end portion 113 and the vehicle coupling portion 190 and locked for arresting the vehicle coupling portion 190 at a predetermined distance to the first end portion 113. In this way, the length of the lower vehicle supports 110 and thus the position of the cross beam 140 can be adjusted according to the dimensions of a vehicle on which the load carrier 1 is to be mounted.

The locking mechanism 120 is configured to prevent a movement of the lower portion 114 relative to the upper portion 112 by positive locking, for example by a form fit engagement. FIGS. 9 to 16 show different embodiments and modifications of a locking mechanism 120 for arresting the lower portion 114 by positive locking. Common to all embodiments and modifications is that an engagement portion exemplary embodied as a toothed portion 123 is provided on the lower portion 114. The different locking mechanisms 120 are configured to engage with the toothed portion 123.

Figure 9:
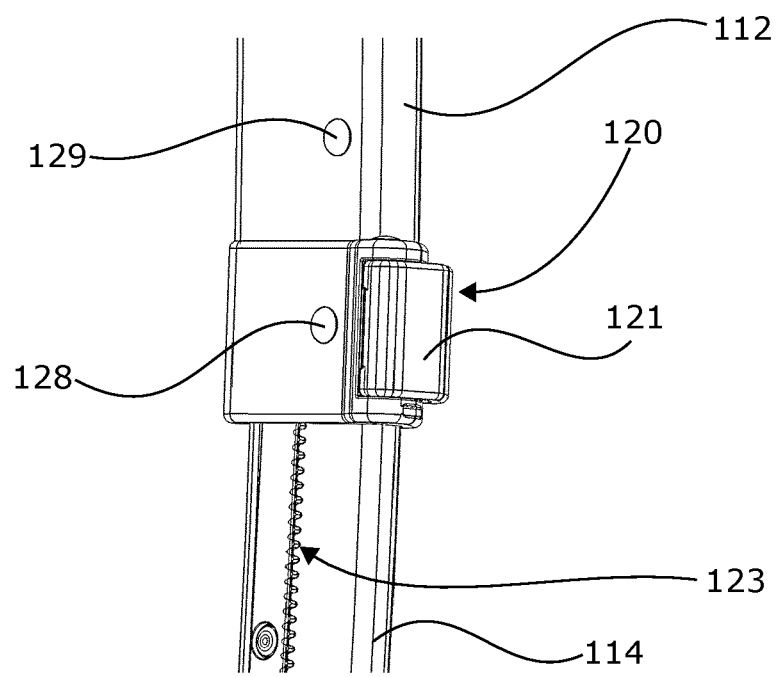
FIGS. 9 and 10 show details of a locking mechanism provided on the base frame as shown in FIGS. 7 and 8.
Figure 10:
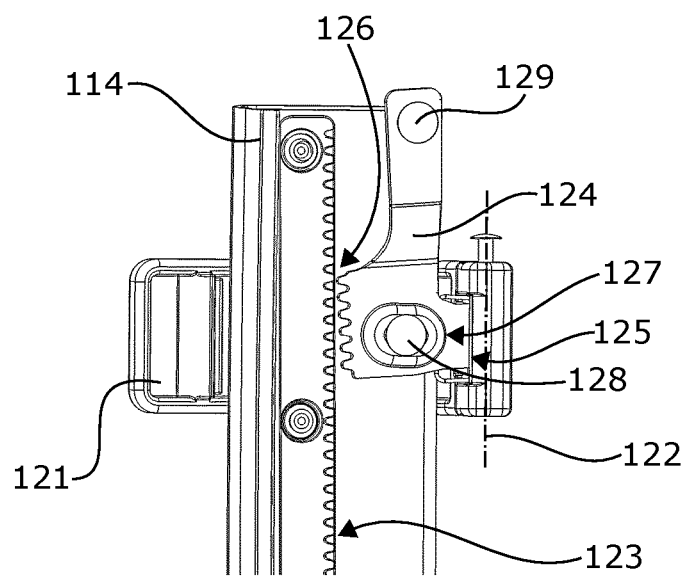

In a first embodiment as shown in FIGS. 9 and 10, the locking mechanism 120 comprises a lever 121 pivotable about a pivot axis 122 defined by a pivot pin mounted on the upper portion 112 in a manner extending along the longitudinal extension direction of the upper portion 112. Accordingly, in a mounted condition of a load carrier comprising such a base frame, the lever 121 is pivotable about a pivot axis 122 which extends substantially vertically. The locking mechanism 120 comprises an engagement member 124 embodied as a further lever which is pivotably mounted on the upper portion 112 by means of a pivot pin 129. The pivot pin 129 defines a pivot axis of the engagement member 124, wherein the engagement axis extends skew to the pivot axis 122. The pivot axis of the lever 124 is offset and substantially perpendicular to an extension direction of the pivot axis 122. The lever 124 comprises an engagement portion 126 which is embodied as a toothed portion corresponding to the toothed portion 123 provided on the lower portion so that the engagement portion 126 is able to establish a form fit or a positive locking engagement with the toothed portion 123. The engagement member 124 further comprises a guiding recess 127 which extends about the pivot axis defined by the pivot pin 129 for a predetermined distance. In the guiding recess 127, a limiting pin 128 is inserted and fixedly coupled to the upper portion 112. Accordingly, the engagement member 124 can move towards and away from the toothed portion 123 until end portions of the guiding recess 127 get in contact with the pin 128. The lever 121 is operatively connected to the engagement member 124 by means of a cam surface (not shown) configured to contact a force receiving section 125 provided on the engagement member 124. In this way, pivoting the lever 121 about the pivot axis 122 results in a movement of the lever 124 in engagement direction and release direction. It is noted that the lever 124 may be pre-biased in a releasing direction.

Figures 11, 12:
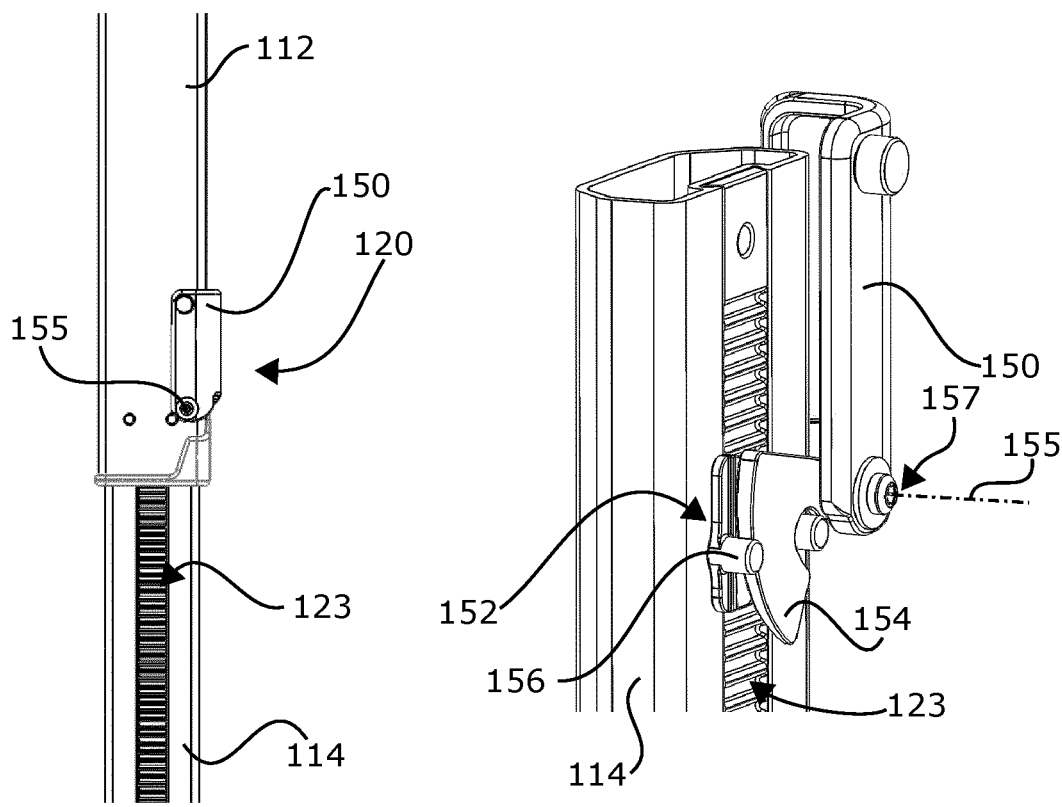
FIGS. 11 to 13 show an alternative configuration of the locking mechanism.
Figure 13:
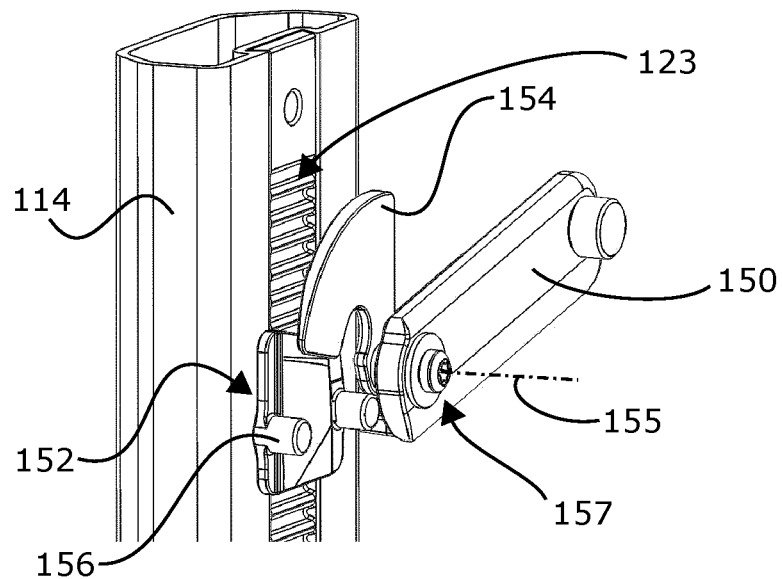

A further preferable configuration of the locking mechanism 120 is shown in FIGS. 11 to 13. Again, an engagement portion in the form of a toothed portion 123 is provided on the lower portion 114. The locking mechanism 120 comprises an operating member 150 embodied as a lever. The lever 150 is held pivotably about a pivot pin 157 defining a pivot axis 155 which, when the load carrier is mounted on a vehicle, extends in forward rearward direction and substantially horizontal. In particular, the pivot pin 157 defining the pivot axis 155 is mounted on the upper portion 112. The lever 150 may be coupled to an urging member 154 which is embodied as a cam plate in the present configuration. The cam plate comprises an inclined operating surface, preferably inclined with respect to the pivot axis 155 defined by the pivot pin 157. Accordingly, moving the lever 150 and consequently the urging member 154 about the pivot axis results in a movement of the actuating surface on the urging member 154. The actuating surface is contacted with an engaging member 152. The engaging member is shiftably supported on the upper portion 112, more precisely on an inner wall portion of the upper portion 112 by means of supporting portions 156. The engaging member 152 comprises a contact surface for contacting the cam plate 154 on one side and comprises a toothed section for engaging with the toothed portion 123 on an opposite side thereof. Furthermore, although not shown, the engaging member 152 is pre-biased in a direction facing away from the toothed portion 123 so that the engaging member 152 is normally urged away from the toothed portion 123 towards a release position. The cam plate 154 is provided between the engaging member 152 and an inner surface of the upper portion 112. Accordingly, by moving the lever 150 between an upright position as shown in FIG. 12, which corresponds to an engaging position, and an inclined position, which corresponds to a release position, as is shown in FIG. 13, the engaging member 152 may be engaged with the toothed portion 123 on the lower portion 114 or the engagement may be released.

Figure 14:
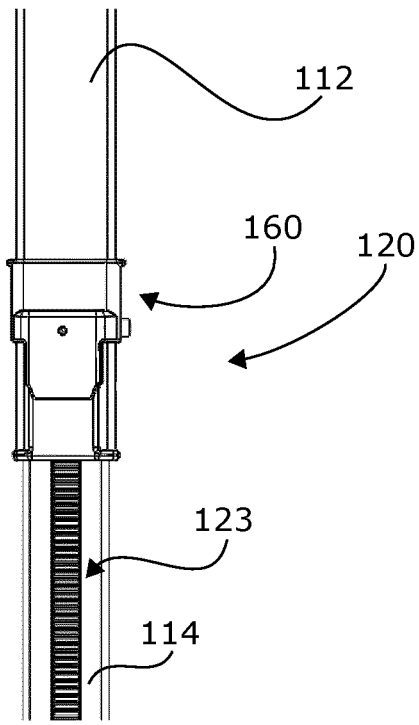
FIGS. 14 to 16 show a further modification of the locking mechanism.
Figures 15, 16:
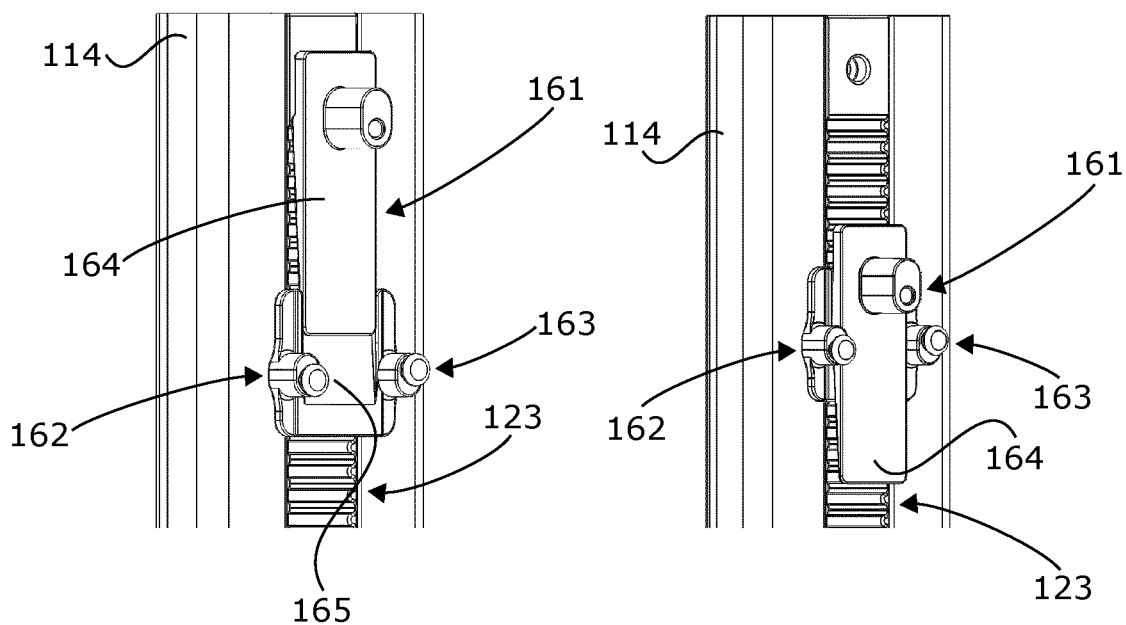

A further modification of the locking mechanism 120 is shown in FIGS. 14 to 16. The locking mechanism 120 again comprises a toothed portion 123 provided on the lower portion 114 and an operating member 160. Contrary to the configuration as shown in FIGS. 11 to 13, the operating member 160 is slidably movable on the upper portion 112 along a longitudinal extension direction of the upper portion 112. The operating member 160 is coupled to a cam plate 164 which is translatory movably held inside the upper portion 112 and operatively connected to the operating member 160. The operating member 160 may be embodied as a sleeve encompassing an outer surface of the upper portion 112, as is visible from FIG. 14. The cam plate 164 may also be referred to as wedge portion and forms an actuating member which actuates an engaging portion 162 which is configured similarly to the engaging member 152 as shown in FIGS. 12 and 13. The engaging portion 162 comprises a supporting portion 163 by means of which the same is coupled to the upper portion 112. Again, the engaging portion 162 can be pre-biased in release direction by means of a suitable urging member, for example a spring. The engaging portion 162 comprises a force receiving surface for receiving a force applied by the cam plate 164. The force receiving surface 165 may be inclined corresponding to an inclined pushing surface provided on the cam plate 164. By a cooperation of the surfaces of the cam plate 164 and the engaging portion 162, a translatory movement of the cam plate 164, which generally forms an actuating member 161 of the locking mechanism according to this modification, in particular a translating movement along the extension direction of the upper portion 112 may be transferred into a translatory movement of the engaging portion 162 in a direction substantially perpendicular to the translation direction of the actuating member 161. In this way, the engaging portion 162 can be shifted between a position in which it is engaged with the toothed portion 123 and a position in which there is no engagement with the toothed portion 123 thereby locking and unlocking a movement of the lower portion 114 relative to the upper portion 112.

The locking mechanism 120 as described with reference to FIGS. 11 to 13 as well as the locking mechanism 120 as described with reference to FIGS. 14 to 16 both comprise engaging members 152, 162. These engaging members 152, 162 are prebiased in a direction facing away from the toothed portion 123, i.e. in a release direction, so that the engaging members are normally urged away from the toothed portion 123 towards a release position. As already mentioned before, the urging member may be a spring. A possible configuration for pre-biasing the engaging members 152, 162 in the above described way will be explained with reference to FIGS. 71 and 72 in which for the purpose of explanation, a possible configuration for pre-biasing the engaging member 152 is explained. It is noted that the configuration for pre-biasing the engaging member 162 may be identical.

Figure 71:
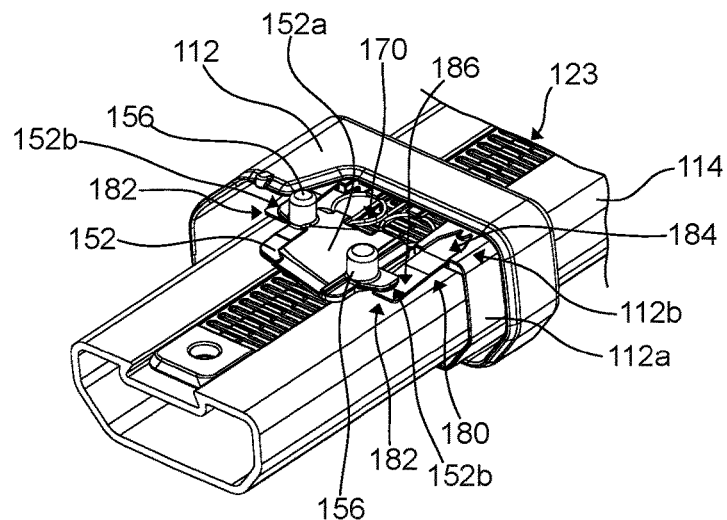
FIGS. 71 and 72 show a possible configuration for pre-biasing an engaging member as shown in FIGS. 12, 13, 15 and 16.
Figure 72:
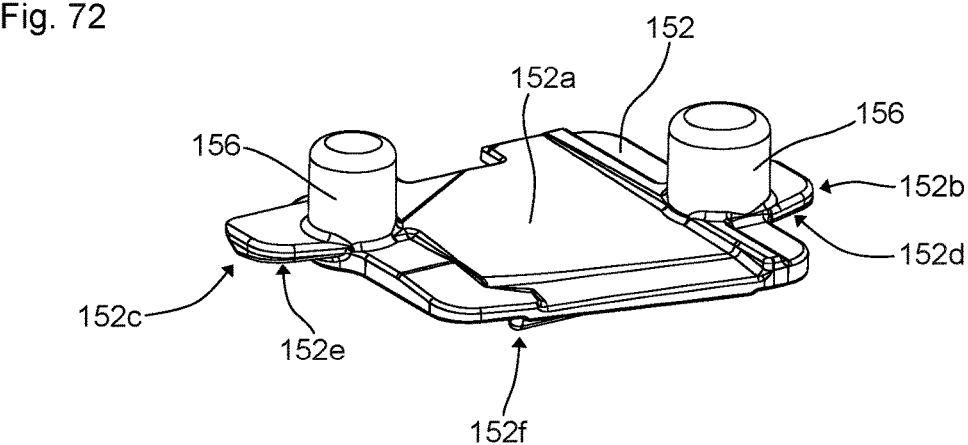

FIG. 71 shows a perspective view of a possible arrangement in which the engaging member 152 is held on the upper portion 112 in a pre-biased manner. FIG. 72 shows the engaging member 152 in an enlarged view showing a specific design of the same in greater detail.

As already described above, the engaging member 152 is shiftably supported on the upper portion 112, more precisely on an inner wall portion of the upper portion 112 by means of supporting portions 156. The supporting portions 156 may be arranged shiftable in main extension direction of the upper portion 112. The supporting portions 156 can be shiftably accommodated in openings 112a, 112b provided in the upper portion 112 as is for example shown in FIG. 74. The openings 112a, 112b may be provided as slots extending in the upper portion 112 over a predetermined length and in parallel to the longitudinal direction of the lower portion 114 and the upper portion 112. The length of a slot, i.e. the length of the openings 112a, 112b in a direction parallel to the longitudinal or main extension direction of the lower portion 114 and the upper portion 112, in particular parallel to the longitudinal or main extension direction of the toothed portion 123, is greater than a corresponding dimension in this direction of a supporting portion 156 accommodated therein. In this way, a movement of the supporting portions 156 along the toothed portion 123 is possible. This allows the engaging member 152 to shift in longitudinal direction of the upper portion 112 and helps in aligning protrusions or teeth of the same with grooves or teeth of the toothed portion 123. An urging member 170 which may be embodied as a spring, may be provided for returning the engaging member 152 into a balancing position which may be substantially in the middle of the longitudinal extension direction of the slots in order to allow at least a slight movement of the engaging member 152 from the balancing position in opposite directions. In the balancing position, the urging member 170 is preferably unloaded. With such an arrangement, an enhanced engagement between engaging member 152 and toothed portion 123 can be achieved.

The engaging member 152 comprises a contact surface 152a for contacting the cam plate 154 (not shown in FIGS. 71 and 72) on one side and comprises a toothed section 152f for engaging with the toothed portion 123 on its opposite side. The supporting portions 156 protrude from the engaging member 152 on the same side on which the contact surface 152a is provided. Furthermore, the supporting portions 156 are provided on opposite sides of the contact surface 152a in a direction cross to the main extension direction of the upper and lower portions 112, 114 and are offset with respect to each other in a direction parallel to the extension directions of the upper and lower portions 112, 114.

According to the embodiment shown in FIG. 72, the engaging member further comprises urging member contact portions 152b, 152c. The urging member contact portions 152b, 152c are embodied as protrusions which protrude from side portions of the engaging member. The protrusions may protrude in a direction substantially perpendicular to the main extension direction of the supporting portions 156, which main extension direction is parallel to the main extension direction of the upper portion 112 and the lower portion 114. Furthermore, the protrusions may protrude in opposite directions and, preferably from portions at which the supporting portions 156 are provided. The protrusions may comprise the shape of wings. In the present configuration, the urging member contact portions 152b, 152c each comprise an urging member contact surface 152d, 152e on a lower portion thereof, i.e. on a side of the engaging member 152 on which the toothed section 152f is provided. The urging member contact surfaces 152d, 152e are configured to contact a spring. The spring is embodied as a blade spring 180 as is shown in FIG. 71. However, other types of springs may be used for applying a force on the urging member contact surfaces 152d, 152e to urge the engaging member 152 away from the toothed portion 123.

Figure 75:
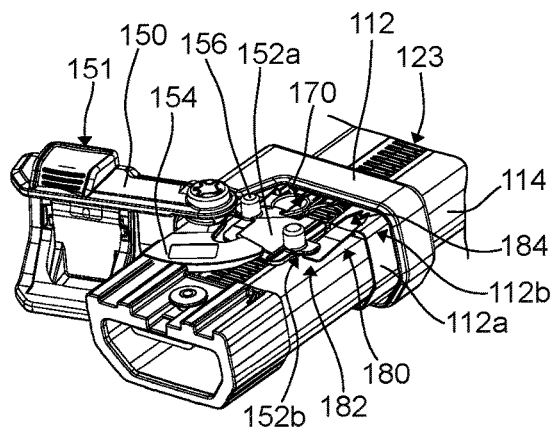
Figure 76:
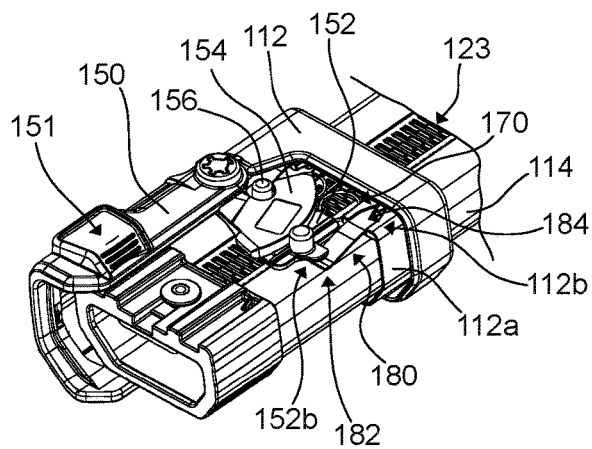

Each blade spring 180 comprises a contact portion 182 and a mounting portion 184. In the embodiment, each contact portion 182 is provided on one longitudinal end of the blade spring 180 and is configured to get in contact with the a contact surface 152d, 152e of the engaging member 152. Each mounting portion 184 is provided on the opposite longitudinal end of each blade spring 180 and is configured to be coupled to the upper portion 112. In the embodiment, each mounting portion 184 is fixed to a mounting flange 112a of the upper portion such that the blade spring 180 is arranged cantilevered with the contact portion 182 forming a free end which is movable by bending about the fixed mounting portion 184. As is shown in FIGS. 75 and 76, each mounting portion 184 may be securely held in an accommodating portion 112b of the mounting flange 112a. Each contact portion 182 is arranged between an urging member contact portion 152b, 152c and an outer surface of the lower portion 114 adjacent the toothed portion 123. The blade spring 180 is configured such that an urging force urging the engaging member 152 away from the toothed portion 123 is applied on the engaging member 152 at least in a manner disengaging the engaging member 152 from the toothed portion. Accordingly, the blade spring 180 is provided and configured so as to exert a force on the engaging member 152, which moves the engaging member 152 into a release position. FIG. 71 shows a state, in which the engaging member 152 is positioned in the release position, i.e. in a position in which the engaging member 152 is not in engagement with the toothed portion 123.

Figure 73:
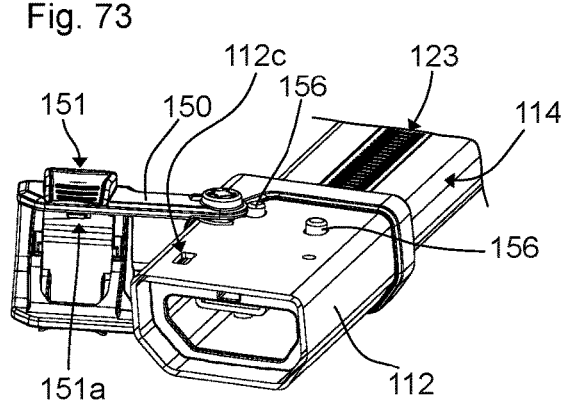
FIGS. 73 to 78 show a possible configuration of the locking mechanism of FIGS. 11 to 13.
Figure 74:
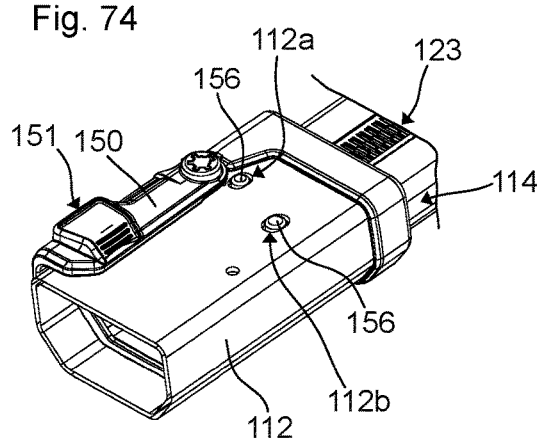

The engaging member 152 as described before is operable by a lever 150. FIG. 73 shows a state in which the lever 150 is in an unlocking position and FIG. 74 shows a state in which the lever 150 is in a locking position. A securing mechanism for releasably securely holding the lever 150 in the locking position may be provided. Such a securing mechanism can comprise an operating portion 151 graspable by a user and a latching portion 151a coupled to the operating portion 151 such that a movement of the operating portion 151 leads to a movement of the latching portion 151a. The latching portion 151a is formed so as to engage with an opening 112c or notch provided in the upper portion 112 at a position allowing the latching portion 151a to get in engagement with the same when the lever is in a locking position. The latching portion 151a is prebiased by an urging member, such as a spring, in a manner that it automatically engages with the opening 112c as soon as the lever 150 has reached the locking position. A user may move the operating portion 151 against the force of the urging member in order to bring the latching portion 151a out of engagement with the opening 112c and then move the lever 150 into the unlocking position.

Figure 77:
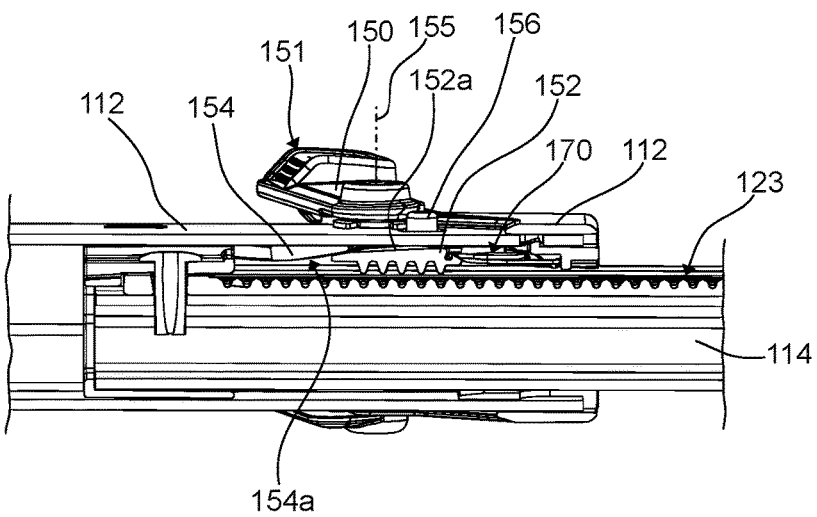
Figure 78:
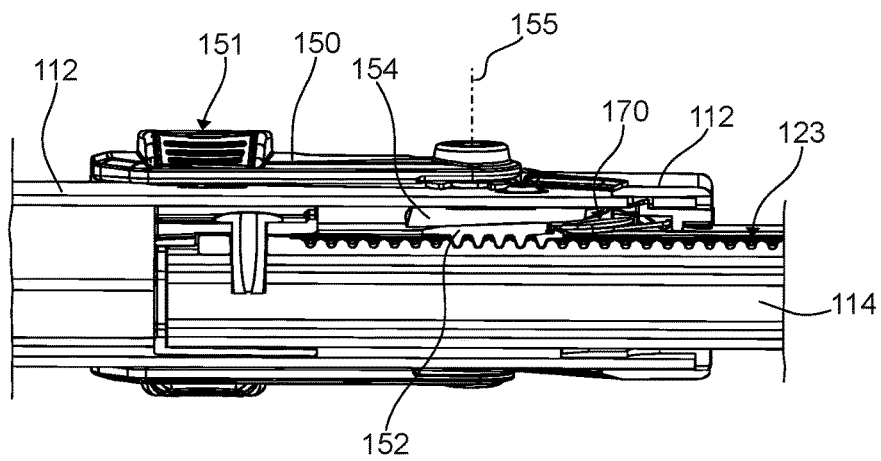

FIGS. 75 and 76 show an interior configuration of the arrangements shown in FIGS. 73 and 74. FIGS. 77 and 78 show a sectional view showing a locking state and an unlocking state of the locking mechanism in greater detail. The lever 150 is operatively coupled to the cam plate 154. The cam plate 154 comprises an inclined operating surface 154a as is indicated in FIG. 77 and, therefore, acts as a wedge portion which is movable between the engaging member 152 and the inner wall of the upper portion 112 to urge the engaging member 152 into engagement with the toothed portion 123, i.e. to move the engaging member 152 towards the toothed portion 123. The cam plate 154 may be referred to as actuating member for actuating the engaging member 152. The operating surface 154a and the contact surface 152a are configured to cooperate with each other when the cam plate 154 is moved relative to the engaging member 152 by moving the lever 150. Moving the lever 150 leads to a rotational movement of the cam plate 154 about pivot axis 155. By sliding contact between the operating surface 154a and the contact surface 152a the rotational movement of the cam plate 154 is transferred into a translatory movement of the engaging portion 152 in a direction parallel to the extension direction of the pivot axis 155. Thus, by moving the lever 150 between an open position as shown in FIGS. 73, 75 and 77 and a closed position as shown in FIGS. 74, 76 and 78, it is possible to engage and disengage the engaging member 152 with the toothed portion 123 and, hence, to engage the upper portion 112 with the lower portion 114 such that the lower portion 114 is non-movably fixed to the upper portion 112, or disengage the same from each other so that the lower portion 114 is movable with respect to the upper portion 112.

Figure 1:
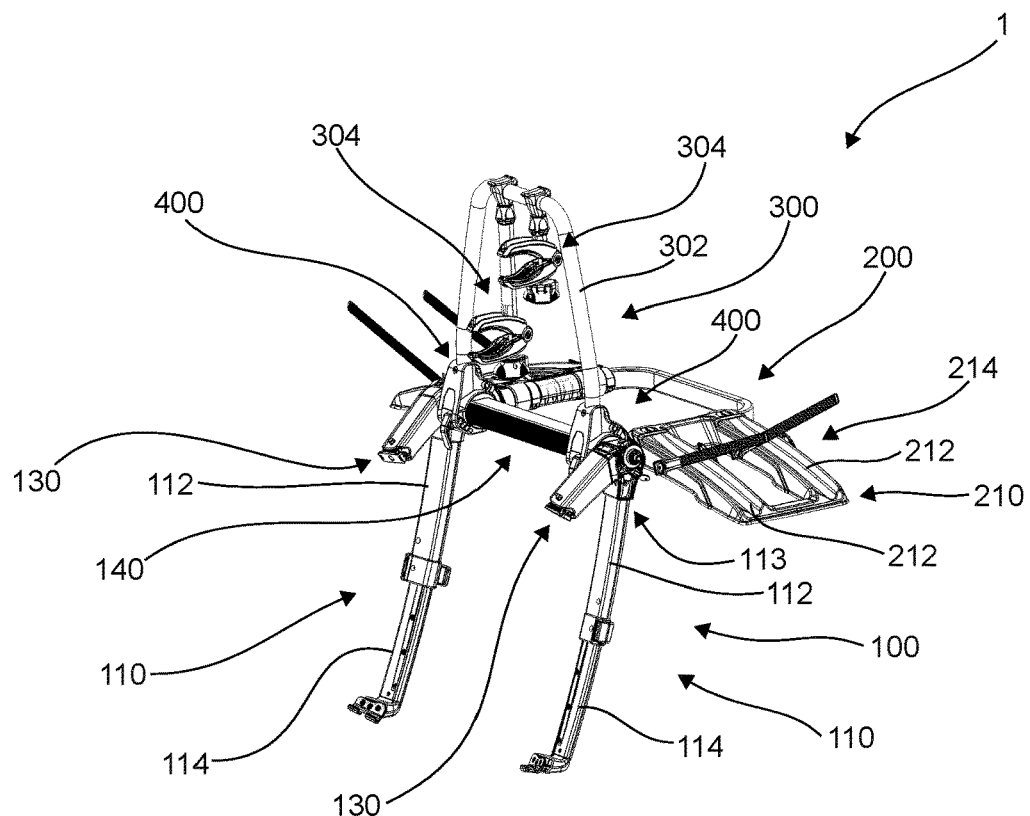
FIGS. 1 to 4 show different views of a load carrier comprising features according to different aspects and embodiments.
Figure 2:
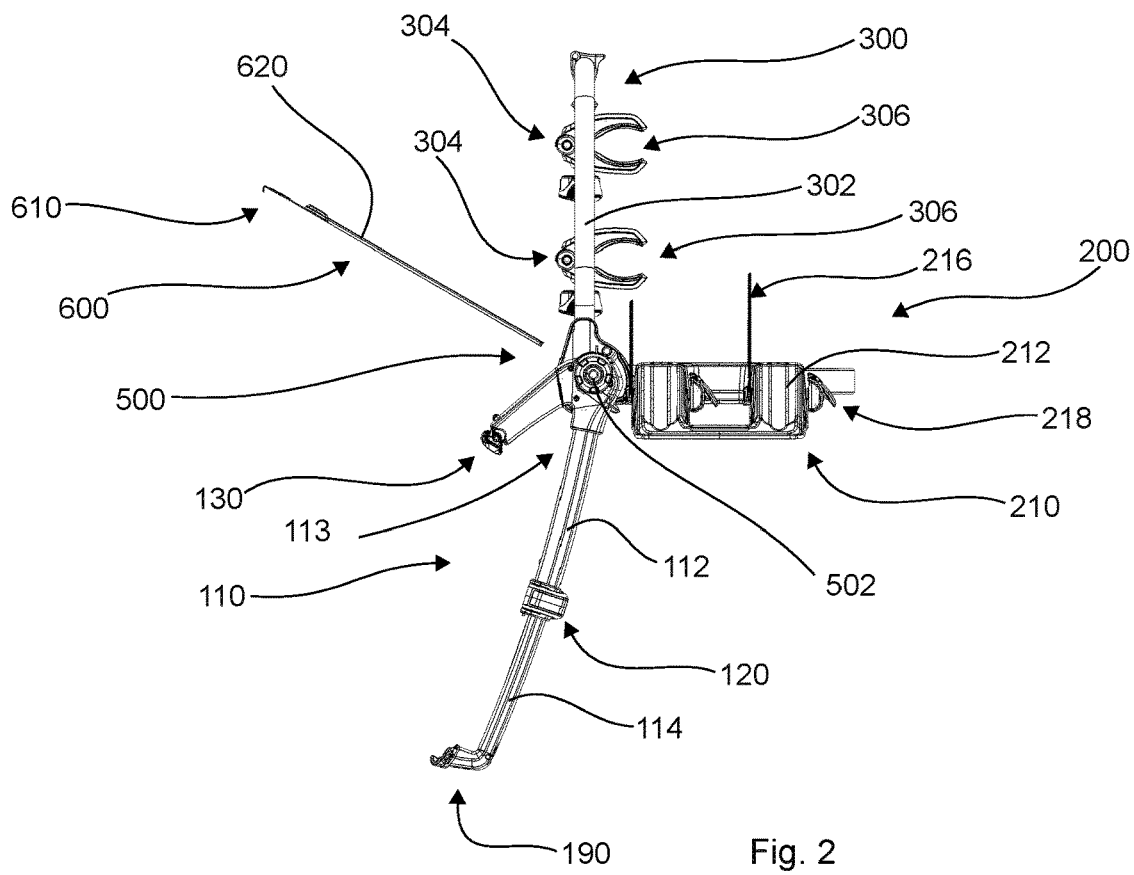
Figure 3:
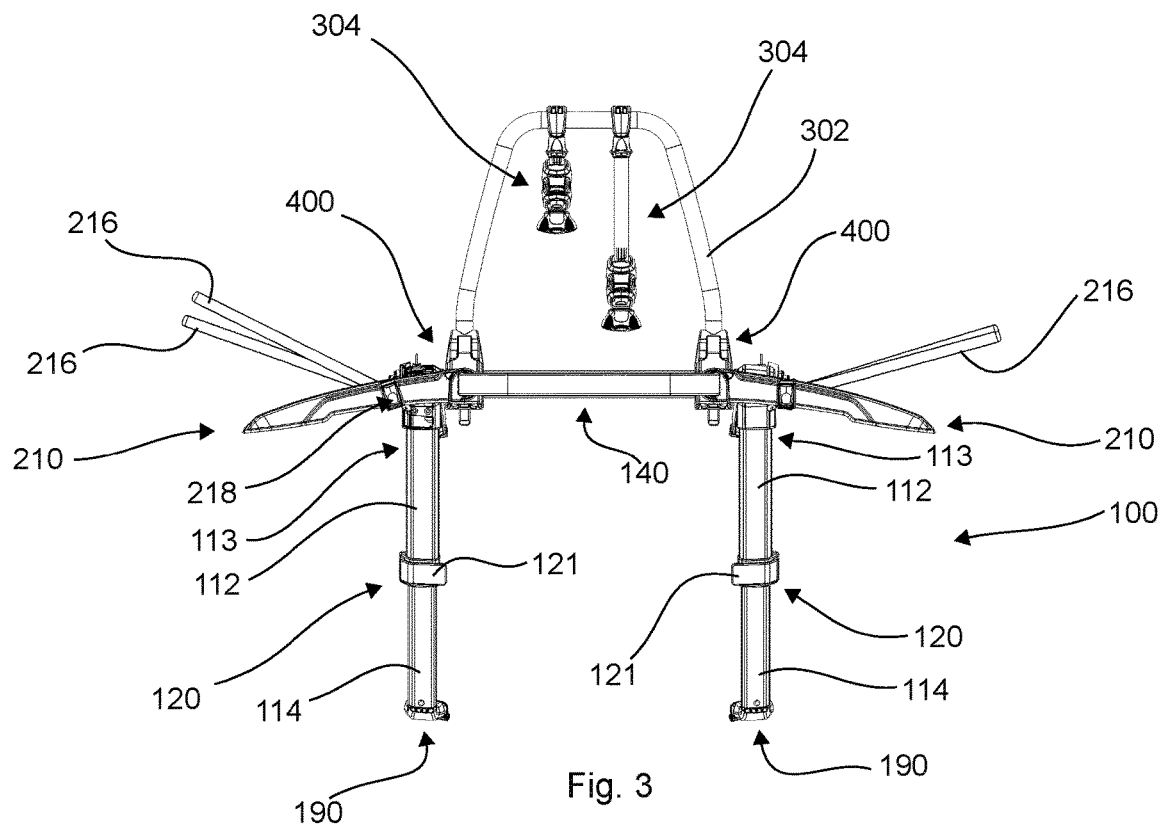
Figure 4:
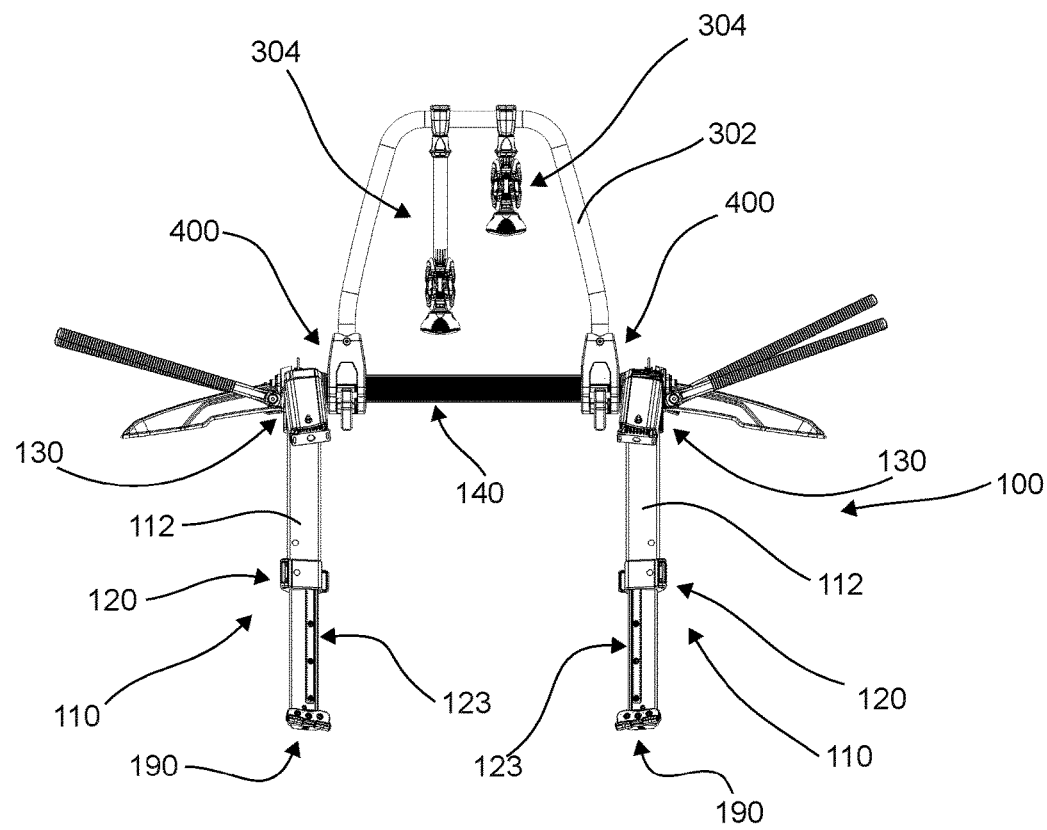
Figure 5:
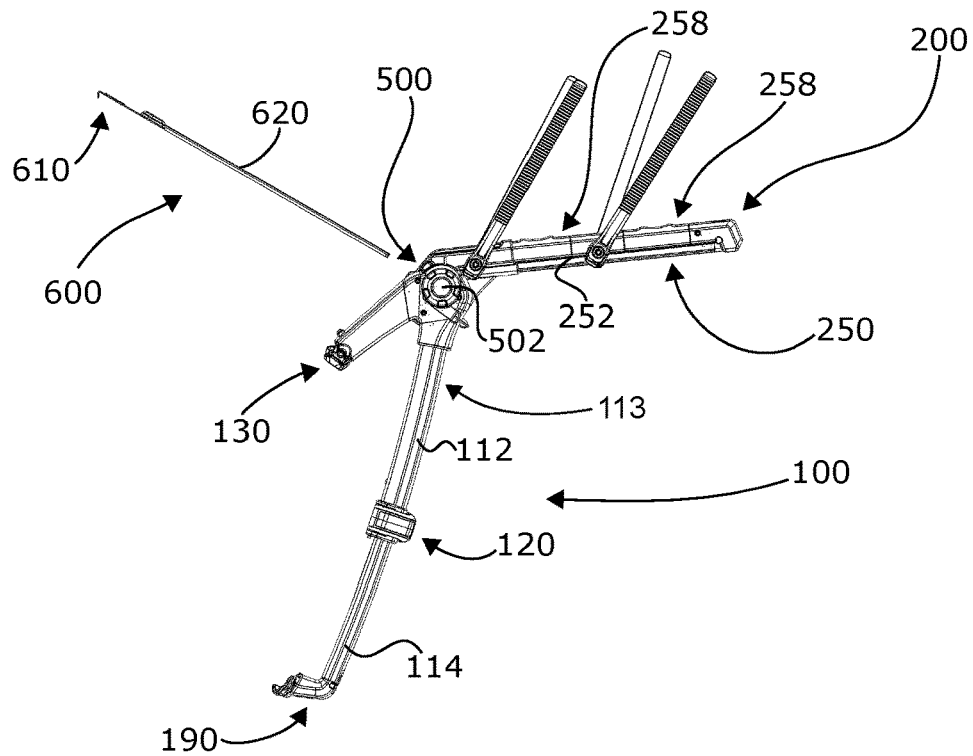
FIGS. 5 and 6 show a load carrier of a different kind also making use of features of different aspects and embodiments of the present disclosure.
Figure 6:
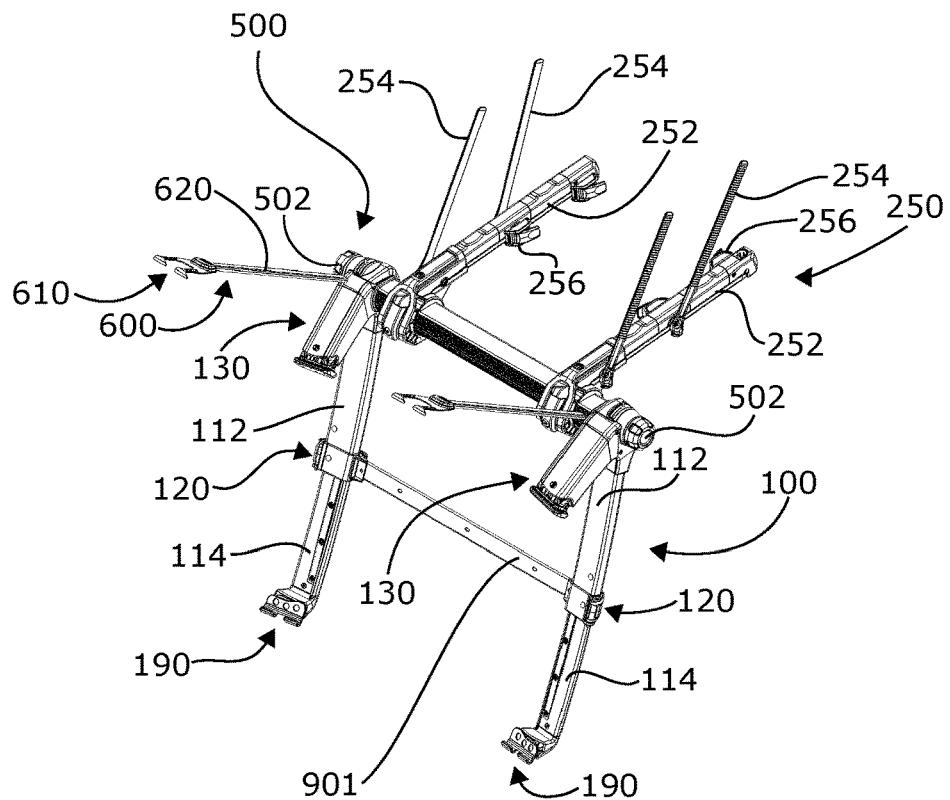

Alternatively or in addition, the load carriers 1 as shown in FIGS. 1 to 6 may comprise a tightening mechanism 500 for tightening the load carrier 1 on a vehicle. As is indicated in FIGS. 2, 5 and 6, each load carrier 1 can comprise at least one attachment device 600, preferably two or more attachment devices 600 for coupling the load carrier 1 to an upper portion of a vehicle, preferably to an upper portion of a trunk lid of the vehicle. The attachment device 600 may comprise an engagement device 610 which according to the embodiment may be a hook. Each engagement device 610 may be coupled to the tightening mechanism 500 by means of a force transfer member 620. The force transfer member 620 may be embodied as a flexible elongate member and in particular as a strap or wire. Accordingly, the force transfer member 620 is coupled to an engagement device 610 at one end and is coupled to the tightening mechanism 500 at the other end.

The tightening mechanism 500 is configured to apply a tightening force on the force transfer member 620 to retract the same for securely engaging the engagement device 610 on a desired portion of the vehicle. In the present embodiment, the tightening mechanism 500 is partially provided within the base frame 100 as described herein. As is shown in FIGS. 2, 5 and 6, the tightening mechanism may comprise an operating member 502. In the shown embodiment, the operating member 502 is embodied as a rotatable knob but may be embodied in different ways, for example as a pivoting element such as a lever. The tightening mechanism 500 will now be described in detail with reference to FIGS. 17 to 29.

Figure 17:
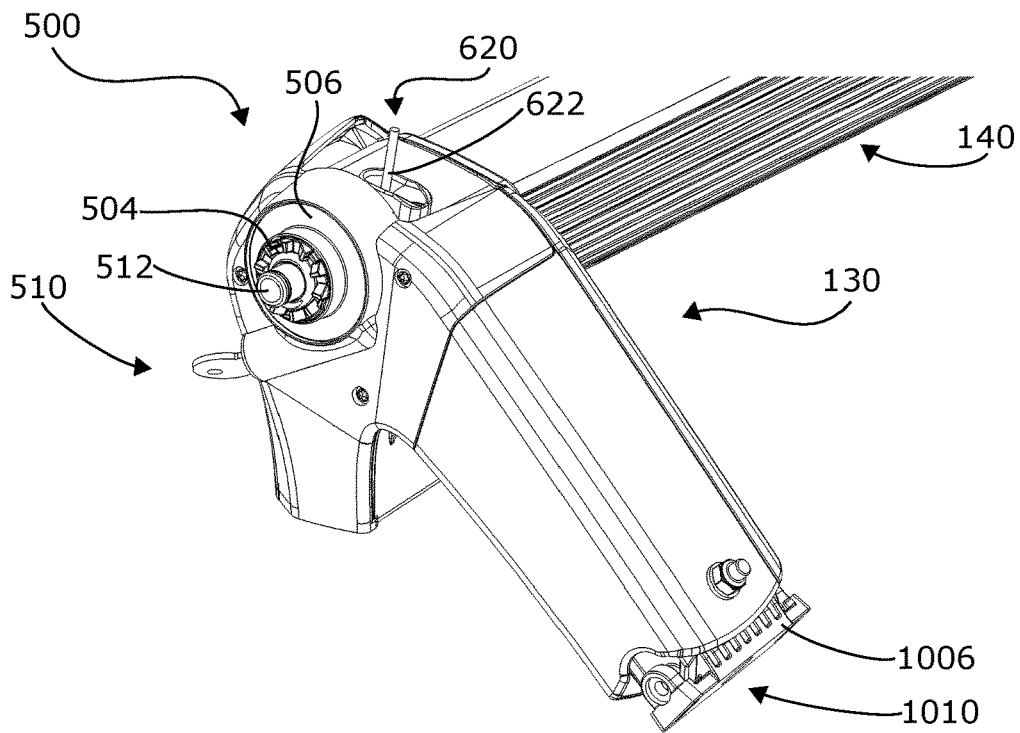
FIGS. 17 and 18 show perspective views of details of a tightening mechanism which may be used in load carriers according to aspects and embodiments described herein.
Figure 18:
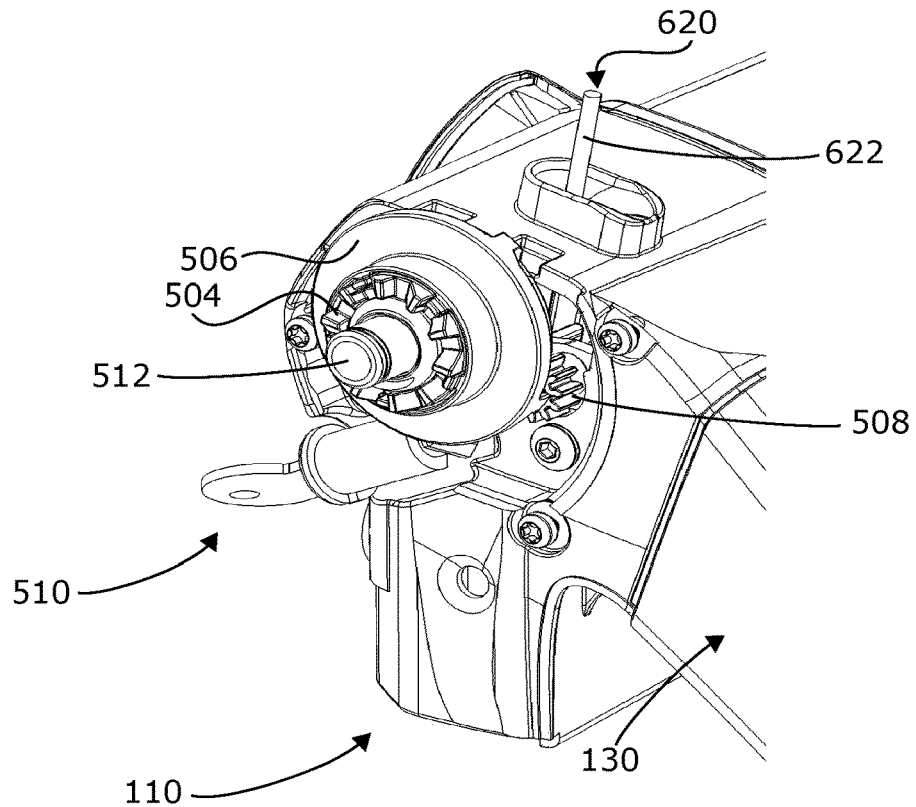

In FIG. 17, a perspective view of an upper end portion of the base frame 100 is shown. The beforementioned operating member 502 is removed from this view in order to give view on further elements of the tightening mechanism 500 normally covered by the operating member 502. The operating member 502 is rotatable about a rotational axis 512 which is defined by a bolt and comprises an engaging surface which normally engages with protrusions provided on an axial surface of an element of a torque limiter 504. The element of the torque limiter 504 is urged towards the operating member 502 and is engaged therewith by means of a toothed section. A force transfer element 506 is integrally rotatably mounted on the element of the torque limiter 504 such that the element of the torque limiter 504 is axially displaceable in the force transfer element 506. In case a torque exceeding a specific torque value determined by the force of the urging member urging the element of the torque limiter 504 towards the operating member 502 is applied, the element of the torque limiter 504 translates along the rotational axis 512 in a direction away from the operating member 502 such that a force transfer between the operating member 502 and the element of the torque limiter 504 is interrupted. Consequently, in this state, a torque is no longer transferred from the operating member 502 to the element of the torque limiter 504 and thus not transferred to the force transfer element 506. In this way, a torque limiting mechanism may be applied if desired. Furthermore, a key operated locking mechanism 510 is provided allowing the user to lock a rotation of the force transfer member 506 for securing the load carrier on the vehicle.

Figure 19:
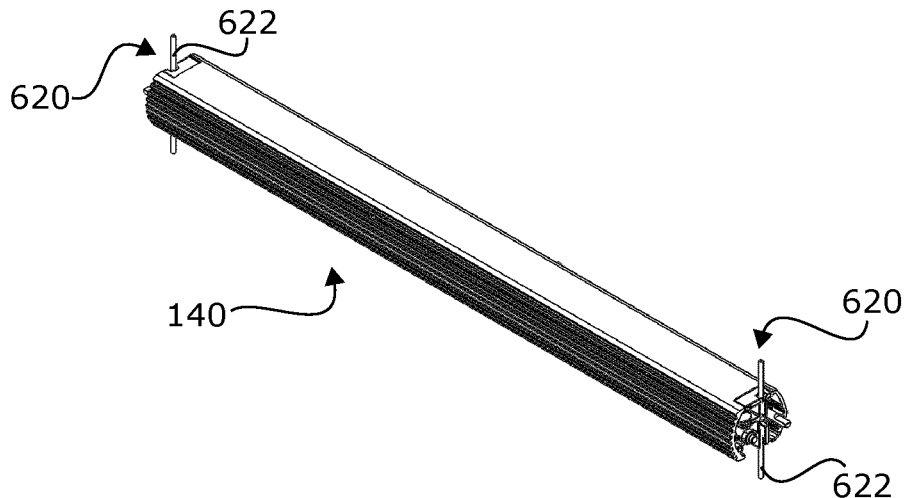
FIG. 19 shows a perspective view of a cross beam as well as elements of an attachment device partially accommodated in the cross beam.
Figure 20:
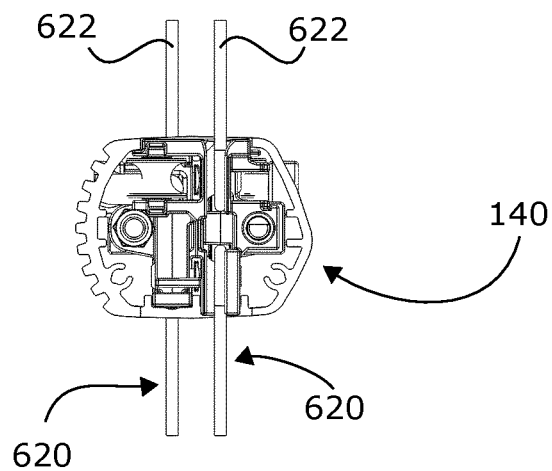
FIG. 20 shows a cross section of the cross beam of FIG. 19.
Figure 22:
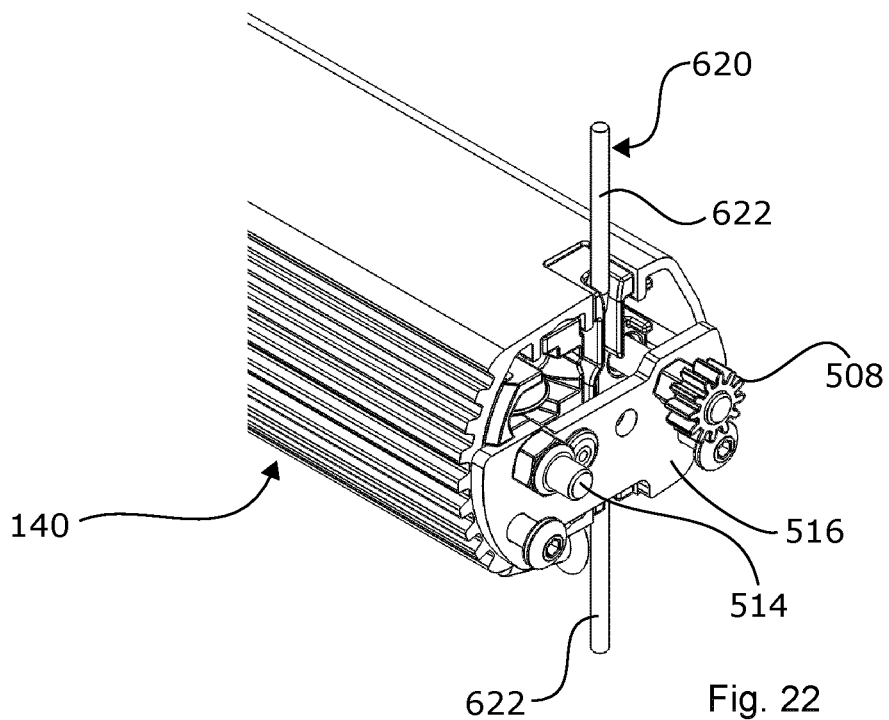
FIG. 22 shows an end portion of the cross beam of FIG. 19 with further details of the tightening mechanism.
Figure 23:
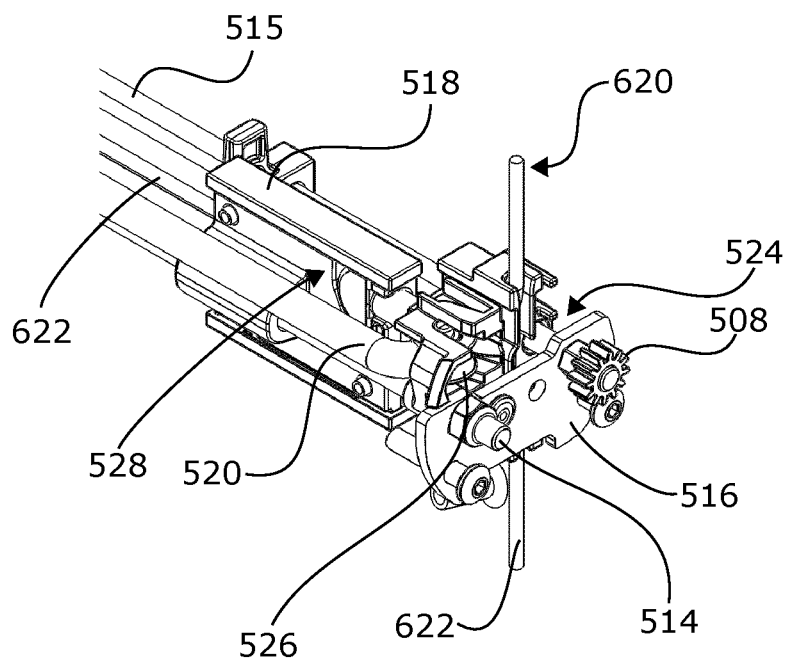
FIG. 23 shows a perspective view of elements of the tightening mechanism.
Figure 24:
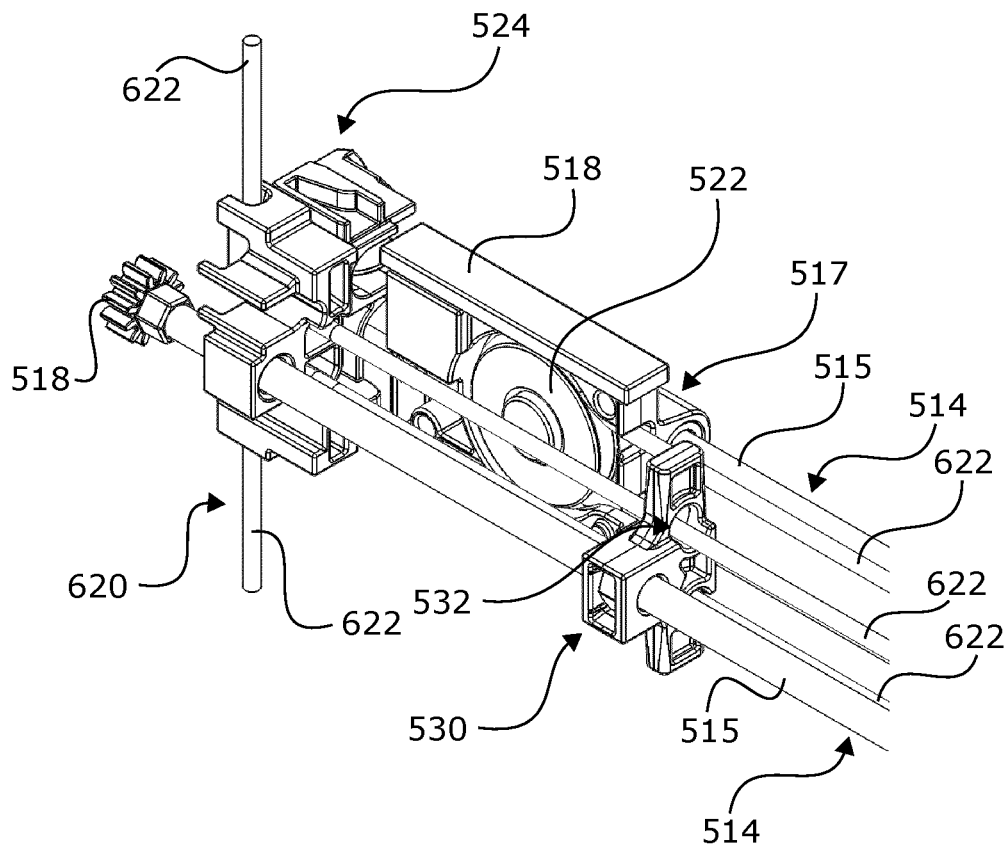
FIGS. 24 and 25 show perspective views of elements of the tightening mechanism on opposite sides of the cross beam.
Figure 25:
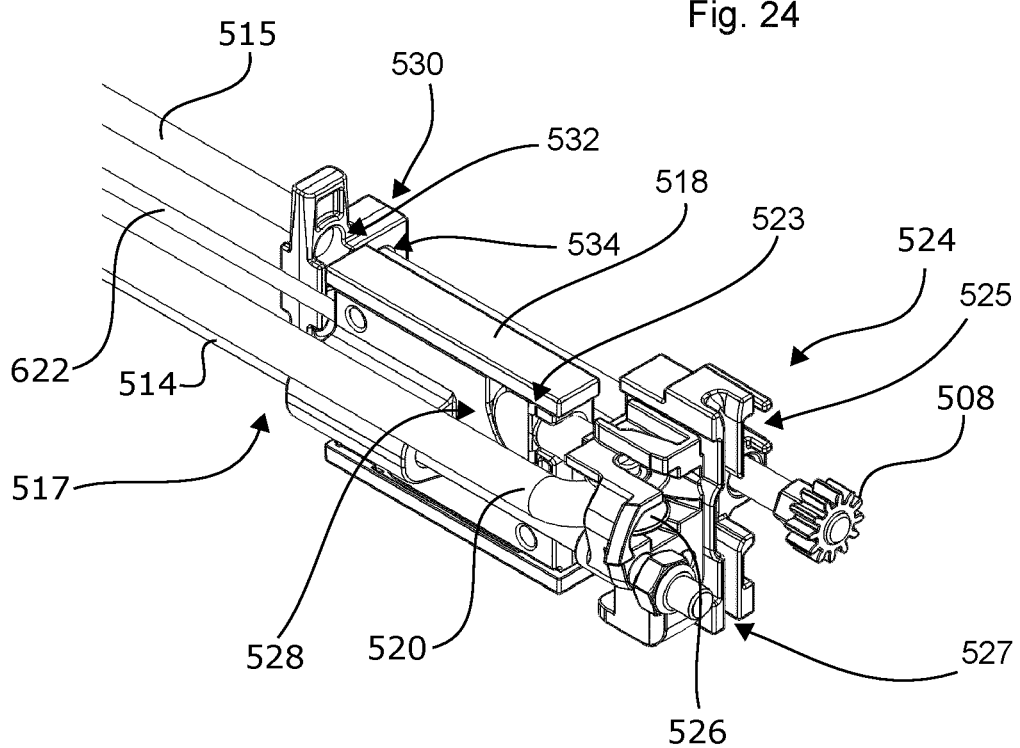

The tightening mechanism 500 further comprises a driven member 508 exemplary embodied as a driven gear 508 in the present configuration. The driven member 508 is operatively connected to the force transfer element 506 so that a rotation of the force transfer element 506 leads to a rotation of the driven member 508. The driven member 508 is coupled to a driving member 514 for driving an actuator 530 which will be described later in greater detail. In the present embodiment, the driving member 514 is exemplary embodied as a threaded rod 515 and is shown in FIGS. 24 and 25 for instance. A rotation of the driven member 508 leads to a rotation of the driving member 514. The driving member 514 is supported on both ends of the cross beam 140 by means of a support 516. The support is shown in FIGS. 22 and 23 and is embodied as a supporting plate 516 which is threaded on the longitudinal end of the cross beam 140. As can already be gathered from FIGS. 22 and 23, the shown configuration comprises two driving members 514 which are arranged parallel with respect to each other and both extend through the cross beam 140. This is due to the fact that in the embodiment shown, two tightening mechanisms 500 are provided, one on each longitudinal end of the cross beam 140. FIG. 19 shows a perspective view of a cross beam 140 which is provided with two force transfer members 620 extending from the cross beam 140 on opposite longitudinal ends. Each of the force transfer members 620 comprises a flexible elongate member 622 embodied as a wire. FIG. 20 shows a side view of the cross beam 140 of FIG. 19 and it is clearly visible that the force transfer member 620 is provided on opposite sides in such a manner that a portion of the flexible elongate member 622 extends from the upper side of the cross beam 140 and another portion of the flexible elongate member 622 extends from a lower portion of the cross beam 140. Each of the portions may be coupled to an engagement device 610.

A beneficial feature of the tightening mechanism 500 resides in the fact that the tightening mechanism 500 is able to retract a force transfer member 620, in particular the flexible elongate member 622 into a frame member of the load carrier for tightening and storing the same. In the embodiment as shown, the tightening mechanism 500 is configured to retract the flexible elongate member 622 into the cross beam 140. However, it is to be noted that other frame members may also be suitably used for retracting the flexible elongate member 622 into the same. For example, it is possible to provide the tightening mechanism such that the flexible elongate member 622 is retracted into one of the lower vehicle support portions 110. In general, it is possible to use any available elongate frame member for accommodating the flexible elongate member 620 therein.

Although two tightening mechanisms 500 are shown in some of the embodiments, it is to be noted that only a single tightening mechanism 500 operating only a single flexible elongate member may be provided. On the other hand, it is possible to provide more than two tightening mechanisms and more than two flexible elongate members for fixing the load carriers on a vehicle. Furthermore, although it is shown that the flexible elongate member 622 may extend from an upper portion and a lower portion of the cross beam 140 and may in general extend from different sides of a frame member acting as an accommodating member for the flexible elongate member, it is possible to provide a mechanism in which the flexible elongate member only extends from one side. The flexible elongate member 622 only extending from one side of the cross beam may be connected to a single engagement device 610 as shown in FIG. 2 for instance. In case of a configuration as shown in FIG. 20, it is possible to connect the upper portion of the flexible elongate member 622 extending from an upper side of the cross beam 140 with the engagement device 610 and to couple the lower portion of the flexible elongate member 622 extending from the lower side of the cross beam 140 with a further engagement device which may be attached to a further portion of the vehicle for tightening purposes. The further engagement device may be configured in the same way as the engagement device 610. Accordingly, a one-point fixation may be provided at the end portions of the cross beam 140 by means of a corresponding flexible elongate member 622 or a two-point attachment may be provided on each side by providing two portions of the flexible elongate member 622 extending out of the cross beam 140 at different positions.

Figure 21:
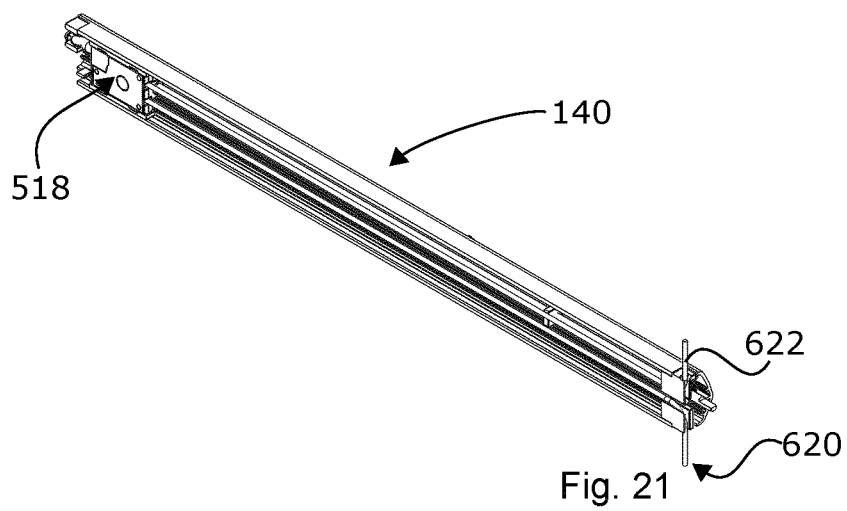
FIG. 21 shows a longitudinal section of the cross beam of FIG. 19.

Each flexible elongate member 622 is retracted into the frame member, preferably the cross beam 140, in a manner such that it partially extends within the frame member, for example the cross beam 140 in a longitudinal extension direction of the frame member. In order to retract the flexible elongate member 622 into the frame member, the tightening mechanism 500 comprises a pulling device 518 which is accommodated in the frame member, for example the cross beam 140, preferably accommodated so as to be movable along a longitudinal extension direction of the cross beam 140 and connected to the flexible elongate member 622. Such a configuration is shown in FIG. 21 for retracting the flexible elongate member 622 on one side. Although not shown, the configuration of the tightening mechanism for retracting the flexible elongate member 622 on the opposite side is configured in the same way as described with respect to the single tightening mechanism for tightening one of the flexible elongate members 622.

In the present embodiment, two flexible elongate members 622 each of them coupled to an engagement device 610 at an upper portion thereof and coupled to a further engagement device (not shown) at the lower portion thereof is provided at each longitudinal end of the cross beam 140. Each flexible elongate member 622 is guided into the interior of the cross beam 140 through openings formed in the cross beam 140 and by means of a deflection mechanism 524. The deflection mechanism 524 is configured to change the extension direction of the flexible elongate member 622. In the present embodiment, the extension direction of the flexible elongate member 622 is changed so as to be aligned with a longitudinal direction of the cross beam 140. The deflection mechanism 524 is visible in FIGS. 24 and 25. The deflection mechanism 524 comprises a member which is stationary held in the end portion of the cross beam 140. The deflection mechanism 524 comprises guiding recesses 525, 527 following a curved path to change the extension direction of the flexible elongate member 622. More precisely, the deflection mechanism 524 comprises an upper guiding recess 525 for guiding an upper portion of the flexible elongate member 622 along the longitudinal extension direction of the cross beam 140 and a lower guiding recess 527 to change the direction of a lower portion of the flexible elongate member 622 to a longitudinal extension direction of the cross beam 140. Each pulling device 518 comprises a pulley 522 contacting a section of the flexible elongate member 622. In the embodiment, the flexible elongate member 622 is wound around the pulley 522 such that the flexible elongate member 622 remains movable relative to the pulling device 518 even when a pulling force is applied on the flexible elongate member 622 by the pulling device 518. Accordingly, a pulling force applied on the flexible elongate member 622 by the pulling device 518 is equally transferred to end portions of the flexible elongate member 622. It is, however, also possible to fix the flexible elongate member 622 on the pulling device 518 in a different manner. For example, the flexible elongate member may be fixedly and immovably coupled to the pulling device 518. Furthermore, in case the flexible elongate member 622 only extends from one side of the cross beam 140 and is only configured to be coupled to a single engagement device 610, the flexible elongate member 622 may also be fixedly coupled to the pulling device 518.

Figure 26:
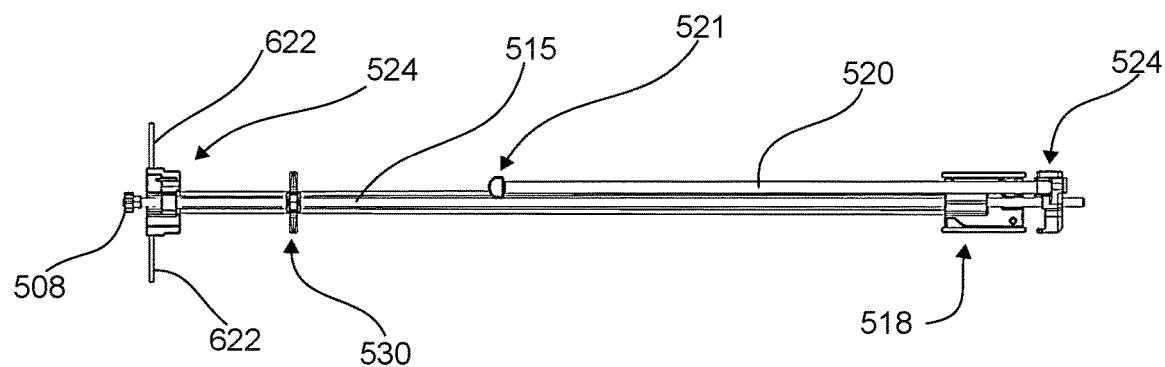
FIGS. 26 to 29 show different states of components of the tightening mechanism during a mounting process of a load carrier with such a tightening mechanism on a vehicle.
Figure 27:
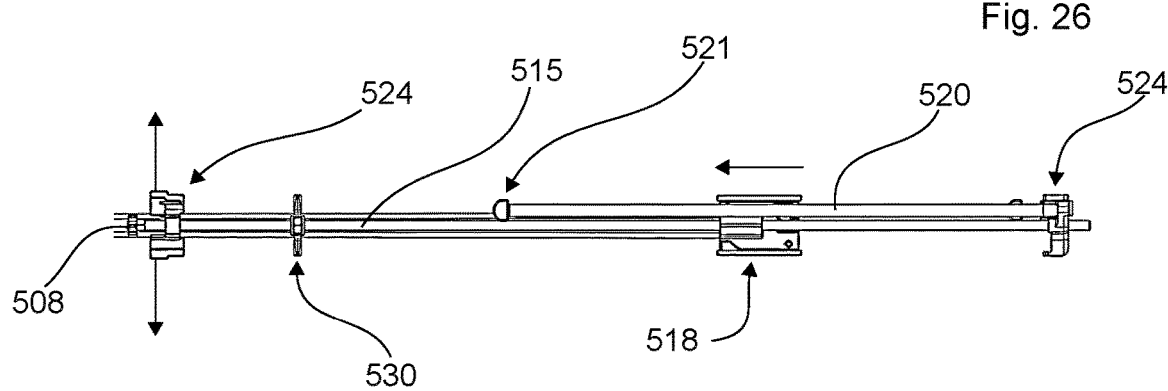

The pulling device 518 is pre-biased in retraction direction by means of a spring 520. In the present embodiment, the retraction direction corresponds to a direction facing away from an end portion of the cross beam 140 where the flexible elongate member 622 enters the cross beam 140. The spring 520 is coupled to one end portion of the cross beam 140, for example to the deflection mechanism 524 at a first end portion 521. In this connection, it is to be noted that in some drawings, the first end portion 521 is shown as being located substantially in the middle between the end portions of the cross beam 140, that is substantially in the middle between two deflection mechanisms 524. While it is possible to couple the first end portion 521 at different suitable portions of the cross beam 140, it is preferable that the first end portion 521 is coupled to the deflection mechanism 524 at which the flexible elongate member 622 enters the cross beam 140. A second end portion 523 of the spring 520 is coupled to the pulling device at a coupling portion 528. The spring 520 may further be deflected by means of a deflection pulley 526 provided in an opposite deflection mechanism 524 or rotatably coupled to an end portion of the cross beam 140 in a different manner in order to reverse the extension direction of the spring 520. In this way, an urging member may be arranged within the cross beam 140 which is able to apply a pulling force on the pulling device 518 in a desired manner. As is shown in FIGS. 24 and 25, the pulling device 518 may comprise a guiding section 517 which encompasses the driving member 514. Accordingly, the pulling device 518 may be guided along the driving member 514 in the present embodiment. The function of the tightening mechanism 500 will be described in greater detail with respect to FIGS. 26 to 29. FIG. 26 shows a condition in which the flexible elongate member 622 is retracted into the cross beam 140 to the greatest possible extent. This state is characterized in that the pulling device 518 is pulled to an end position shown on the right side in FIG. 26 by means of the spring 520. Such a state may also be referred to as storing state. This state has the benefit that the main portion of the flexible elongate member 622 is accommodated within the cross beam 140 to a great extent. Starting out from the state as shown and described with respect to FIG. 26, a user can pull out the upper portion and the lower portion of the flexible elongate member 622 in order to engage available engagement devices, for example the engagement device 610, with a corresponding portion on the vehicle. This process is indicated in FIG. 27 by arrows showing that an end or both ends of the flexible elongate member 622 are pulled out. Pulling out the flexible elongate member 622 takes place against a spring force of the spring 520. More precisely, for pulling out the end portions of the flexible elongate member 622, the pulling device 518 has to be moved towards the end of the cross beam 140 at which the flexible elongate member 622 is pulled out against an urging force or retracting force of the spring 520. In this state, it is noted that the spring force is chosen such that it allows a user to pull out the flexible elongate member 622 in a convenient manner but is high enough to retract the flexible elongate member 622.

Figure 28:
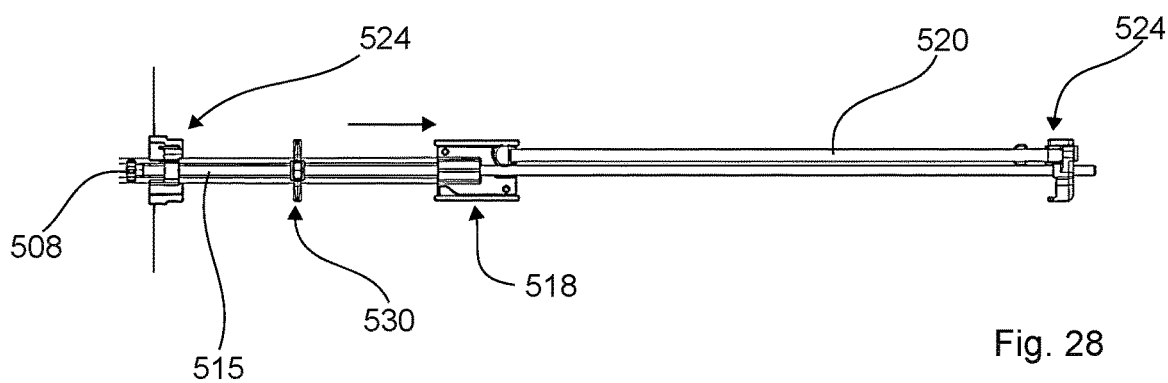

As soon as the end portions of the flexible elongate member 622 are coupled to the desired mounting portions on the vehicle, the spring force of the spring 520 urges the pulling device 518 in retraction direction up to a position in which the tightening force in the flexible elongate member 622 and the force originating from the spring 520 are balanced. This state is shown in FIG. 28. Accordingly, a condition is reached in which the flexible elongate member 622 is pre-biased by the urging force of the spring 520. In this condition, any engagement device provided at an end portion of the flexible elongate member 622 is securely held on corresponding desired portions on the vehicle.

Figure 29:
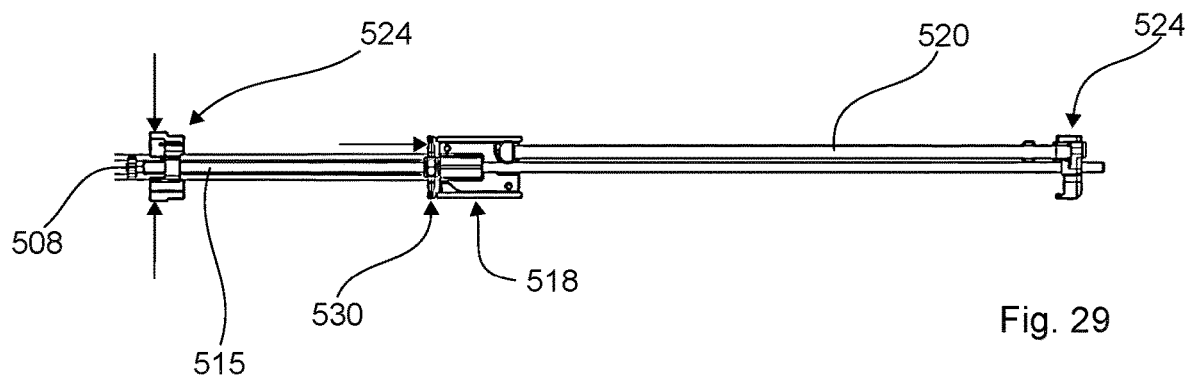

For final tightening the engagement device by means of the tightening mechanism 500, an actuator 530 is provided which may also be referred to as position element. The actuator 530 is operatively coupled to the driving member 514 and comprises openings 532 for passing the flexible elongate member 622 therethrough. In the present embodiment, the driving member 514 is embodied as a threaded rod 515 and the actuator 530 comprises an engaging portion 534 cooperating with the threaded rod 515 so that the engaging portion 534 acts as a nut. Due to that configuration, the actuator 530 is displaced along an extension direction of the cross beam 140 when the driving member 514 is rotated. As is shown in FIG. 29, the actuator 530 may be moved towards the pulling device 518 in the retraction direction. As soon as a contact is established between the actuator 530 and the pulling device 518, a force is applied on the pulling device 518 and a further movement of the actuator 530 generated by rotating the threaded rod 515 applies a tightening force on the pulling device 518 in addition to the urging force already acting on the pulling device 518. In this way, the pulling device 518 may be further moved in retraction direction such that a tightening force in the flexible elongate member 622 is increased. As soon as a tightened state is reached, the driving member 514 or the operating member 502 may be locked in position in order to prevent any movement of the actuator 530 in release direction.

When the load carrier is to be dismounted from the vehicle, the actuator 530 is moved away from the state as shown in FIG. 29 into a position allowing a movement of the pulling device 518 just enough to allow a disengagement of any engagement device provided on end portions of the flexible elongate member 622. In other words, the actuator 530 only needs to be moved to a specific position for a specific vehicle allowing a disengagement of any engagement device. In this way, a repeated mounting and dismounting of a load carrier using such a tightening mechanism is enhanced.

Figure 66:
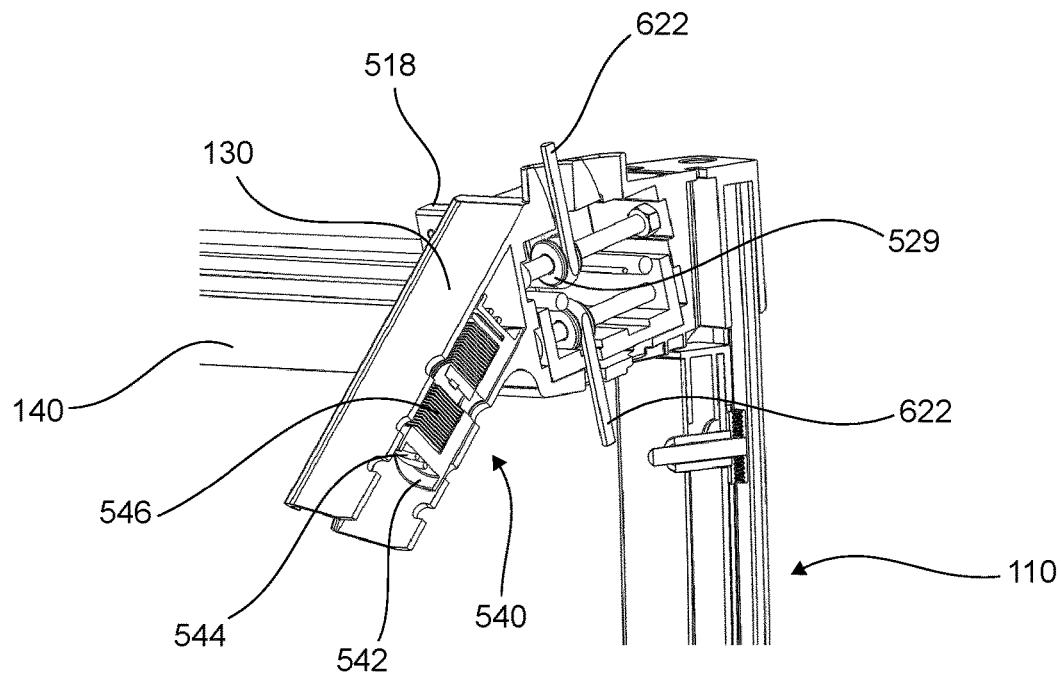
FIGS. 66 and 67 show details of a modification of the configuration as described with respect to FIGS. 17 to 29.
Figure 67:
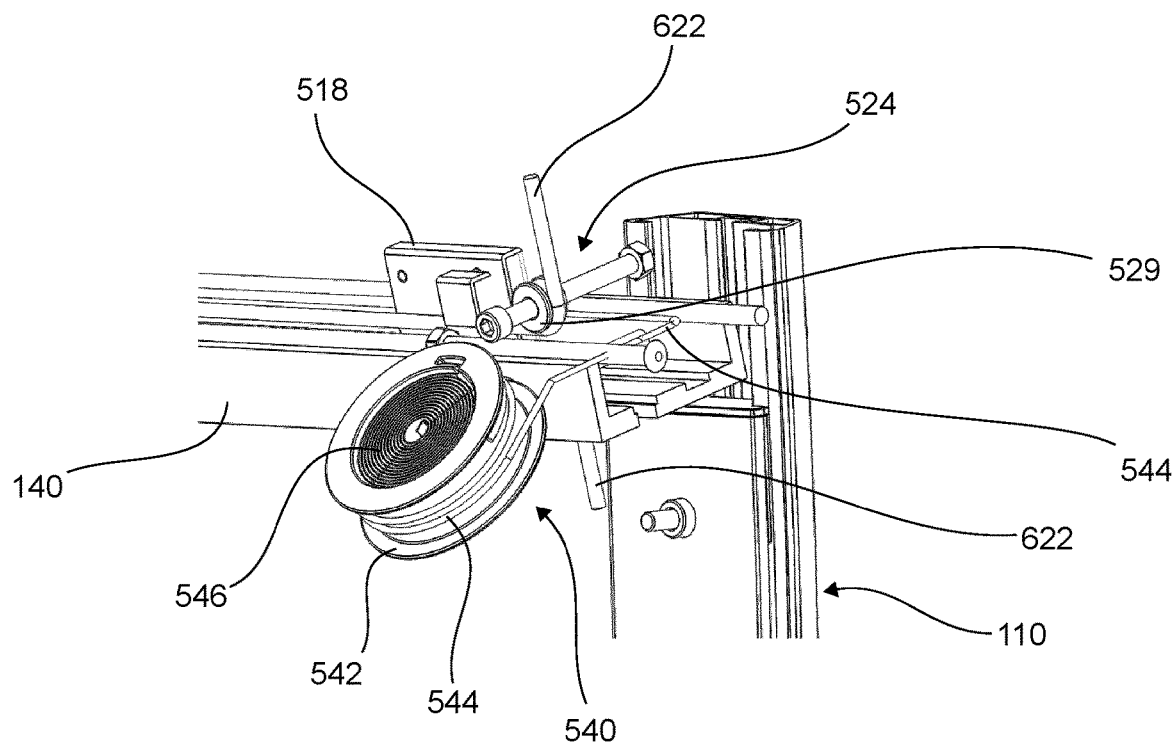

It is noted that instead of the above-mentioned configuration, the pulling device 518 may be pre-biased in retraction direction by means of a biasing mechanism 540 as shown in FIGS. 66 and 67. The biasing mechanism 540 may comprise a spring-loaded spool 542.

The spool 542 is configured to wind up a force transfer member, a wire 544 in the present configuration, and is pre-biased by a spiral spring 546 in a direction of rotation for winding up the force transfer member. The wire 544 is coupled to the pulling device 518 to pull the same in retraction direction. In the embodiment, the biasing mechanism 540 is accommodated in the upper vehicle support 130 but may also be arranged in a different location, for example in the lower vehicle support portion 110. As is also shown in FIGS. 66 and 67, the deflection mechanism 524 for changing the extension direction of the flexible elongate member 622 may comprise one or more pulleys 529 guiding the flexible elongate member 622 towards the pulling device 518 instead of guiding grooves.

A further aspect generally usable with different kinds of load carriers will be described with reference to FIGS. 30 to 35. This aspect relates to a configuration in which elements of the load carrier are movable between a use position and a non-use position. For load carriers, it may be desired that such elements may be pivotably rotatable between both positions. It may be beneficial if the rotation of such elements is at least limited such that the element may be held in the use position. A configuration for pivotably holding a load support, for example a wheel support of a bike carrier, is provided, which is configured to be provided on different types of load carriers, for example a rear mounted load carrier such as a bike carrier as shown in FIG. 1 to FIG. 6.

Figure 30:
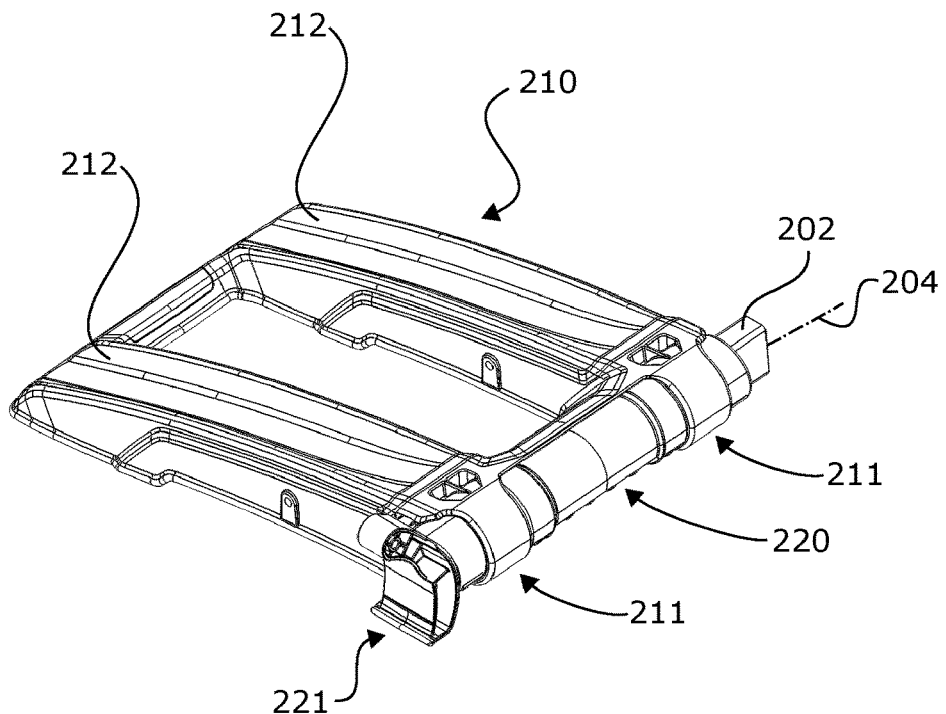
FIG. 30 shows a perspective view of an arrangement for pivotably supporting a load support.
Figure 34:
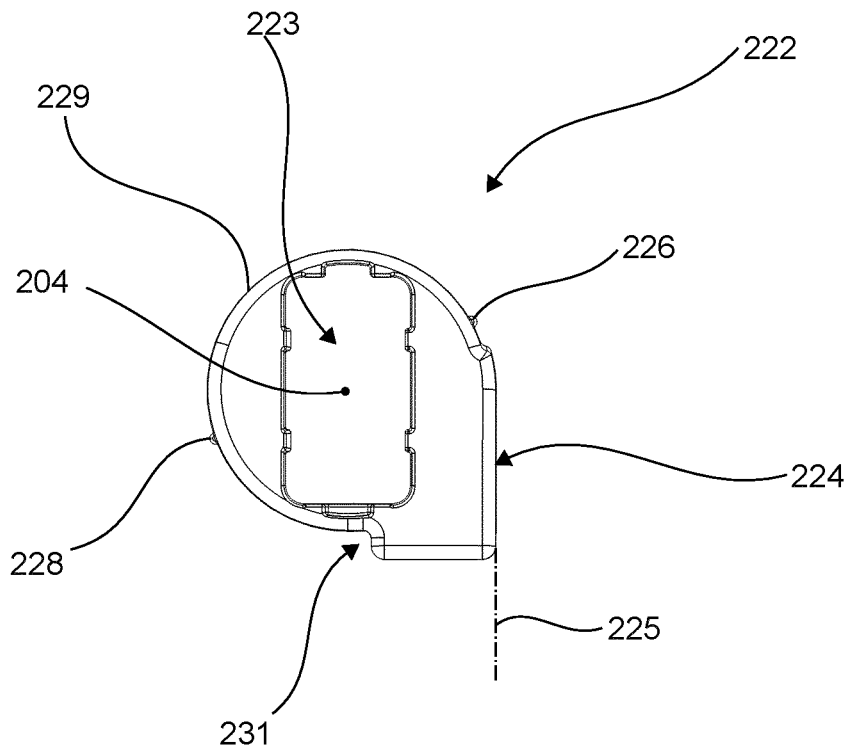
FIG. 34 shows a view of an abutment portion of the coupling device of FIG. 33.
Figure 35:
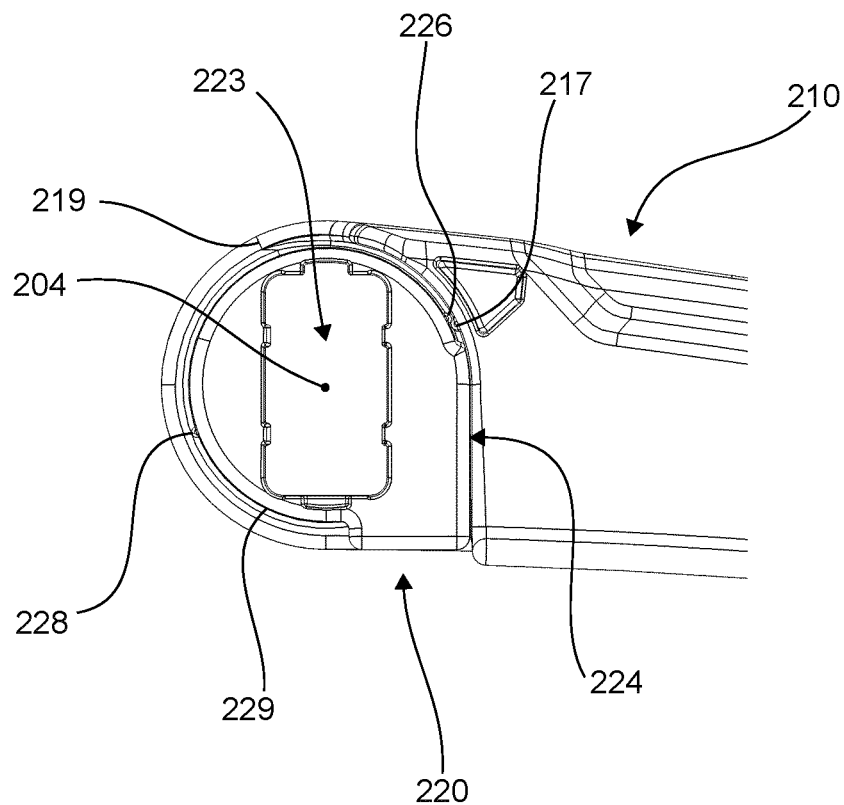
FIG. 35 shows the abutment portion of FIG. 34 together with an abutment portion provided on the load support of FIG. 32.

The configuration or system may comprise a coupling device 220 for rotatably supporting a load support 210 which in the present configuration is exemplary embodied as wheel support of a bike carrier. The wheel supports comprise wheel trays 212 each configured to receive and support portions of wheels of a bike. Furthermore, a fixation device 214 is provided which in this configuration is exemplary embodied as a combination of a strap 216, for example a toothed strap, for example a metal wire reinforced toothed strap, and a receiver 218, preferably a buckle, in particular a pump buckle for receiving and locking the strap 216. As is shown in FIG. 30 the load support 210 is pivotably mounted on the coupling device 220 about a pivot axis 204 defined by the coupling device 220. The coupling device 220 is configured to be mounted on a supporting frame 202. In particular, the coupling device 220 may be configured to receive an end portion of a supporting frame 202 in an accommodating space 223 as shown in FIGS. 34 and 35. The coupling device 220 may further comprise a coupling portion 221 configured to mount the coupling device 220 to an element of a load carrier 1, for example to the cross beam 140 of a load carrier shown in FIGS. 1 to 6. The coupling portion 221 may be configured to be directly coupled to the cross beam 140 or may be configured to be coupled to a coupling device 400 comprising a holder 401. In particular, the coupling portion 221 may be configured such that the coupling device 220 may be mounted to such a holder 401 pivotably about an axis which is parallel to an extension direction of the cross beam 140. Although the coupling device 220 is shown as a separate member which may receive an end portion of a supporting frame 202, it is also possible to provide the features of the coupling device 220 directly on an end portion of the supporting frame 202 and to couple the supporting frame 202 to further elements of a load carrier, for example to the cross beam 140. In the present configuration, the supporting frame 202 is configured to couple two coupling devices 220 to each other, as can be seen in FIG. 31.

Figure 31:
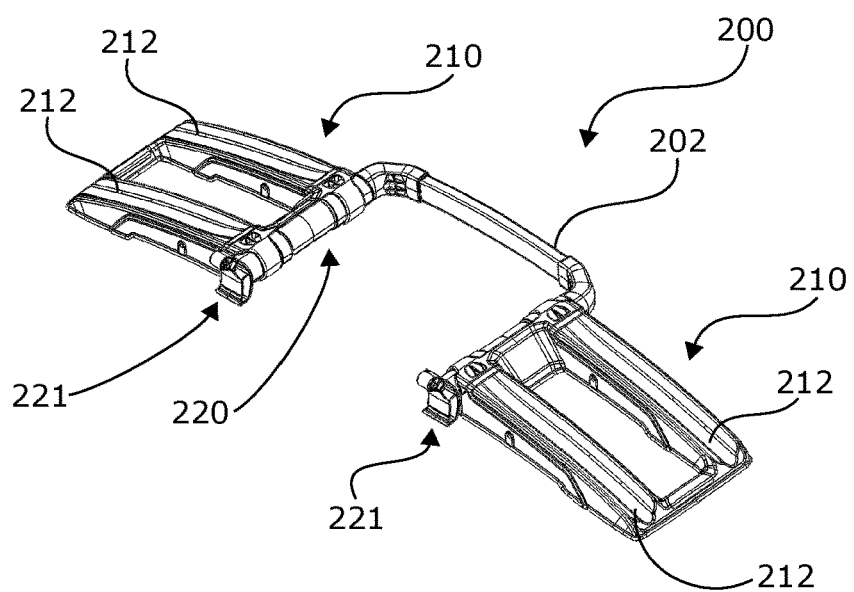
FIG. 31 shows a perspective view of a load support arrangement comprising two load supports pivotably supported according to the configuration of FIG. 30.

FIG. 31 shows a load support arrangement 200 for supporting bikes thereon. The load support arrangement 200 comprises two coupling devices 220 coupled to each other by means of a substantially U-shaped supporting frame 202. Each coupling device 220 is mounted on the supporting frame 202 such that their coupling portions 221 are arranged facing away from the supporting frame 202 and are configured to be mounted to a base frame 100 of a load carrier 1. The load support arrangement 200 comprises two load supports 210 which are configured as wheel supports in the present embodiment. The wheel supports comprise wheel trays 212 each configured to receive and support portions of wheels of a bike. Each load support 210 is pivotable about the respective coupling device 220.

The configuration of the coupling device 220 will be described in greater detail with respect to FIGS. 33 and 34. In addition to the features already described, the coupling device 220 may comprise a supporting portion 230 which is configured to rotatably support a mating portion of the load support 210 thereon. The supporting portion 230 is configured as a cylindrical portion having a supporting surface 232 being configured as a cylindrical outer surface. The supporting surface 232 is configured to be in contact with a supporting surface 215 provided in a guiding portion 211 of the load support 210. The guiding portion 211 is visible in FIG. 32. Accordingly, the cooperation of the guiding portion 211 and the supporting portion 230 may define a sliding bearing allowing to pivotably support the load support 210 about the coupling device 220. In order to limit a movement of the load support 210 about the coupling device 220, the coupling device 220 comprises an abutment portion 222 providing an abutment surface 224. The abutment surface 224 defines an end position of the load support 210 in a use position.

Figure 32:
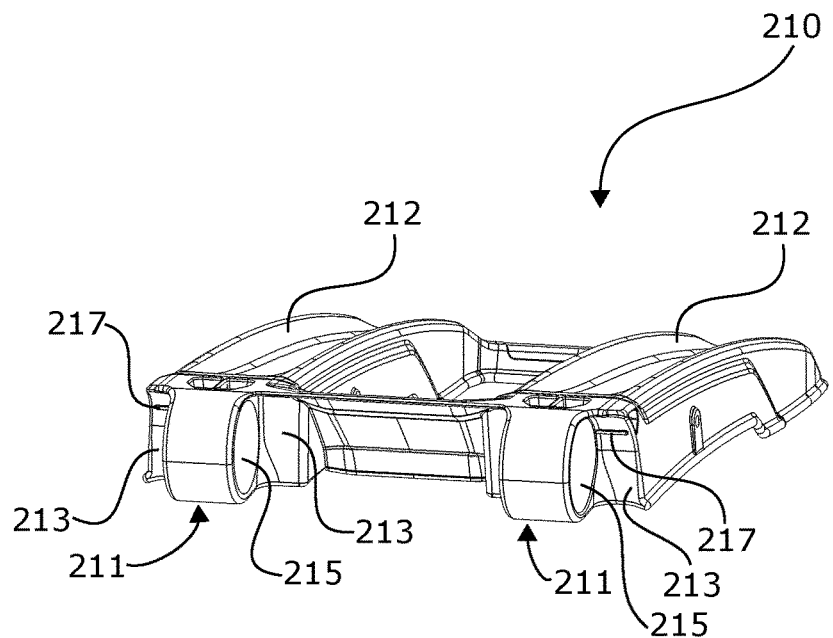
FIG. 32 shows a further perspective view of a load support.
Figure 33:
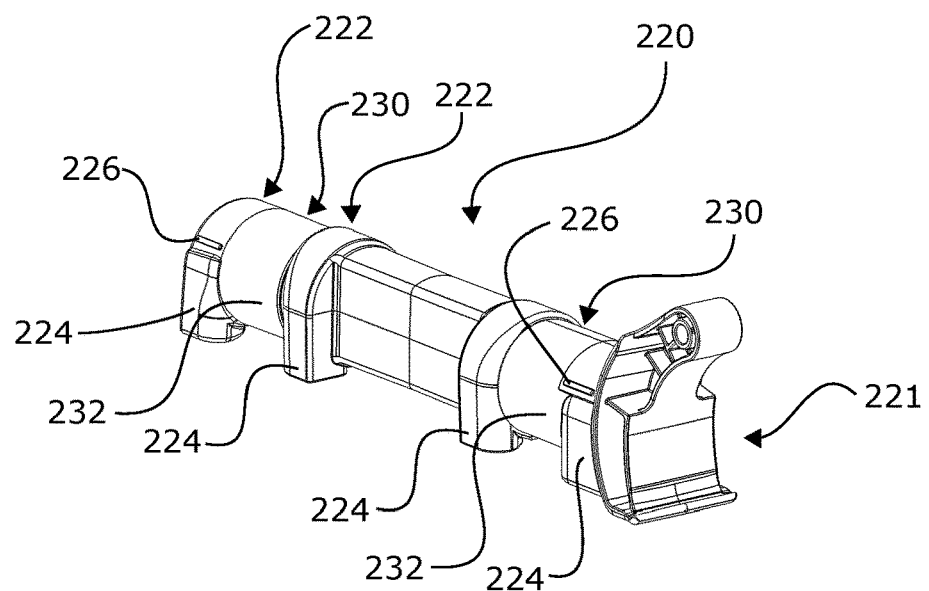
FIG. 33 shows a coupling device configured to a pivotably support the load support of FIG. 32.

As is shown in FIG. 33, the abutment surface faces away from the pivot axis 204. In the present configuration, the abutment surface 224 extends along a plane 225 which is arranged substantially parallel to the pivot axis 204 as is shown in FIG. 34. In this way, the coupling device 220, in particular the abutment portion 222 provides a stopping portion which is defined by a portion rendering the abutment portion 222 non-round. Accordingly, the abutment portion 222 provides a protrusion on an outer circumferential portion of the coupling device 220 defining an abutment surface 224 which extends cross to a radial direction with respect to the pivot axis 204. As can be gathered from FIG. 33, the abutment surface 224 may comprise a generally convex shape bulging outwards in a direction facing away from the pivot axis 204 and may comprise a surface section which extends substantially parallel with or in a plane 225 which extends in parallel with the pivot axis 204. In this way, the abutment surface 224 provides a suitable stop surface for stopping a rotational movement about the pivot axis 204. The coupling device 220 may comprise multiple abutment portions 222 and may comprise more than one supporting portion 230. As is shown in FIG. 32, the load support 210 may comprise mating sections for a cooperation with the specific portions formed on the coupling device 220. For example, the load support 210 comprises contact surfaces 213 which may be formed corresponding to the shape of the abutment surface 224. In the shown configuration, the abutment surface 224 is exemplary embodied as convex surface and the contact surface 213 configured to get in contact with the abutment surface 224 is formed as a concave surface. In the shown configuration, abutment portions 222 are arranged adjacent to each supporting portion 230 in an axial direction of the pivot axis 204.

The abutment portion 222 further comprises a latching portion 226 and a latching portion 228 formed on a cylindrical portion 229 of the abutment portion 222. The load support 210 comprises a latching portion 217 provided adjacent the contact surface 213 and configured to cooperate with the latching portions 226 and 228 on the coupling device 220 in a use position of the load support 210 and the non-use position, respectively. The latching portions 226, 228 provided on the coupling device 220 are formed as protrusions protruding radially outward from the pivot axis 204. The latching portion 217 provided on the load support 210 is provided as a protrusion extending towards the pivot axis 204 when the load support 210 is mounted on the coupling device 220. The mounted condition of the load support 210 on the coupling device 220 is shown in FIG. 35. There, the load support 210 is in a use position in which the contact surface 213 contacts the abutment surface 224. Furthermore, the latching portion 217 is in contact with the latching portion 226 thereby defining a releasable lock for locking the load support 210 in the use position or at least providing a resistance which needs to be overcome when a user intends to rotate the load support 210 to the non-use position. The latching portion 228 is provided at a position such that it interacts with the latching portion 217 when the load support 210 is in the non-use position. The coupling device 220 further comprises an abutment surface 231 which gets in contact with an abutment surface 219 provided on the load support 210 when the load support 210 is in the non-use position. The abutment surface 231 may be formed such that it extends in parallel with the abutment surface 224, in particular parallel to the plane 225.

Figure 36:
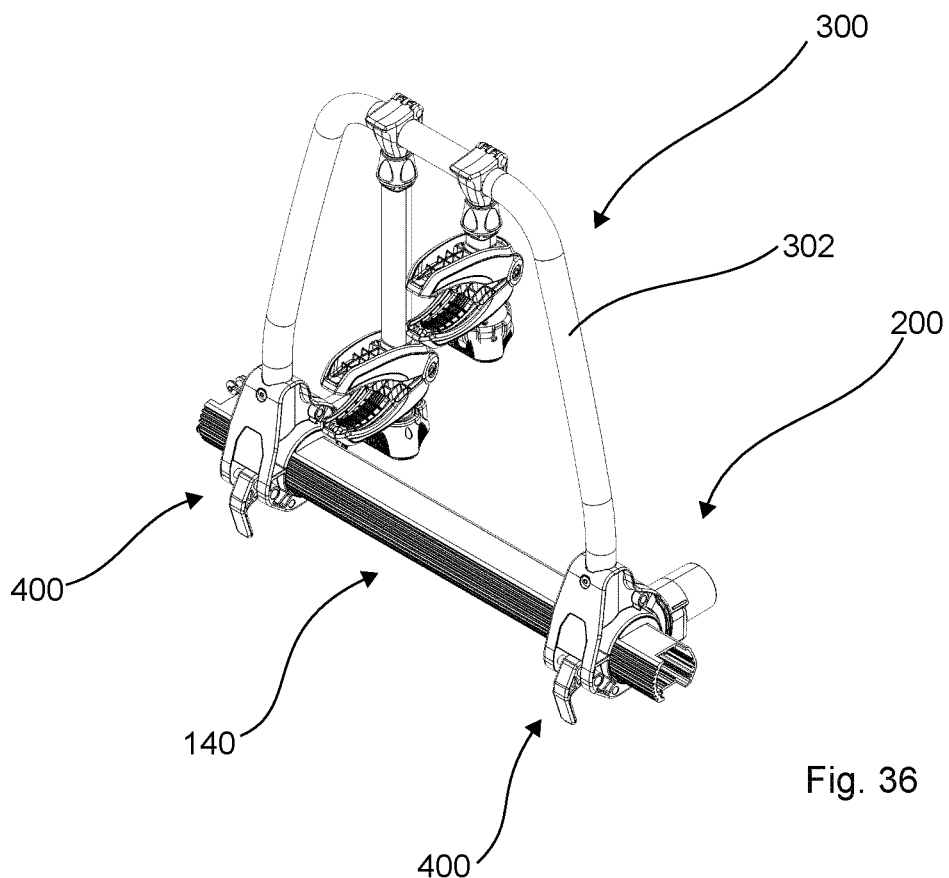
FIG. 36 shows a perspective view of a non-round cross beam for a load carrier with elements pivotably mounted thereon by means of a coupling device.

A further preferable configuration which may be used in connection with bike carriers as shown in FIGS. 1 to 6 will be described with reference to FIGS. 36 to 41. The configuration as described herein provides the possibility to pivotably support a load support arrangement 200 about a cross beam 140. A particular beneficial feature of this configuration resides in the possibility to provide a pivoting support about a non-round cross beam. For that, a coupling device 400 for mounting a load support arrangement 200 or other elements on a non-round cross beam 140 of a bike carrier is provided. A basic possible configuration making use of such a coupling device 400 is shown in FIG. 36. There, it is indicated that a load support arrangement 200 may be coupled to the cross beam 240 by means of two coupling devices 400. Each coupling device is configured on the one hand to support the load support arrangement 200 and is furthermore configured to support a support device 300 comprising a support frame 302. As can be seen in FIG. 2, the support device 300 may comprise fixation devices 304 mounted to the support frame 302 at one end and comprising a gripping device 306 on the other end. The gripping device 306 may be coupled to a load to be transported, for example may be coupled to the frame of a bike to be transported, in order to give additional stability. The gripping device may comprise a torque limiting mechanism limiting a torque which may be applied by a user for fixing the bike. In this way, a damage of the bike can be prevented. The gripping device may comprise an operating knob for tightening the gripping device. The torque limiting mechanism may be provided in the operating knob such that the knob runs free in case a predetermined torque is exceeded. The operating knob may comprise a locking mechanism which, when operated, suspends the operability of the operating member by interrupting a force transmitting path between the operating knob and the gripping elements of the gripping device. In this way, opening the gripping device can be prevented by operating the locking mechanism, for example by means of a key.

Figure 37:
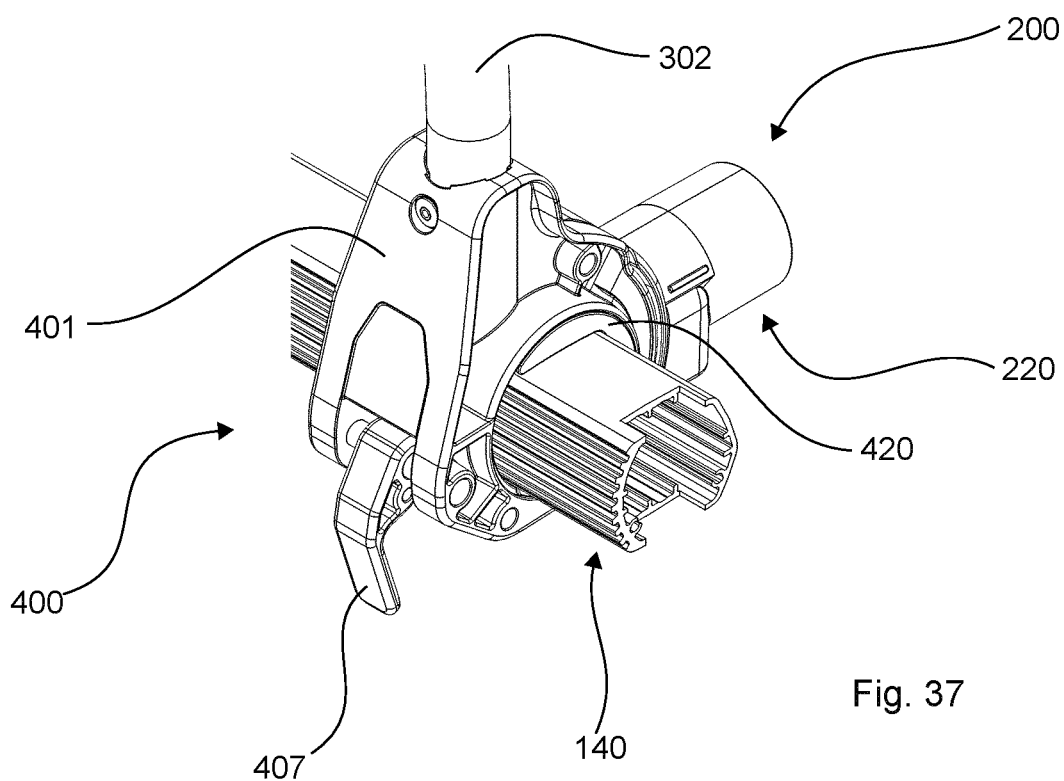
FIG. 37 shows an enlarged view of the coupling device.
Figure 38:
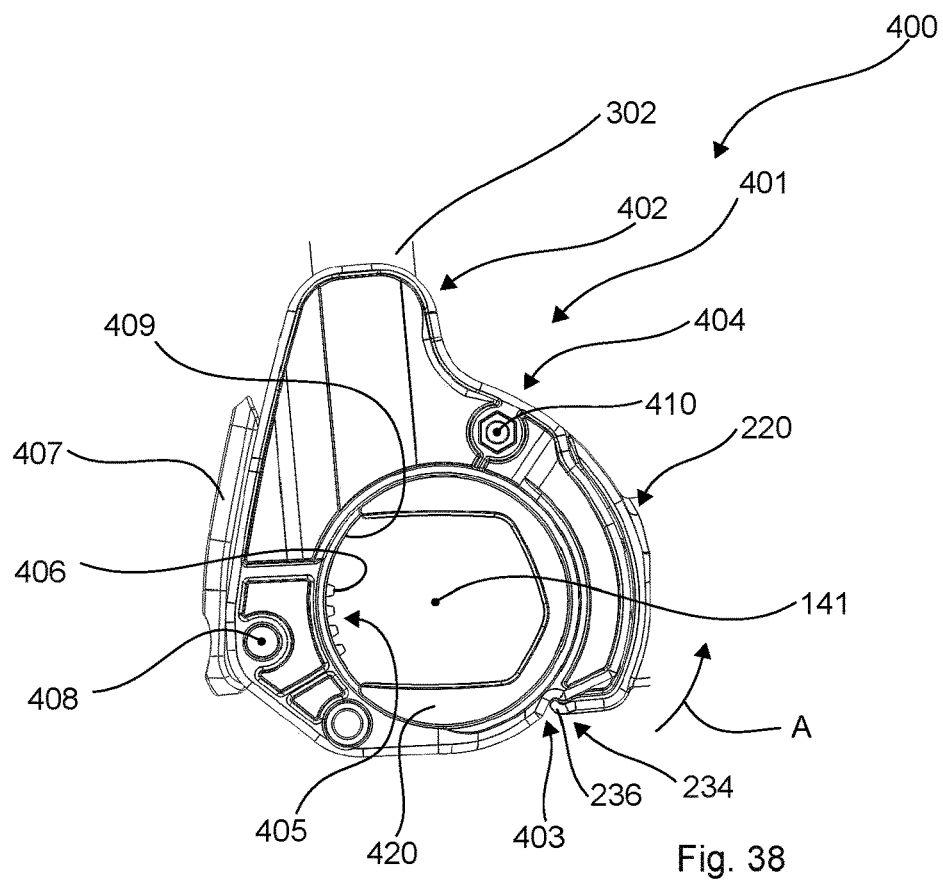
FIG. 38 shows a side view of the coupling device.

FIG. 37 shows an enlarged view of the coupling device 400. The coupling device 400 comprises a holder 401 which in the present configuration is configured to receive an end portion of the support frame 302. It is noted that such a portion for receiving a support frame 302 is optional and may be omitted in holders used in load carriers which do not comprise an additional supporting device 300. A coupling device 220 of a load support arrangement 200 may be coupled to the holder 401. The holder is pivotably mounted on the cross beam 140 by means of a coupling member 420 which may also be referred to as adapter. The holder further comprises an operating member 407 for operating a locking mechanism which will be described later. A more detailed construction of the coupling device 400 and the holder 401 is shown in FIG. 38. FIG. 38 shows the holder 401 in a side view, that is when viewed along a longitudinal axis 141 of a cross beam 140 to which the coupling device 400 is to be mounted. In FIG. 38, the fixation portion 402 for mounting the support frame 302 on the holder is shown. Furthermore, the holder 401 comprises a coupling portion 404 for coupling the coupling portion 221 thereto. The coupling portion 404 is configured to receive a pivot pin 410 which pivotably holds the coupling portion 221 of the coupling device 220. In this way, the coupling device 220 and consequently the load support arrangement 200 is pivotably mounted on the holder 401. In order to lock a pivoting movement of the load support arrangement 200 about the pivot pin 410, the coupling device 220 comprises an engaging section 234 with a catch 236 which is able to engage with a recess 403 provided in the holder 401. It is noted that the load support arrangement 200 is thus pivotably movable with respect to the holder 401 and about the pivot pin 410 between a use position in which the catch 236 is engaged with the recess 403 and a non-use position in which the coupling device 220 is rotated in a counter clock wise direction indicated by arrow A in FIG. 38 and the catch 236 is disengaged from the recess 403.

As already mentioned, an operating member 407 in the form of a lever is provided on the holder 401 pivotable about a pivot axis 408 defined by a pivot pin. The operating member 407 is operatively coupled to an engaging portion 405. The engaging portion 405 comprises protrusions 406 which extend towards the center of rotation of the holder 401, that is towards the longitudinal axis 141 of the cross beam 140. The engaging portion 405 is held movable towards and away from the longitudinal axis 141 and is operatively coupled to the lever 407 such that an operation of the lever can move the engaging portion 405 between an engaging position in which the protrusions 406 may engage with a corresponding recess formed in the cross beam 140 or the coupling member 420 and a disengaging position in which the protrusions 406 are retracted into the holder 401 thereby releasing an engagement with the cross beam 140 or the coupling member 420.

Figure 40:
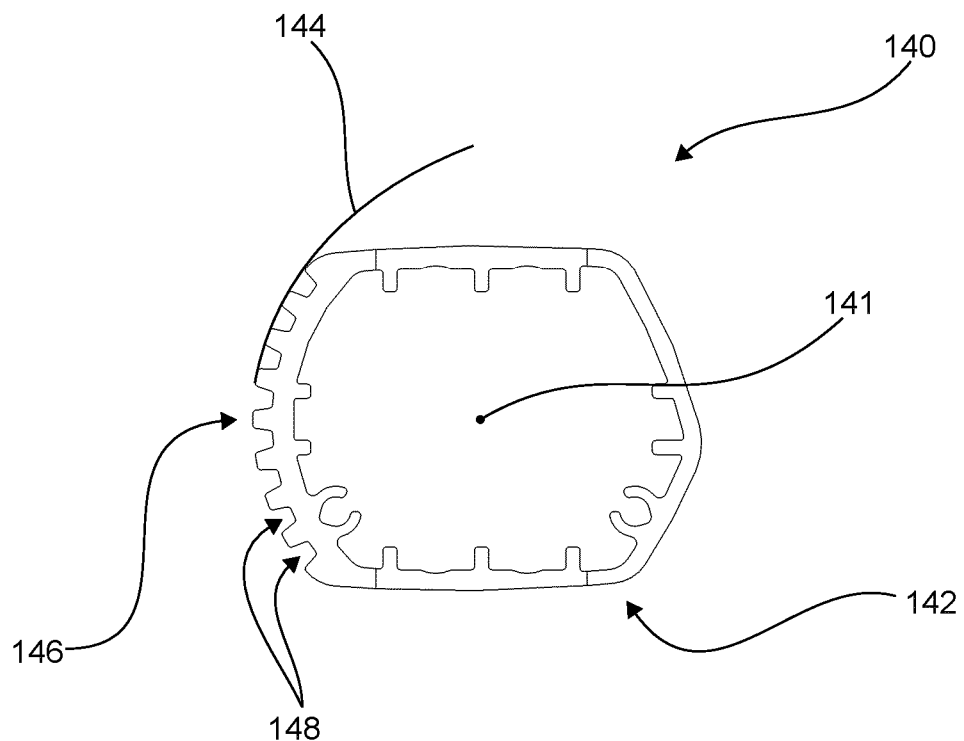
FIG. 40 shows a cross section of a mounting portion of the cross beam.

The shape of a cross beam used in connection with the holder 401 is shown in FIG. 40. FIG. 40 shows a sectional view through a mounting portion of the cross beam 140, that is of a mounting portion at which a coupling device 400 is to be mounted. The cross beam 140 comprises an outer contour which partially follows an imaginary circle 144. The portion of the cross beam 140 following the imaginary circle 144 may also be referred to as supporting portion 146 as it is capable of supporting an inner surface 409 of the holder 401. The supporting portion 146 may comprise one or more recesses 148 being configured to receive the above described protrusions 406 of the engaging portion 405 of the holder 401. In this way, a rotation of the holder 401 about the longitudinal axis 141 of the cross beam 140 may be locked by an engagement between the engaging portion 405 and the recesses 148. As is also shown in FIG. 40, the cross beam 140 comprises sections in its outer contour which deviate from the above-mentioned imaginary circle 144. Accordingly, the outer contour of the cross beam 140 in the mounting portion 142 is non-round.

Figure 41:
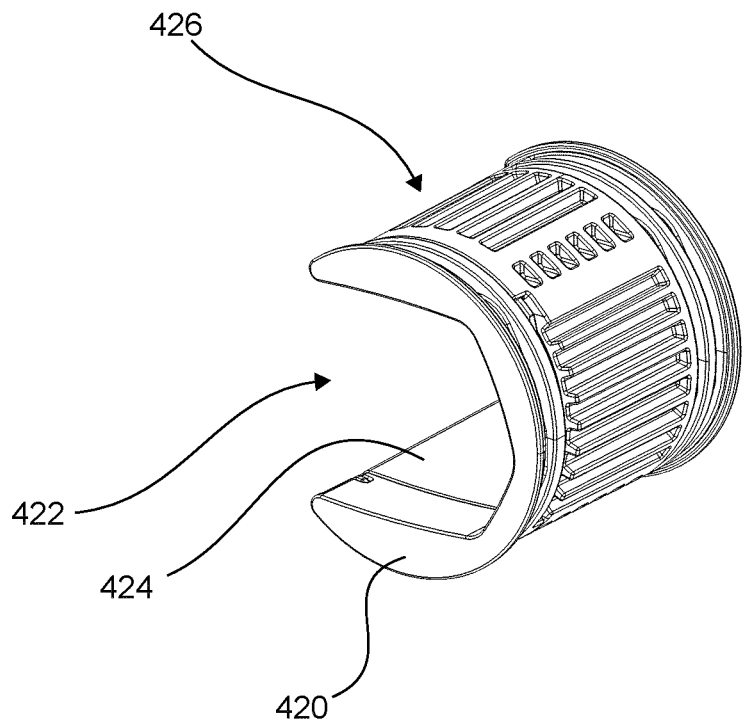
FIG. 41 shows a perspective view of an adapter insertable on the mounting portion of the cross beam shown in FIG. 40.

In the configuration as shown in FIG. 40, the cross beam 140 comprises a substantially flat upper surface section and a substantially flat lower surface section which are coupled to each other on one side by means of the supporting portion 146 and on an opposite side by means of a side wall which may be formed by two substantially flat surface sections which are inclined with respect to each other. As is shown in FIG. 40, the cross section of the cross beam 140 comprises an asymmetric shape so that the cross beam 140 is formed asymmetrically in the mounting portion 142. As the above described configuration of the cross beam 140 per se does not allow to pivotably support the holder 401, the above described coupling member or adapter 420 as shown in FIG. 41 is provided to at least partially compensate for the deviation of the outer contour of the cross beam 140 from the imaginary circle 144. More precisely, the coupling member 420 defines an outer contour which follows the imaginary circle 144 and defines an accommodating space 422 for receiving the mounting portion 142 of the cross beam 140. The coupling member 420 comprises an inner surface 424 which is formed according to the outer peripheral contour of the cross beam 140 deviating from the imaginary circle 144 so as to allow a mounting of the coupling member 420 on the mounting portion 142 of the cross beam 140. As soon as the coupling member 420 is mounted on the mounting portion 142 of the cross beam 140, a supporting surface for supporting the holder 401 on the cross beam 140 is jointly provided by the supporting portion 146 and an outer surface of the coupling member 420. As is shown in FIG. 41, the coupling member 420 may comprise engaging recesses 426 in its outer surface which are suitable for receiving the above-mentioned protrusions 406 of the engaging portion 405 so that it is possible to arrest the holder 401 in further orientations.

Figure 39:
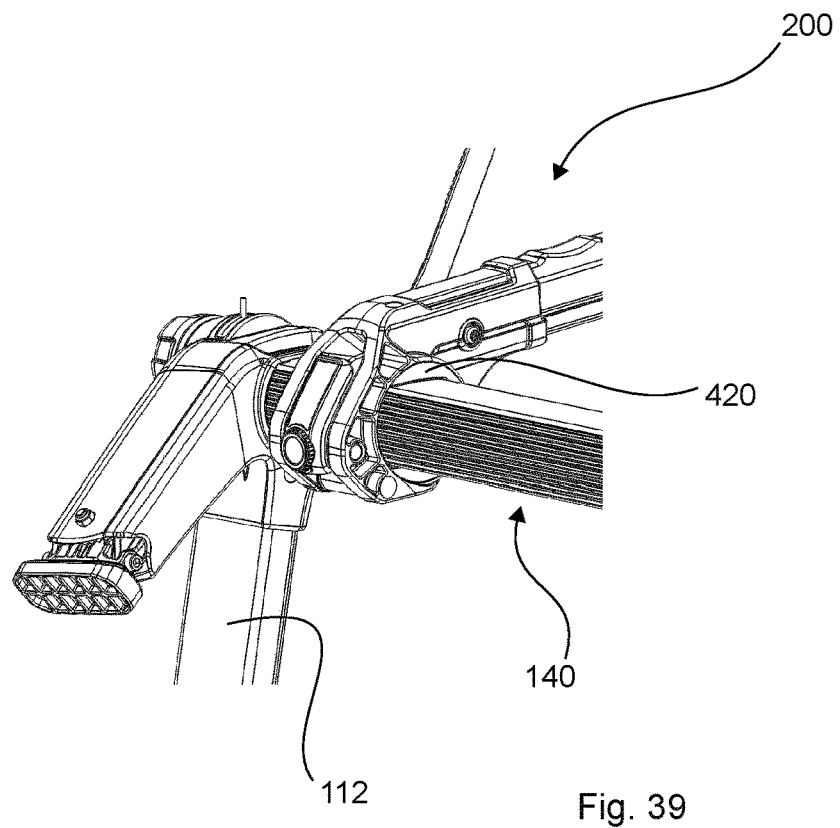
FIG. 39 shows a configuration in which a load support is coupled to the cross beam by means of the coupling device.

FIG. 39 additionally shows a configuration in which a load support arrangement 200 is coupled to the cross beam 140 by means of a holder and the above described coupling member 420. The load support arrangement 200 comprises a limb for hanging bikes thereon and does not comprise an additional support frame 302 as shown in FIG. 36.

Figure 42:
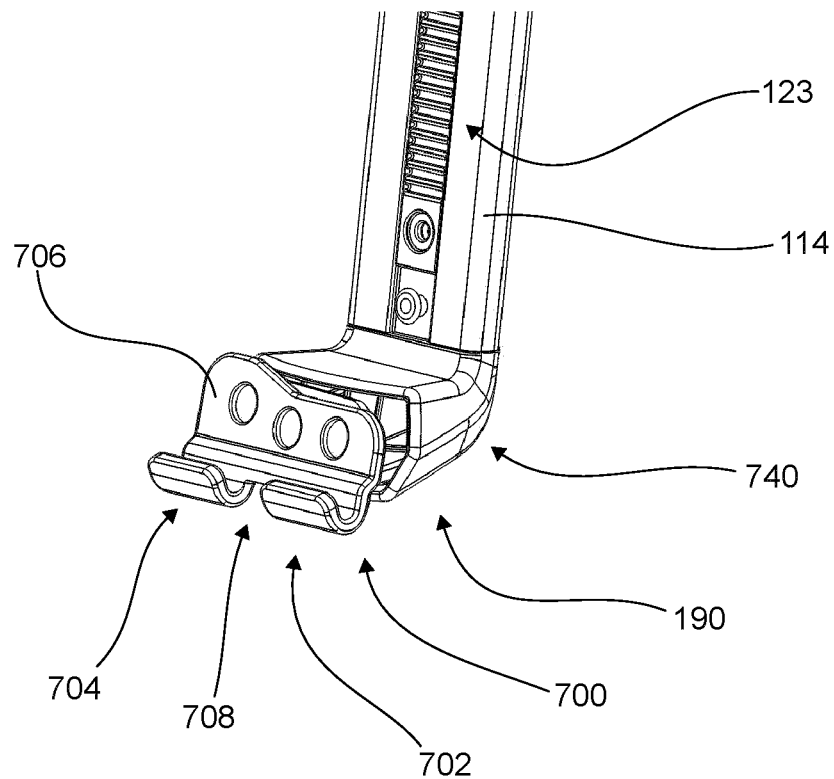
FIG. 42 shows a perspective view of a vehicle coupling portion according to an embodiment.
Figure 47:
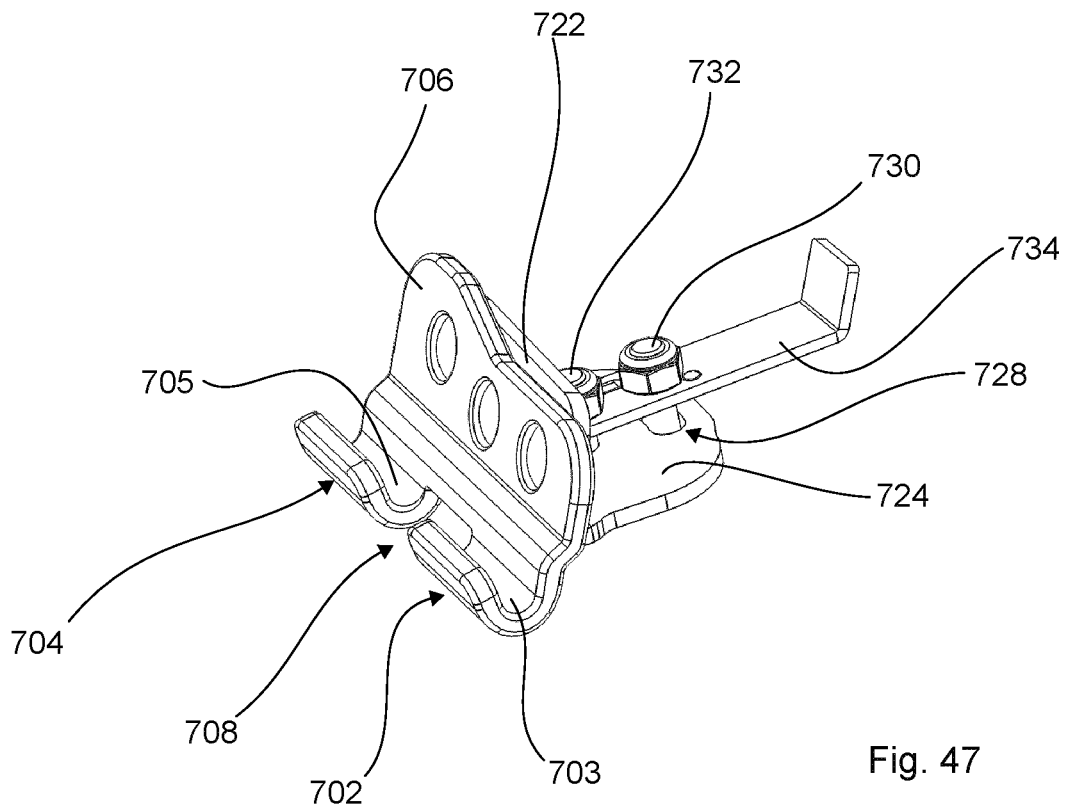

FIG. 42 shows a possible configuration of the coupling portion which may be used for load carriers, in particular for load carriers as described herein. The coupling portion may comprise a coupling mechanism 700 comprising two engaging portions 702, 704 arranged at a distance from each other and both coupled to an end portion of a common coupling portion 706. The two engaging portions 702, 704 are formed so as to be integrally movable. In particular, the two engaging portions 702, 704 may be commonly movable about two pivot axes. The two engaging portions 702, 704 may be fixed to or integrally formed on a coupling member. A recess 708 may be formed between the two engaging portions 702, 704 so that each of the engaging portions 702, 704 comprises a separate contact surface 703, 705 as is for example shown in FIGS. 44, 45, and 47.

In the present configuration, the coupling member further comprises a coupling portion 706 for coupling the coupling member pivotably to a further element. Furthermore, the coupling portion 706 is embodied as a plate-like portion. The coupling portion 706 may be pivotably mounted to a coupling section 722 of a holder 720. The coupling portion 706 may be mounted to the coupling section 722 pivotably movable about a first pivot 712 defining a pivot axis which preferably extends substantially perpendicular to an extension direction of the contact surfaces 703, 705. In the present configuration, a pivoting movement of the coupling portion 706 about the pivot 712 is limited by means of a limiting pin 714 and a limiting pin 710. The limiting pins 714, 710 are fixedly coupled to the coupling portion 706 and are each accommodated in a respective slot 716, 717 provided in the coupling section 722 and defining an end position of the limiting pin integrally movable with the coupling portion 706.

The holder 720 comprises a coupling section 724 configured to be pivotably mounted to a lower vehicle support 110. In the present configuration, the holder 720 is coupled to the lower vehicle support 110 by means of a coupling member 740. Preferably, the holder 720 is pivotably coupled to the lower vehicle support 110 at a lower end portion of the lower vehicle support 110. In particular, the holder 720 may be pivotably coupled about a second pivot 732 defining a pivot axis which is inclined with respect to the pivot axis as defined by the first pivot 712. A pivoting movement about the second pivot 732 is preferably limited by a cooperation of a slot 728 provided in the coupling section 724 and a limiting pin 730 held immovably with respect to the coupling portion 724. In the present configuration, the limiting pin 730 and the second pivot 732 are fixedly mounted on a reinforcing bracket 734 which is provided to be coupled in a housing portion 742 of the coupling member 740 as is visible in FIGS. 46 and 47. Accordingly, with a configuration of the vehicle coupling portion 190 as shown in FIG. 42 and FIGS. 44 to 47, a configuration is achieved in which the vehicle coupling portion 190 is self-adaptable to a vehicle portion on which the load carrier is to be mounted. In particular, the configuration as described allows a rotation of the engaging portions 702, 704 about two pivot axes so that the separate contact surfaces 703, 705 are able to get in contact with contact surfaces on the vehicle for an optimum force distribution.

Figure 68:
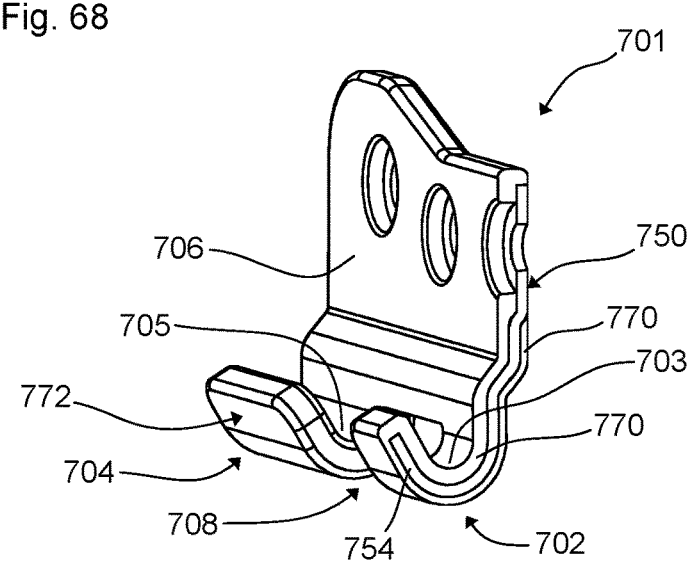
FIGS. 68 to 70 show a modification of the vehicle coupling portion shown in FIGS. 42 and 44 to 47.

A possible configuration of the coupling mechanism 700 and vehicle coupling portion 190 as described with respect to FIGS. 42 and 44 to 47 will now be described with reference to FIGS. 68 to 70. As already mentioned before, the coupling mechanism 700 comprises a coupling member which in the configuration according to FIG. 68 is designated with reference sign 701. The coupling member 701 comprises the coupling portion 706 and two engaging portions 702, 704. As already described above, the engaging portions 702, 704 can be fixed to or integrally formed with the coupling member and a recess 708 may be formed between the two engaging portions 702, 704 so that each of the engaging portions 702, 704 comprises a separate contact surface 703, 705. The coupling portion 706 is embodied as a plate-like portion and may be pivotably mounted to a coupling section 722 about the first pivot 712 in the manner as described before with reference to FIGS. 42 and 44 to 47.

Figure 69:
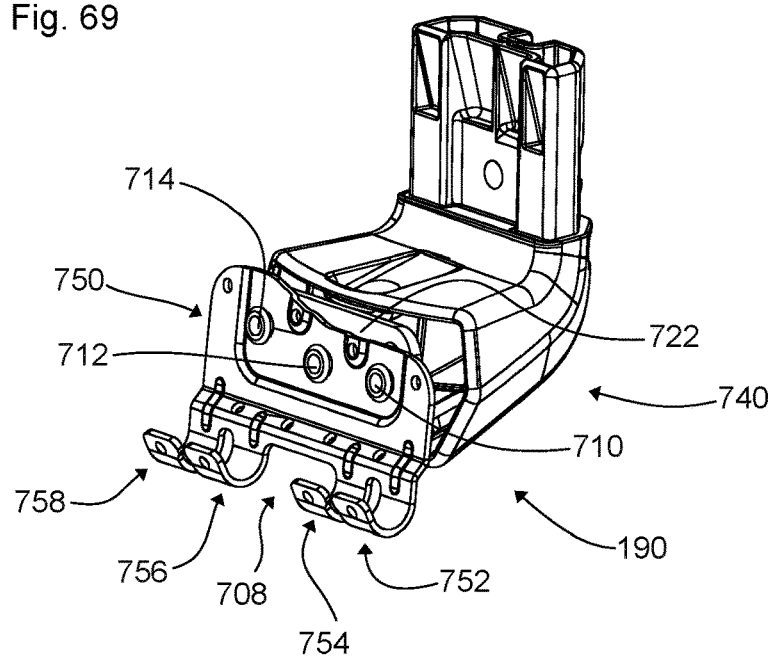
Figure 70:
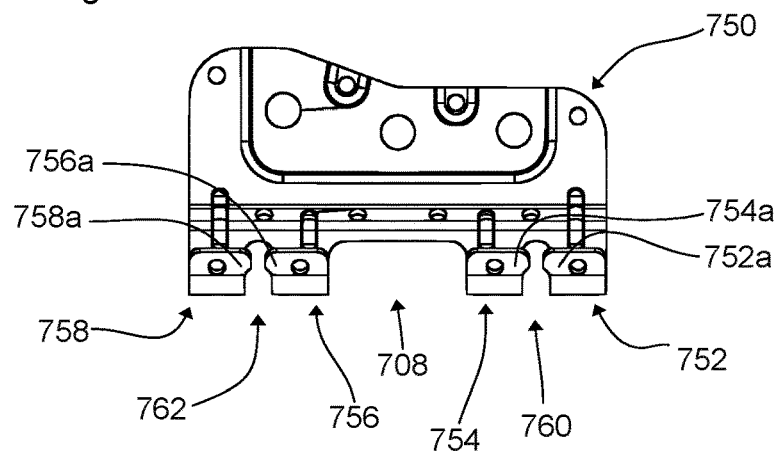

In the embodiment shown in FIGS. 68 to 70, the coupling member 701 is reinforced and comprises an inner supporting member 750 which is at least partially covered by an outer covering portion 770. The inner supporting member 750 can be provided in one or more of the engaging portions 702, 704 and/or in the coupling portion 706. The inner supporting member 750 can comprise or can be a single element. The inner supporting member 750 may comprise a higher rigidity than the outer covering portion 770. The inner supporting member 750 can be made from metal, and may in particular be made from a metal plate which is cut and bent. The outer covering portion 770 may be made of a plastics material, for example synthetic rubber such as EPDM rubber. The inner supporting member 750 is at least partially covered by the outer covering portion 770, in particular in regions which get in contact with the vehicle when the coupling mechanism is coupled to the vehicle, for example at the contact surfaces 703, 705.

Figure 44:
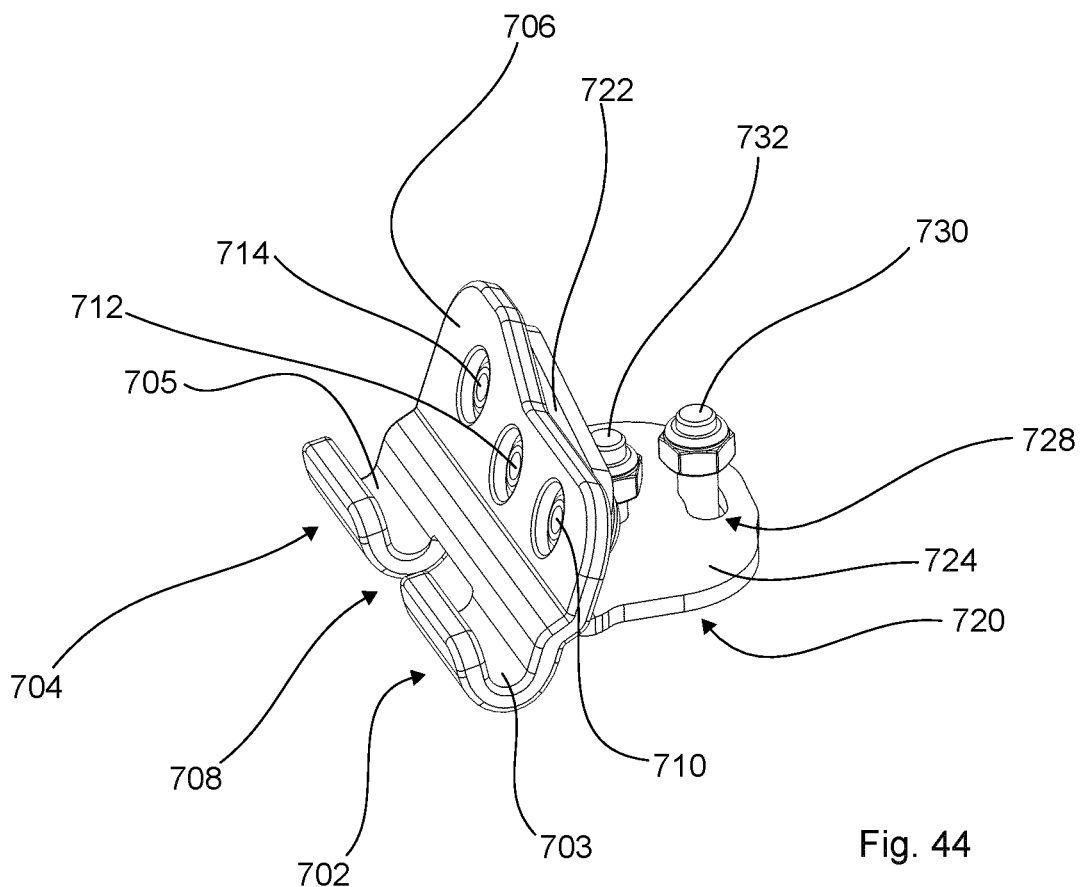
FIGS. 44 to 47 show a possible configuration of a coupling mechanism usable in the vehicle coupling portion shown in FIG. 42.
Figure 45:
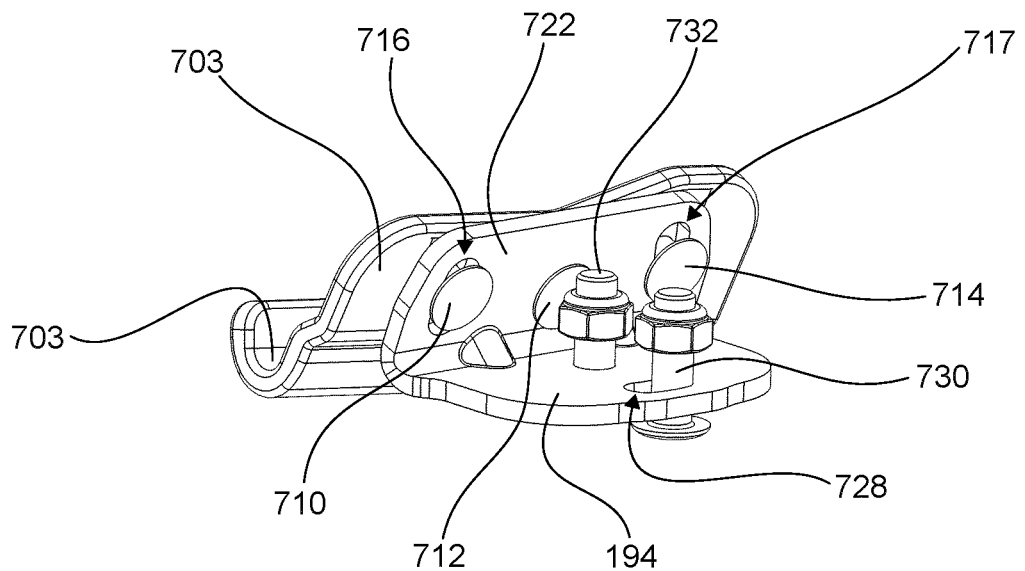
Figure 46:
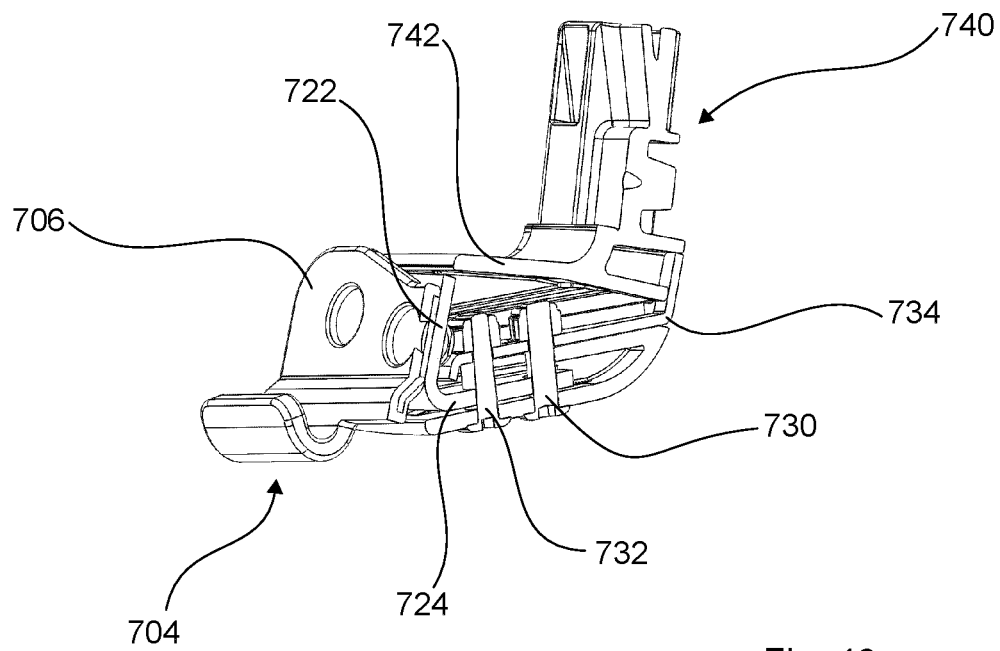

Each engaging portion 702, 704 defines a hook-like portion engageable with contact surfaces on the vehicle. The hook-like portions define the contact surfaces 703, 705 at a lowermost inner portion of the hook-like portions as is shown in FIG. 44 and FIG. 68.

One of the engaging portions 702, 704 can comprise two or more inner supporting portions which may be embodied as inner hook portions 752, 754, 756, 758. Preferably, each engaging portion 701, 704 comprises two inner supporting portions embodied as inner hook portions 752, 754, 756, 758 like the ones shown in FIGS. 69 and 70. The inner hook portions 752, 754, 756, 758 can be provided by correspondingly shaped portions of the inner supporting member 750 wherein such portions may also be referred to as hook-like supporting fingers. The inner supporting portions, for example the inner hook portions 752, 754, 756, 758, may protrude into the engaging portions thereby providing locally reinforced engaging portions with increased stiffness. The inner hook portions 752, 754, 756, 758 can be spaced from each other thereby forming gaps 760, 762 between them.

As is shown in FIGS. 69 and 70, the inner hook portions 752, 754, 756, 758 may be formed such that free end portions 752a, 754a, 756a, 758a of the same are wider than adjacent portions, for example middle portions of the same. In particular, the free end portions may comprise a geometry such that the gaps 760, 762 are reduced between the free end portions. Accordingly, an engaging portion may comprise a set of two or more inner hook portions 752, 754, 756, 758 arranged in sequence. The inner hook portions may comprise an identical shape or may be shaped differently, for example at least in the free end portions. Furthermore, the inner hook portions 752, 754, 756, 758 of one or more of the engaging portions 702, 704 may be commonly covered by the outer covering portion 770. The outer covering portion 770 may comprise a covering section 772 which accommodates at least two of the two or more inner hook portions 752, 754, 756, 758. In other words, at least two of the two or more inner hook portions 752, 754, 756, 758 may be grouped by a common covering. In this way, one engaging portion 702, 704 may comprise a single hook appearance in which the inner construction comprising multiple inner hook portions 752, 754, 756, 758 or other supporting portions is concealed by the outer covering portion 770, more precisely by covering sections 772 of the covering portion 770 as is shown in FIG. 68. With this construction, the inner hook portions are individually movable while being held together to a certain extent by the covering sections. In this way, the flexibility of the engaging portion is increased and forces can be distributed in a better manner. Accordingly, gripping an edge portion of the vehicle is improved as such a construction reduces the tendency for the coupling portion to move along the edge portion, for example of a rear door or trunk lid, during use and also reduces damage to the vehicle.

Figure 43:
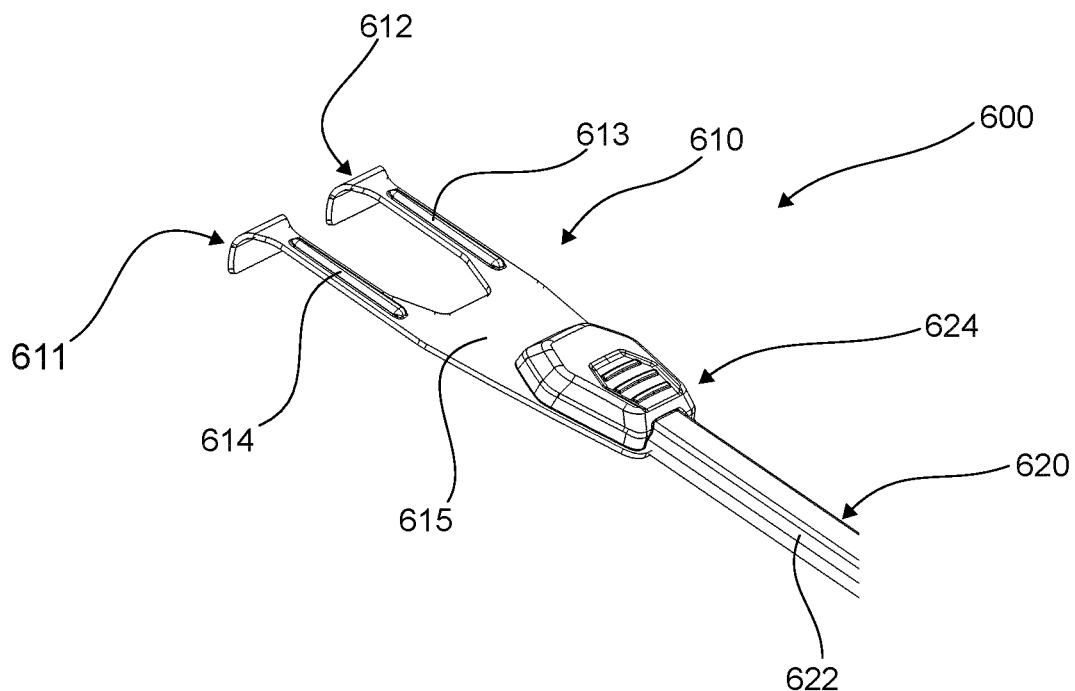
FIG. 43 shows a perspective view of an attachment device according to an embodiment.

FIG. 43 shows a possible configuration of an attachment device 600. The attachment device 600 may be used for coupling a force transfer member 620 to portions of the vehicle for tightening purposes. The attachment device 600 may be configured in a fork-like shape with two engaging portions 611, 612 formed in end portions of prongs 613, 614. In the configuration as shown in FIG. 43, the engaging portions 611, 612 are formed at one end portion of the prongs 613, 614 and the prongs 613, 614 are coupled to a base portion 615 at their opposite ends. The base portion 615, the prongs 613, 614, and the engaging portions 611, 612 may be integrally formed from cutting and forming a metal sheet. Furthermore, the latter described members define an engagement device 610 which in the configuration as shown in FIG. 43 is embodied as a hook-like structure. Accordingly, the attachment device 600 may be hooked on a suitable portion on the vehicle. The engagement device 610 is coupled to an end portion 624 of a flexible elongate member 622 of a force transfer member 620. The force transfer member 620 can be tightened by means of a tightening mechanism 500 as described herein.

Figures 48, 49:
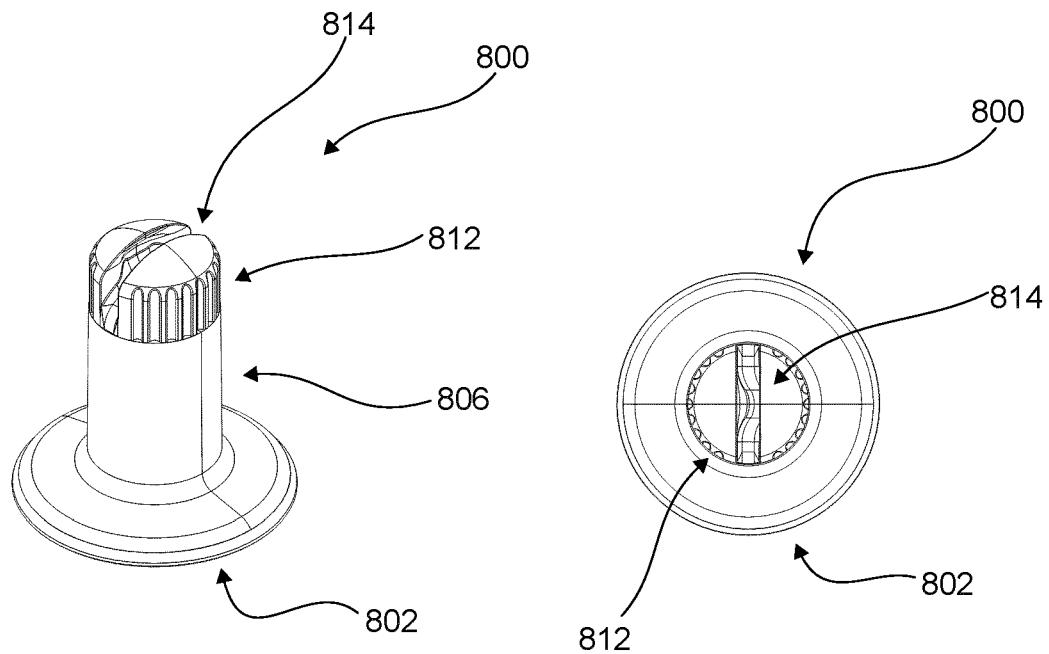
FIGS. 48 to 51 show different views of a spacer usable in connection with load carriers according to the aspects and embodiments described herein in a retracted state.
Figures 50, 51:
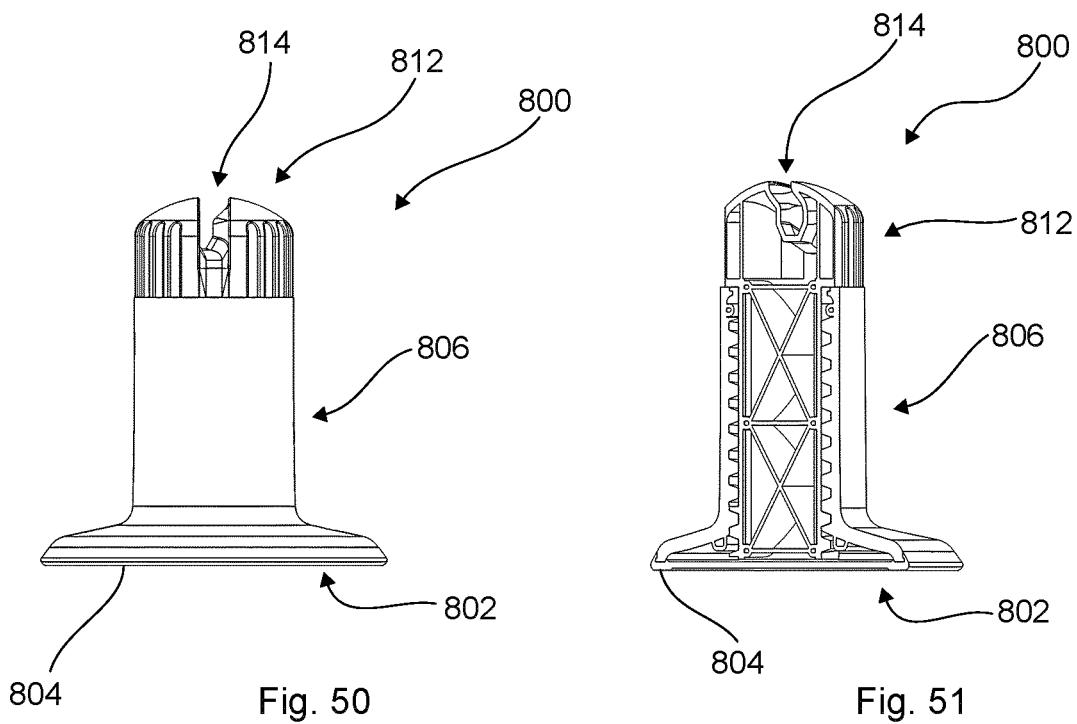
Figure 52:
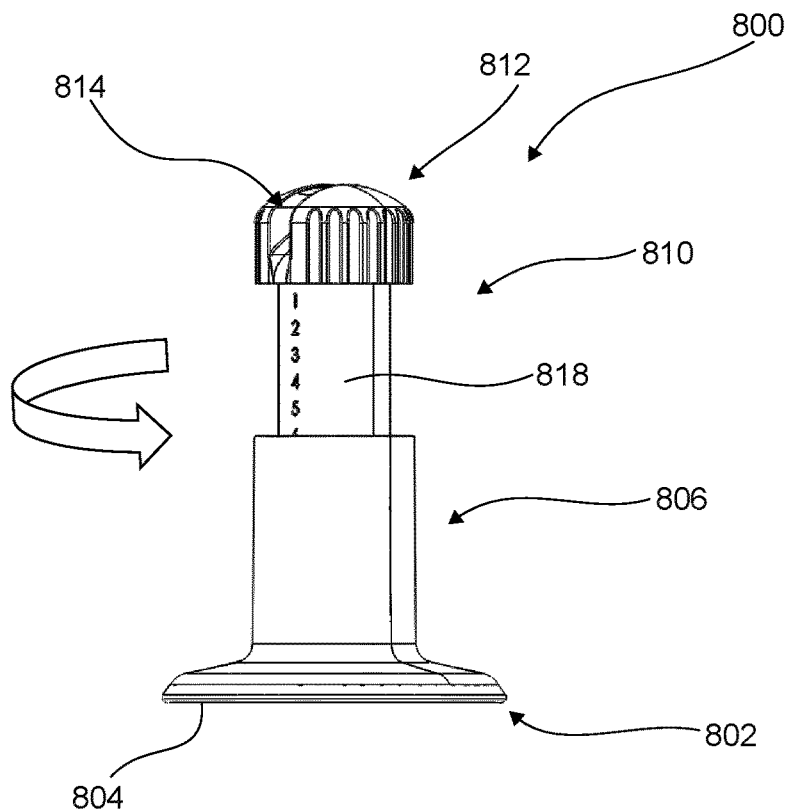
FIGS. 52 and 53 show the spacer of FIGS. 48 to 51 in a deployed state.
Figure 53:
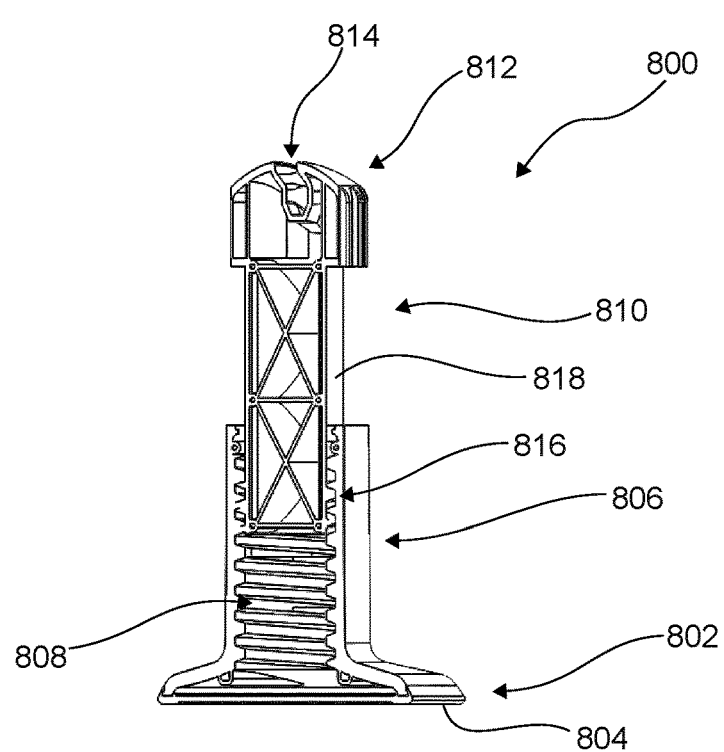

A further configuration which may be used in connection with load carriers 1 as described herein relates to a spacer 800 as shown in FIGS. 48 to 53. The spacer 800 may also be referred to as spoiler protector in the present embodiment as its function is to protect a spoiler of the vehicle from being damaged. The spacer 800 comprises a foot portion 802 configured to be contacted with a portion of the vehicle such as a section of a rear window of a vehicle. For that, the foot portion 802 may define a contact surface 804 which may be formed by means of a soft material for preventing damage to the vehicle. The spacer 800 further comprises a lower portion 806 which extends from the foot portion 802 and may also be referred to as accommodating portion due to its function. The accommodating portion 806 comprises a threaded inner surface 808 and is configured to be threadedly engaged with and to receive at least a portion of an upper portion 810 in a manner such that a rotation of the upper portion 810 leads to a translatory movement of the upper portion 810 with respect to the accommodating portion 806. FIGS. 48, 50 and 51 show a retracted state in which the upper portion 810 is retracted in the accommodating portion 806 and FIGS. 52 and 53 show a deployed state in which the upper portion 810 is moved upward with respect to the accommodating portion 806. The upper portion 810 comprises an engaging portion 816 which is embodied as a threaded portion which matingly engages with the threaded inner surface 808. Furthermore, the upper portion 810 comprises a coupling portion 818 carrying the threaded portion 816 at a lower portion thereof and supporting a supporting portion 812 at an opposite upper portion thereof. The supporting portion 812 and the coupling portion 818 are integrally formed. In general, the upper portion 810 and the lower portion 806 may be formed from plastic, for example by means of 3D printing. As is shown in FIGS. 48 to 53, the supporting portion 812 comprises a guiding portion 814 which is embodied as a recess in the present configuration. The guiding portion 814 is configured to receive a portion of the force transfer member 620 which is coupled to the vehicle by means of an attachment portion or engagement device 610 for tightening purposes. Accordingly, when the force transfer member 620 is received in the guiding portion 814, the same may be held at a specific distance from a vehicle portion by means of the spacer 800. In this way, it is for example possible to provide such a spacer 800 near a spoiler of a vehicle in order to guide the force transfer member 620 around the vehicle spoiler to prevent a contact between the force transfer member 620 and the vehicle spoiler.

Figure 54:
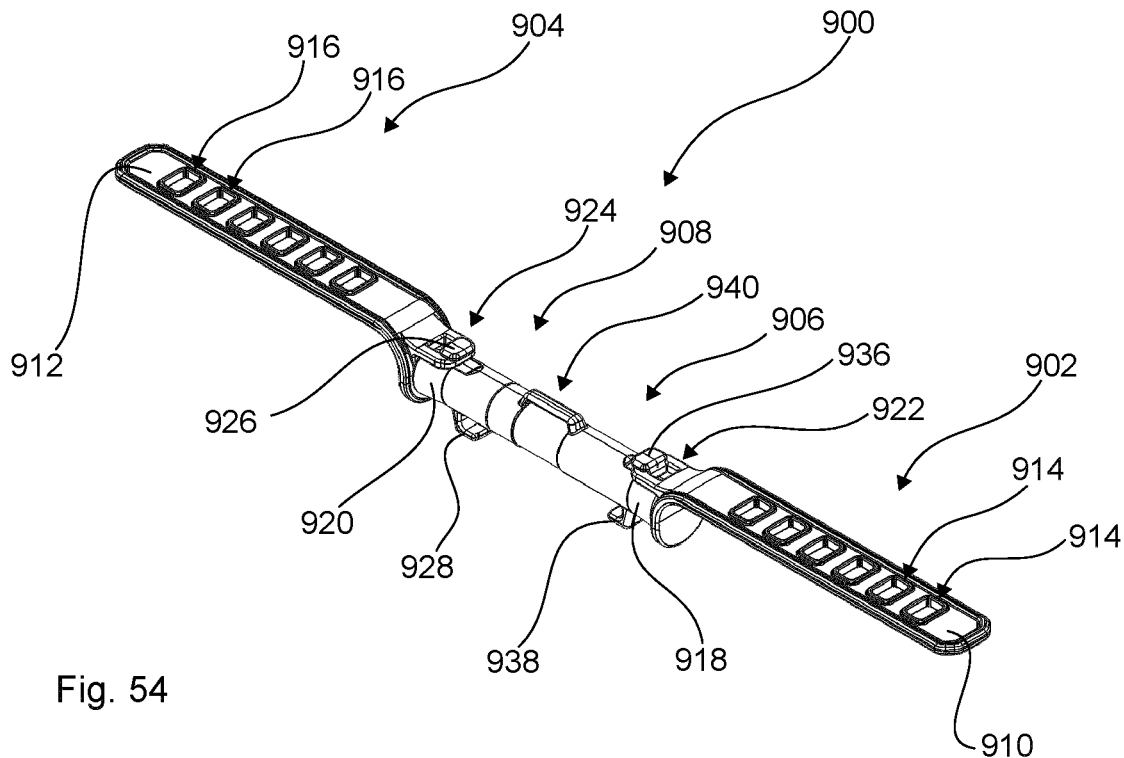
FIGS. 54 and 55 show perspective views of an anti-sway device usable in connection with load carriers comprising load support arrangements for hanging bikes thereon.
Figure 55:
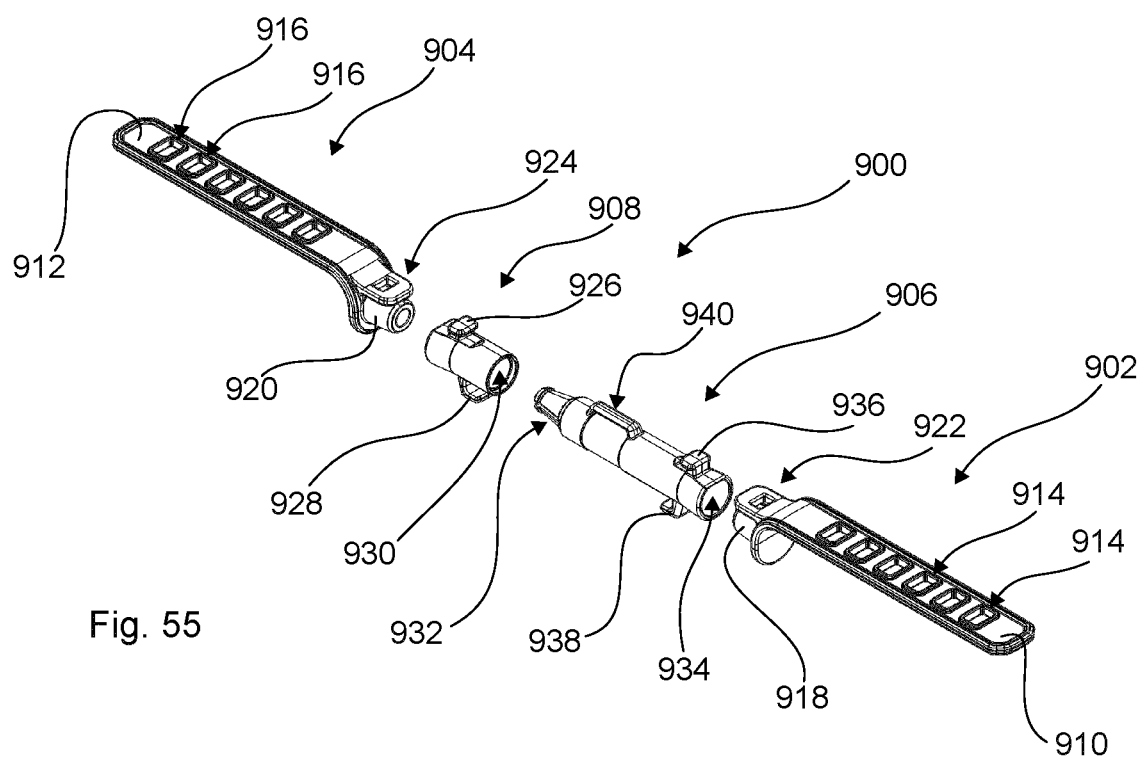
Figure 56:
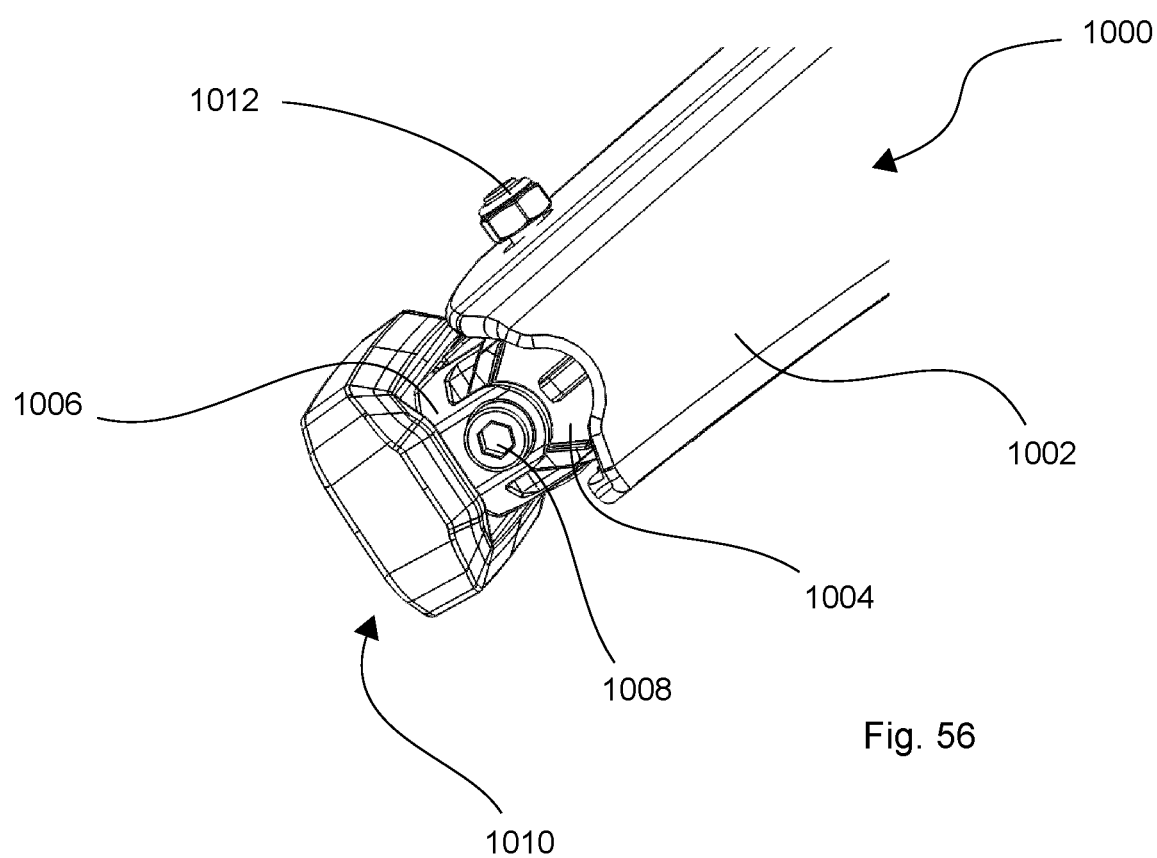
FIG. 56 shows an embodiment of a configuration of an upper vehicle support for supporting a base frame on the vehicle.
Figure 57:
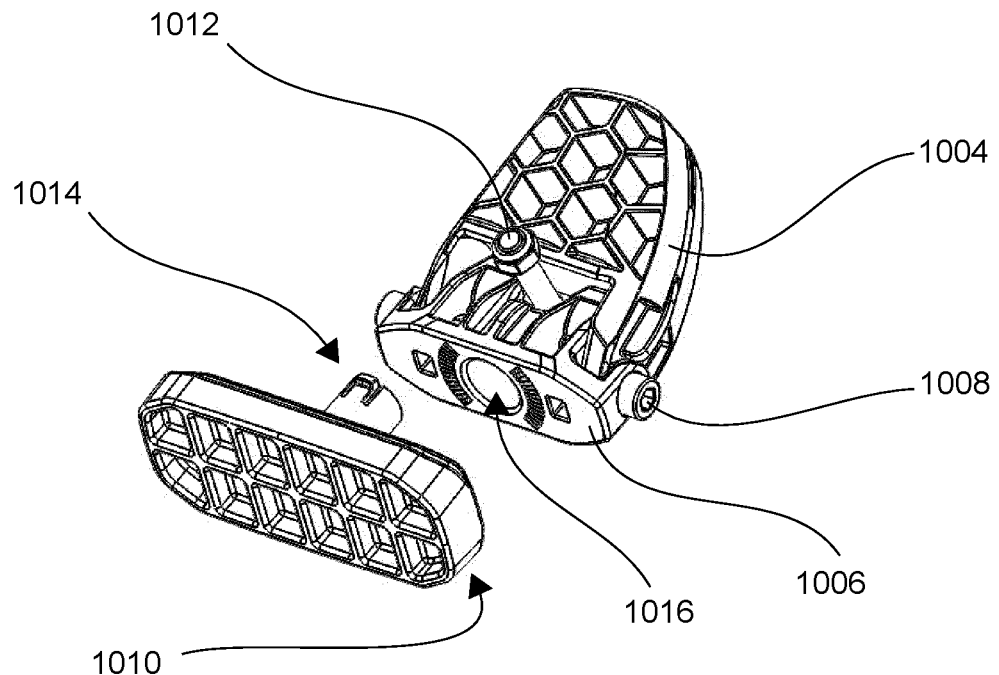
FIGS. 57 to 59 show perspective views of elements of the upper vehicle support.
Figure 58:
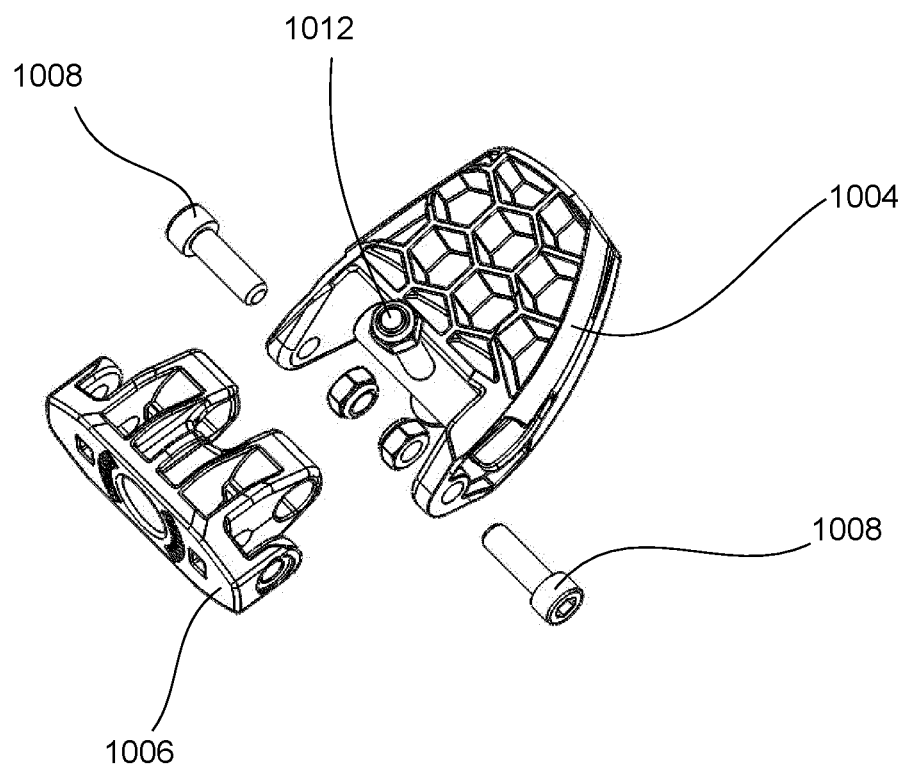
Figure 59:
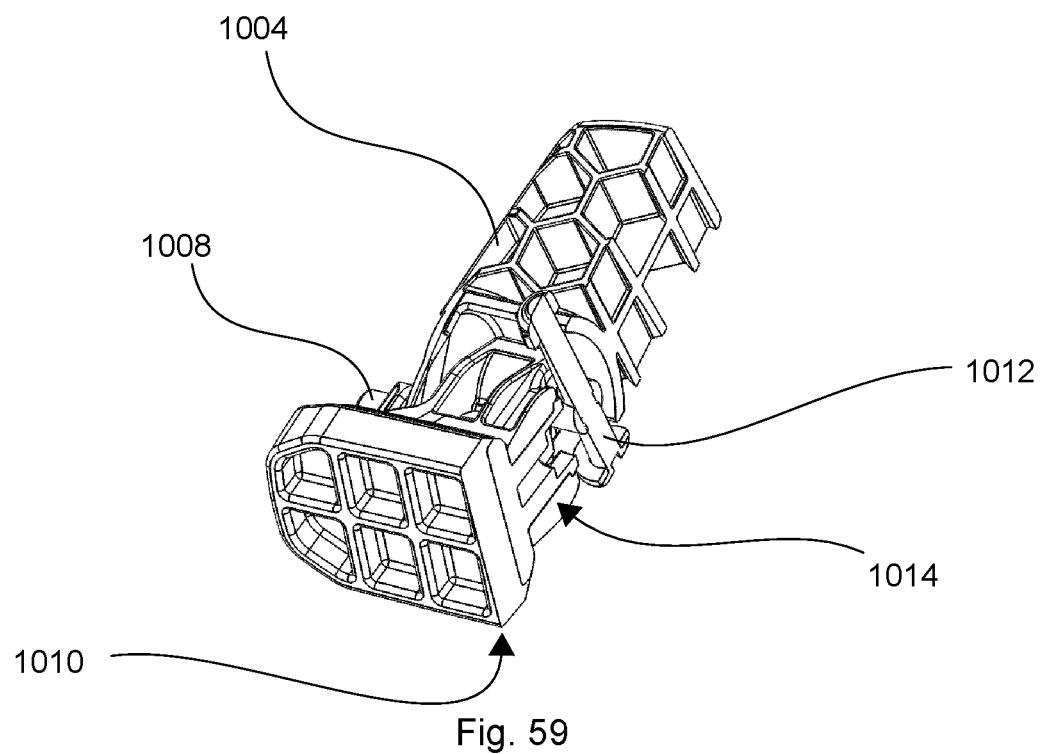
Figure 60:
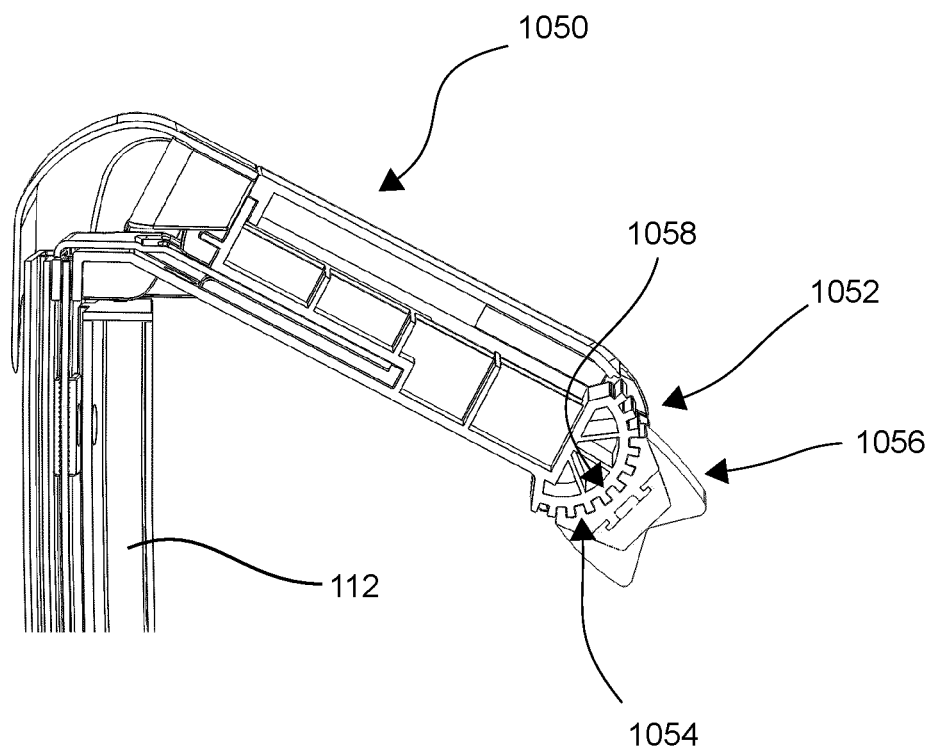
FIGS. 60 to 63 show modifications of a configuration of an upper vehicle support.

As already described before, load carriers 1 may be configured to carry goods to be transported, in particular bikes, in a hanging manner. Such a load carrier 1 is shown in FIGS. 5 and 6 and may optionally comprise the beneficial aspects, embodiments, and modifications as described herein. The load carrier 1 of FIGS. 5 and 6 in particular differs from the load carrier 1 as described with respect to FIGS. 1 to 4 in that the load support arrangement 200 is configured differently. The load support arrangement 200 comprises a supporting portion 250 having a supporting beam 252 which may also be referred to as limb for hanging bikes thereon. Each supporting beam 252 may be brought into a state in which it extends substantially in longitudinal direction of the vehicle when the load carrier 1 is mounted on the vehicle. An elongate member 254 and a receiver 256 are provided for securing goods to be transported on the supporting beam 252. The receiver 256 may be a pump buckle or a similar element for tightening an elongate member 254. The elongate member 254 may be a strap, preferably a toothed strap. An elongate member 254 and a receiver 256 are arranged on opposite lateral sides of a supporting beam 252. Furthermore, a supporting portion 258 in the form of an accommodating recess is provided on the supporting beam 252 in order to provide a defined supporting position. In the present configuration, the load carrier 1 comprises two supporting beams 252 which are arranged such that a frame of a bike may be hung on the supporting beams 252. Since during travel hanging bikes tend to sway in longitudinal direction of the vehicle due to acceleration and deceleration of the vehicle, it is beneficial to provide a configuration which prevents bikes from swaying and damaging portions of the vehicle or other bikes. Therefore, as shown in FIG. 6, the load carrier 1 may comprise an optional cross beam 901 which may be arranged such that it extends between lower vehicle supports 110 of the base frame 100. The cross beam 901 allows a fixation of an anti-sway device 900 which may also be referred to as spacer and serves for fixing portions of goods to be transported, in particular of bikes, such that swaying is prevented during movement of the vehicle. An anti-sway device 900 is shown in FIGS. 54 and 55. The anti-sway device 900 comprises a fixation portion 902 and a fixation portion 904. The fixation portions 902, 904 are configured to be mounted to a portion of the load to be transported, in particular a portion of a bike, and may also be coupled to the before described cross beam 901.

As shown in FIGS. 54 and 55, the fixation portions 902, 904 are coupled to each other by means of a first coupling portion 906 and a second coupling portion 908. The fixation portions 902, 904 each comprise a fixation member 910, 912 which is embodied as a flexible elongate member in a strap-like configuration. Each fixation member 910, 912 comprises openings 914, 916 configured to be engaged with receiving members 928, 938 provided on the first coupling portion 906 and the second coupling portion 908, respectively.

In this way, it is possible to form the fixation members 910, 912 into a loop allowing a fixation on a frame portion of a bike or on the cross beam 901. The fixation portion 902 and the fixation portion 904 may be configured identically. Each of the fixation portions 902, 904 may comprise a base portion 918, 920 configured insertable into a receiving portion 934 formed in the first coupling portion 906 and the second coupling portion 908. In order to fix the fixation portions 902, 904 to the respective coupling portions 906, 908, each fixation portion 902, 904 comprises an engaging member 922, 924 exemplary embodied as a loop portion to be engaged with a receiving member 926, 936 which are embodied as hooks on the first coupling portion 906 and the second coupling portion 908, respectively. The first coupling portion 906 further comprises an engaging portion 932 configured for a snap-in connection with a receiving portion 930 provided on the second coupling portion 908. The first coupling portion 906 and the second coupling portion 908 may be coupled coaxially and rotatably with respect to each other. In this way, the fixation portions 902, 904 may be twisted with respect to each other to provide a high flexibility in mounting the same on respective parts. Furthermore, the first coupling portion 906 may comprise an accommodating portion 940 embodied as a slot provided on the outer periphery of the first coupling portion 906 and configured for receiving a fixation strap for fixing the anti-sway device 900 to an element of the load carrier 1 for storing purposes.

FIGS. 56 to 59 show a possible configuration of an upper vehicle support 130 for the load carrier 1. In the shown configuration, the upper vehicle support is configured as a balancing upper vehicle support which is configured to automatically adapt to a contact portion on a vehicle on which the balancing upper vehicle support 1000 is to be supported. The balancing upper vehicle support 1000 comprises a contact member 1010 which is embodied as a support pad pivotably held movably about two pivot axes. The pivot axes extend such that they are skew to each other and in the present configuration extend substantially perpendicular and offset to each other. The balancing upper vehicle support 1000 comprises a first support member 1004 pivotably arranged about a pivot pin 1012 in a receiving portion 1002 and a second support member 1006 pivotably arranged on the first support member 1004 about a pivot pin 1008. The second support member 1006 is configured to support the contact member 1010. The contact member 1010 comprises an engaging portion 1014 configured to be engaged with an accommodating recess 1016 provided in the second support member 1006.

FIGS. 60 to 63 show a further possible configuration of an upper vehicle support 130 for the load carrier 1. The upper vehicle support 130 is configured as a fixed upper vehicle support 1050. The fixed upper vehicle support 1050 can be manually adjusted to the contact portion of the vehicle. The fixed upper vehicle support 1050 comprises a mounting portion 1052, 1060 configured to non-rotatably receive a contact member 1056. In the configuration shown in FIG. 60, the mounting portion 1052 is configured to slidably receive the contact member 1056 with a specific orientation with respect to an extension direction of the fixed upper vehicle support 1050, in particular with respect to an extension direction of a frame member being coupled to said cross beam 140 at one end portion and comprising the mounting portion 1052 at an opposite end portion. The mounting portion 1052 comprises a splined portion 1054 engageable with a splined portion 1058 of the contact member 1056 in an extension direction of splines.

Figure 61:
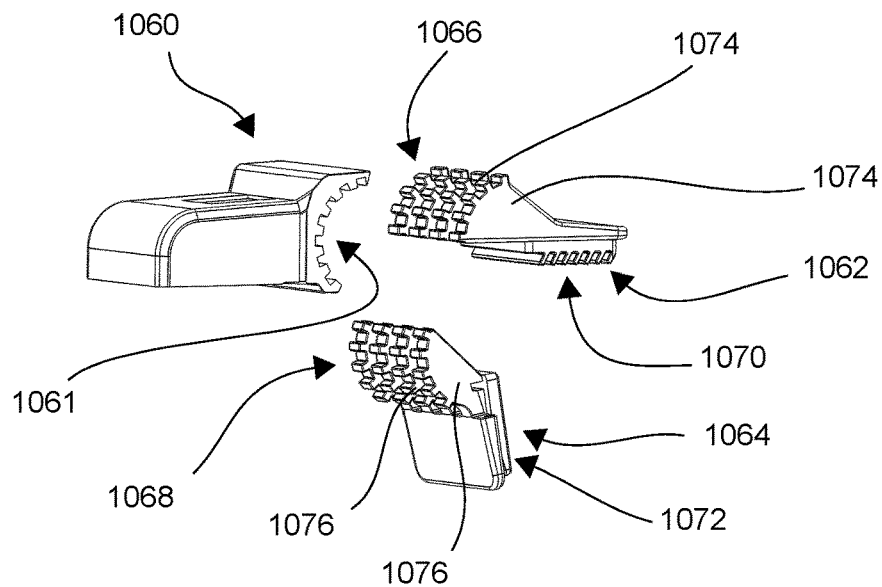
Figure 62:
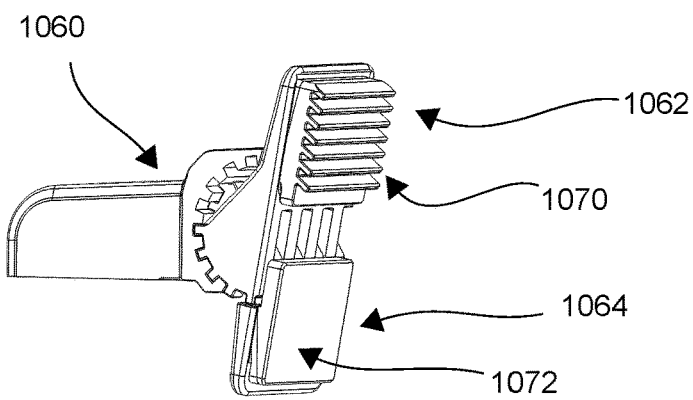
Figure 63:
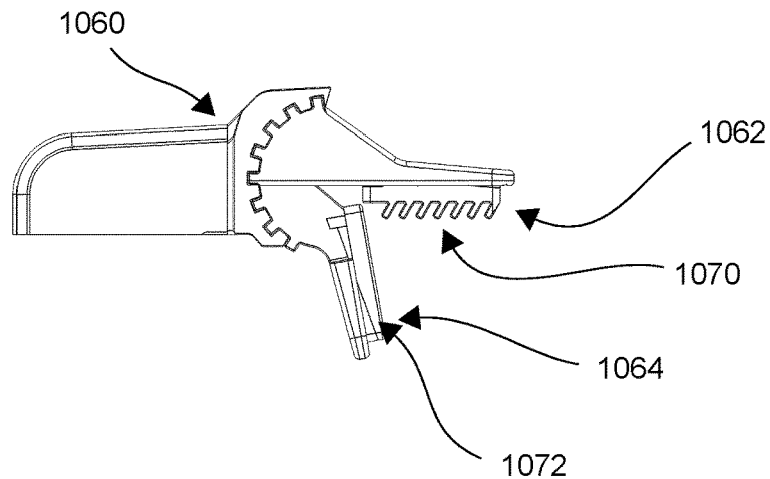

In the configuration as shown in FIGS. 61 to 63, the mounting portion comprises a concave splined portion 1061 with splines arranged in parallel to each other. The contact member is configured as a two-part contact member comprising a first contact member 1062 and a second contact member 1064. Each of the first contact member 1062 and the second contact member 1064 comprises an abutment portion 1070, 1072 and an engaging portion 1066, 1068. Each engaging portion comprises splined disk segments 1074, 1076 spaced from each other such that the engaging portions 1066, 1068 are nestable into each other at different angles to form a common engaging portion insertable into the mounting portion 1060. In this way, a variable contact member is provided which allows the user to adapt the same to a variety of different vehicle geometries. The abutment portions 1070, 1072 can be formed straight and can be arranged at different angles with respect to each other. FIG. 62 shows a configuration where the angle between the abutment portions 1070, 1072 is maximized. FIG. 63 shows a configuration where the angle is minimized.

Figure 64:
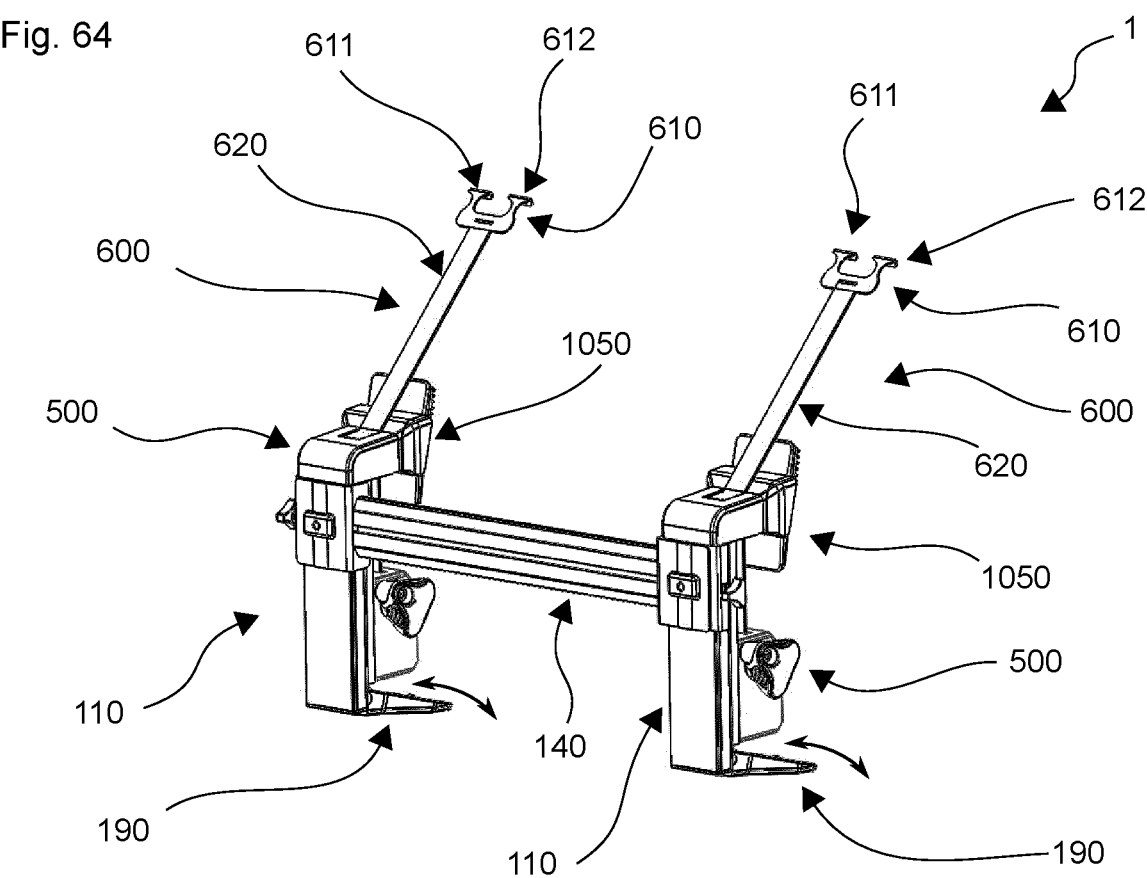
FIGS. 64 and 65 show perspective views of a modification of a base frame.
Figure 65:
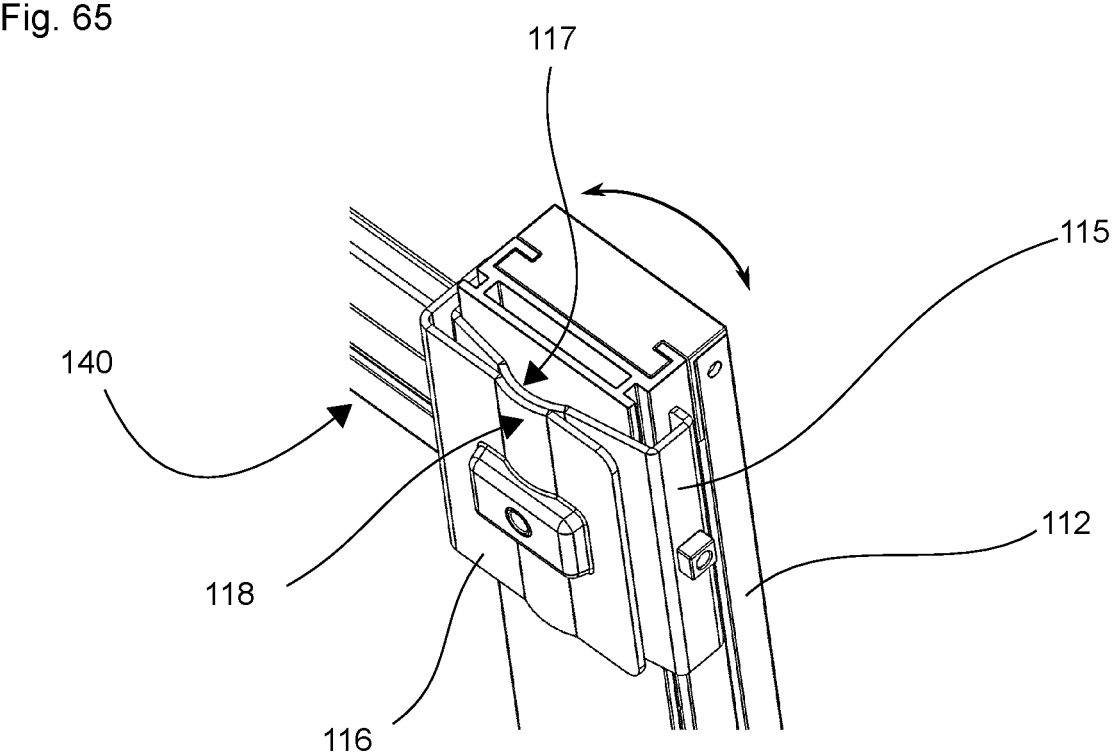

FIGS. 64 and 65 show a further possible configuration of a load carrier 1 in which the lower vehicle support portions 110 are held pivotably with respect to the cross beam 140 about a pivot axis which extends along a longitudinal extension direction of the lower vehicle support portions 110. The pivot axis is oriented substantially perpendicular to the longitudinal extension direction of the cross beam 140. In this way, the lower vehicle support portions 110 are rotatable at least about a certain angle in a manner indicated by double arrows in FIGS. 65 and 66. In this configuration, each upper portion 112 of the lower vehicle support portions 110 is held in a first pivot member 115 embodied as a bracket. The first pivot member 115 comprises a pivot portion 117 which is embodied as a portion forming a cylindrical contact surface. The first pivot member 115 is pivotably coupled to a second pivot member 116 fixedly mounted on the cross beam 140 and defining a second pivot portion 118 in the form of a partially cylindrical recess for accommodating the pivot portion 117 therein. The contact surface of the first pivot portion 117 is in sliding contact with a contact surface of the second pivot portion 118. In this way, the first pivot member 115 is slidably pivotably held by the second pivot member 116. It is noted that fixed upper vehicle supports 1050 may be provided on an upper end portion of the lower vehicle support portions 110 so that both, a lower coupling portion 190 and the upper vehicle supports 1050 may be pivoted integrally with the lower vehicle support portions 110.

In the following, different configurations of load carriers as described before are represented in itemized structure in addition to the subject matter of claim 1 and the dependent claims. It is to be noted that the below specific feature combinations are not intended to limit the disclosure to such specific feature combinations. By contrast, the below feature combinations merely provide different examples of load carriers having improved capabilities. Those capabilities may be suitably combined.

First Configuration

1. Load carrier (1) mountable on the rear of a vehicle, comprising a base frame (100) having a base frame member, preferably a cross beam (140), and a coupling portion (190) for supporting said load carrier on said vehicle, and an attachment portion (610) engageable with an engaging section on the rear of said vehicle, preferably with an engaging section on a trunk lid of said vehicle, wherein said attachment portion (610) is retractable for tightening said load carrier on the rear of the vehicle by means of a force transfer member (620), preferably a flexible elongate member (622), in particular a wire, wherein said load carrier (1) comprises a tightening mechanism (500) for retracting said attachment portion (610), said tightening mechanism (500) being configured to pull said force transfer member (620) into said base frame member with a pulling force acting at least partially along a longitudinal extension direction of said base frame member.

2. Load carrier (1) according to item 1, wherein said tightening mechanism (500) comprises a pulling device (518) operatively coupled to said force transfer member (620) so as to be able to exert said pulling force on said force transfer member (620), said pulling device (518) being preferably translatory movably held in said base frame member (140) and/or being preferably prebiased in a retraction direction by means of a biasing member, preferably by means of a spring (520) or rubber band, or by means of a biasing mechanism (540) comprising a spring biased spool (542) and a wire (544) coupled to said pulling device (518) at one end portion thereof and to said spring biased spool (542) at its other end portion thereof.

3. Load carrier according to item 2, wherein said tightening mechanism (500) comprises an actuator (530) movable towards and away from said pulling device (518) and contactable with said pulling device (518) to apply a tightening force on said pulling device (518).

4. Load carrier (1) according to item 3, wherein said tightening mechanism (500) comprises an operating member (502), preferably an operating knob, operatively coupled to said actuator (530) by means of a force transfer mechanism, said force transfer mechanism being preferably configured to transfer a movement of said operating member (502), preferably a rotational movement, into a translatory movement of said actuator (530).

5. Load carrier according to item 3 or 4, wherein said force transfer mechanism comprises a driving member (514), preferably a threaded rod (515), and said actuator (530) comprises a driven portion, preferably a threaded portion, drivingly engaged with said driving member.

6. Load carrier according to one of the preceding items, wherein said pulling device (518) comprises a pulley (524) for applying a pulling force on said force transfer member (620), wherein preferably said force transfer member (620) is coupled to said attachment portion (610) at a first end portion and is coupled to a further attachment portion at a second end portion and said pulling device (518) comprises a pulley (524) for applying a pulling force on said force transfer member (620) between said end portions.

7. Load carrier according to one of the preceding items, further comprising a deflection mechanism (524) for changing an extension direction of said force transfer member (620) to direct the same substantially in longitudinal extension direction of said base frame member (140) or to at least direct the force transfer member (620) to allow pulling the same by said pulling device (518), wherein said deflection mechanism preferably comprises a guiding recess (525, 527) or a pulley (529) for guiding said force transfer member (620).

8. Load carrier according to one of the preceding items, wherein said lower vehicle support portion (110) is coupled to said cross beam (140) at a first end portion (113) and supportable on said vehicle at a vehicle coupling portion (190) thereof, wherein said lower vehicle support portion (110) comprises an adjustment mechanism for adjusting a distance between said first end portion (113) and said vehicle coupling portion (190).

9. Load carrier according to one of items 1 to 7, comprising two force transfer members (620) and two tightening mechanisms (500), wherein preferably said force transfer members (620) protrude from said base frame member, preferably from said cross beam (140), on opposite end portions of said base frame member, wherein each tightening mechanism (500) is assigned to one force transfer member (620) and comprises an operating member, preferably a knob (502), provided on the same end portion of said base frame member where the force transfer member (620) to which the tightening mechanism (500) is assigned is located.

10. Load carrier according to one of the preceding claims, comprising two force transfer members and two tightening mechanisms, wherein preferably said force transfer members protrude from said base frame member, preferably from said cross beam, on opposite end portions of said base frame member, wherein each tightening mechanism is assigned to one force transfer member and comprises an operating member, preferably a knob, provided on the opposite end portion of said base frame member where the force transfer member (620) to which the tightening mechanism (500) is assigned is located.

Second Configuration

1. Load carrier (1) for a vehicle, comprising a supporting frame (202) and a load support, preferably a wheel support (210), rotatably supported on said supporting frame (202) about a pivot axis (204) between a use position and a non-use position, wherein said supporting frame (202) comprises an abutment portion (222) defining said use position and comprising an abutment surface (224) for contacting a mating contact surface (213) on said load support (210) when said load support (210) is in said use position, wherein said abutment surface (224) faces away from said pivot axis (204).

2. Load carrier (1) according to item 1, wherein said abutment surface (224) is at least partially convexly or concavely formed.

3. Load carrier (1) according to one of items 1 and 2, wherein said abutment surface (224) comprises a substantially flat section extending in a plane (225) which extends parallel to said pivot axis (204).

4. Load carrier (1) according to one of the preceding items, wherein said abutment portion (222) is formed on a coupling device (220) non-rotatably mounted on said supporting frame (202).

5. Load carrier (1) according to one of the preceding items, wherein a rotation of said wheel support (210) is guided by a cylindrically formed supporting portion (230) of said coupling device (220), said supporting portion (230) comprising a supporting surface (232) mating with a supporting surface (215) of a guiding portion (211) of said wheel support (210).

6. Load carrier (1) according to one of the preceding items, wherein said wheel support (210) comprises a latching portion (217) cooperating with a latching portion (226) of said coupling device (220) in said use position.

Third Configuration

1. Load carrier (1) mountable on the rear of a vehicle, comprising a base frame (100) having a cross beam (140) and a load support arrangement (200) hingedly coupled to said cross beam (140) at a mounting portion thereof by means of an adapter (420), wherein at least in said mounting portion said cross beam (140) comprises an outer peripheral contour which at least partially deviates from an imaginary circle (144), wherein said adapter (420) is mounted on said mounting portion (142) and defines an outer contour which at least partially compensates for said deviation of said outer peripheral contour from said imaginary circle (144) such that a rounded guiding contour for supporting said load support arrangement (200) on said mounting portion is provided.

2. Load carrier (1) according to item 1, wherein at least said mounting portion (140) of said cross beam (140) comprises an asymmetric cross section.

3. Load carrier (1) according to one of the preceding items, wherein in at least said mounting portion (142) said cross beam (140) comprises a supporting portion (146) defining an outer peripheral contour which follows said imaginary circle (144) and is suitable for rotatably supporting a holder (401) connectable to said load support arrangement (200) at a coupling portion (404), wherein said supporting portion (146) and an outer contour of said adapter (420) commonly define said rounded guiding contour for supporting said holder (401).

4. Load carrier (1) according to item 3, wherein said holder (401) comprises an engaging portion (405), preferably comprising at least one protrusion (406), configured to be releasably engaged with a corresponding engaging recess (128) formed on said cross beam (140) and/or with a corresponding engaging recess (426) formed on said supporting portion (146), wherein said engaging portion (405) and said engaging recesses (128, 426) are configured to be spline engaged.

5. Load carrier (1) according to item 4, wherein said holder (401) further comprises an operating member (407) operatively coupled to said engaging portion (405) for moving said engaging portion (405) between an engaging position in which said at least one protrusion (406) protrudes from an inner surface (409) of said holder (401) for an engagement with said engaging recess (128, 426) and a release position in which said at least one protrusion (406) is retracted and disengaged from said engaging recess (128, 426).

6. Load carrier (1) according to one of the preceding items, wherein at least said mounting portion comprises a partially polygonal shape.

Fourth Configuration

1. Load carrier (1) mountable on the rear of a vehicle, comprising a base frame (100) having a cross beam (140), at least one lower vehicle support portion (110) coupled to said cross beam (140) at a first end portion (113) and supportable on said vehicle at a vehicle coupling portion (190) thereof and an attachment device (600) having an engagement device (610) couplable to said vehicle so as to clamp said coupling portion (190) on said vehicle, wherein at least one of said coupling portion (190) and said engagement device (610) comprises two engaging portions (611, 612; 702, 704) arranged at a distance from each other and both coupled to an end portion (624) of a common force transfer member (620; 706).

2. Load carrier (1) according to item 1, wherein said engaging portions (611, 612) are formed in end portions of prongs (613, 614) of a fork-like arrangement.

3. Load carrier (1) according to one of the preceding items, wherein said two engaging portions (702, 704) are formed so as to be integrally movable.

4. Load carrier (1) according to item 3, wherein said two engaging portions (702, 704) are commonly movable about two pivot axes.

5. Load carrier (1) according to item 4, wherein said two engaging portions (702, 704) are fixed to or integrally formed on a coupling member with a recess (708) between the same so that each of the engaging portions (702, 704) comprises a separate contact surface (703, 705).

6. Load carrier (1) according to item 5, wherein said coupling member comprises a coupling portion (706), preferably a plate-like portion, pivotably mounted to a coupling section (722) about a first pivot (712) defining a pivot axis which preferably extends substantially perpendicular to an extension direction of said contact surfaces (703, 705), wherein preferably a pivoting movement of said coupling portion (706) about said pivot (712) is limited, preferably by means of a limiting protrusion or a limiting pin (714, 710) accommodated in a slot (716, 718) provided in said coupling section (722) and defining an end position of said limiting protrusion or limiting pin, wherein preferably said coupling section (722) is provided on a holder (720) comprising a coupling section (724) configured to couple said coupling mechanism (720) pivotable to a lower vehicle support (110), preferably by means of a coupling member (740), wherein preferably said holder (720) is pivotably coupled to said lower vehicle support (110), preferably a lower end portion of the lower vehicle support (110), about a second pivot (732) defining a pivot axis which is inclined with respect to said pivot axis defined by said first pivot (712), wherein a pivoting movement about said second pivot (732) is preferably limited, in particular by cooperation of a slot provided in said coupling section (724) and a limiting pin (730) held immovably with respect to said coupling section (724), preferably on a reinforcing bracket (734) to be coupled in a housing portion (742) of said coupling member (740).

7. Load carrier (1) according to one of the preceding items, wherein said two engaging portions are integrally formed, preferably by forming a metal sheet.

8. Load carrier according to one of items 1 to 6, wherein said two engaging portions are separately formed and connected to each other by means of a bridging portion, wherein each engaging portion is preferably pivotably coupled to said bridging portion.

Fifth Configuration

1. Spacer (800) for guiding a force transfer member (620) of a load carrier (1) around a damageable part of a vehicle, such as a spoiler, said spacer (800) being configured to support said force transfer member (620) on a contact portion of said vehicle, preferably of a rear door or trunk lid of a vehicle, at a predetermined distance from said contact portion such that said force transfer member (620) is guided to pass said damageable part in such a manner that a force applied on said damageable part remains below a predetermined force leading to a potential damage of said damageable part or in such a manner that said force transfer member (620) is completely out of contact with said damageable part.

2. Spacer (800) according to item 1, comprising a foot portion (802) configured to be brought into contact with said contact portion, preferably comprising a contact surface (804) from a soft material and/or being configured to correspond to the contour or shape of the contact portion, and a supporting portion (812) coupled to said foot portion (802) such that a distance between said supporting portion (812) and said foot portion is adjustable.

3. Spacer (800) according to item 2, wherein said foot portion (802) comprises a lower portion (806) and said supporting portion (812) is coupled to an upper portion (810), said upper portion (810) and said lower portion (806) being operatively coupled such that a rotation of the upper portion (810) relative to the lower portion (806) leads to a translatory movement of the supporting portion (812) relative to said foot portion (802).

4. Spacer (800) according to one of items 1 to 3, wherein said upper portion (810) and said supporting portion (812) are integrally formed.

5. Spacer (800) according to one of items 1 to 4, wherein said upper portion (810) is telescopably mounted on said lower portion (806), wherein preferably said upper portion (810) comprises an engaging portion (816), preferably a threaded portion, engaged with said lower portion (806), preferably engaged with a threaded inner surface (808) of said lower portion (806), said lower portion (806) preferably defining an accommodating portion for accommodating at least a portion of said upper portion (810).

6. Spacer (800) according to one of the preceding items, wherein said supporting portion (812) comprises a guiding portion (814), preferably a recess, for receiving a portion said force transfer member (620), said force transfer member (620) being couplable to said vehicle by means of an engagement device (610).

7. Load carrier system comprising a load carrier (1) mountable on a vehicle, in particular on the rear of a vehicle, said load carrier (1) being preferably configured according to one of the load carriers described above in the different aspects, embodiments and configurations and comprising an attachment device (600) with an engagement device (610) provided at an end portion of a force transfer member (620), said load carrier system further comprising a spacer (800) according to one of the preceding items for guiding said force transfer member (620) so as to pass a damageable part in such a manner that a force applied on said damageable part remains below a predetermined force leading to a potential damage of said damageable part or in such a manner that said force transfer member (620) is completely out of contact with said damageable part.

Sixth Configuration

1. Anti-sway device (900) mountable on frame element of a load carrier (1), in particular on a cross beam (901) of a load carrier (1), and a bike portion or on portions of two bikes, said anti-sway device (900) comprising two fixation portions (902, 904) and a first coupling portion (906) and a second coupling portion (908) each coupling portion (906, 908) being configured to non-rotatably receive one of said two fixation portions (902, 904) at a first end portion and to be rotatably coupled to the other coupling portion (906, 908) at a second end portion so that said fixation portions (906, 908) can be rotatably coupled to each other by means of said coupling portions (906, 908), preferably coaxially and rotatably with respect to each other.

2. Anti-sway device (900) according to item 1, wherein said two fixation portions (902, 904) are identically configured.

3. Anti-sway device (900) according to one of items 1 and 2, wherein at least one fixation portion (902, 904) comprises a fixation member (910, 912), preferably a flexible elongate member, for example a strap, in particular an elastic elongate member, formable into a loop and engageable with a receiving member (928, 938) provided on the first coupling portion (906) or the second coupling portion (908), wherein each flexible elongate member comprises openings (914, 916) configured to be engaged with one of the receiving members (928, 938), wherein said receiving members (928, 938) are preferably configured as hooks.

4. Anti-sway device (900) according to one of the preceding items, wherein each fixation portion (902, 904) comprises an engaging member (922, 924), preferably a loop portion, configured to be engaged with a receiving member (926, 936), preferably a hook, on one of the coupling portions (906, 908).

5. Anti-sway device (900) according to one of the preceding items, wherein one of said coupling portions (906, 908) comprises an engaging portion (932) configured for a snap-in connection with a receiving portion (930) provided in the other coupling portion.

6. Anti-sway device (900) according to one of the preceding claims, wherein one of said coupling portions (902, 904) comprises an accommodating portion (940), preferably embodied as a slot, provided on an outer periphery thereof and configured for receiving a fixation element, preferably a strap, for fixing the anti-sway device (900) to an element of a load carrier (1) for storing purposes.

7. Load carrier system comprising a load carrier (1) mountable on a vehicle, in particular on the rear of a vehicle, said load carrier (1) being preferably configured according to one of the load carriers for hanging transport of at least one bike as described above in different aspects, embodiments and configurations and comprising an anti-sway device (900) according to one of the preceding items, said load carrier (1) preferably comprising a cross beam (901) for coupling one of said fixation portions thereto and wherein said other fixation portion is available to be coupled to a bike element for fixing said bike element relative to said load carrier (1).

The invention claimed is:

1. A load carrier mountable on a rear of a vehicle, comprising:
a base frame comprising:
a cross beam,
at least one lower vehicle support portion, and
at least one upper vehicle support portion;
an attachment device; and
a tightening mechanism for retracting the attachment device,
wherein the at least one lower vehicle support portion is configured to support the cross beam against the vehicle,
wherein the attachment device is configured for coupling the load carrier to an upper portion of the vehicle,
wherein the at least one lower vehicle support portion is length adjustable, and
wherein the at least one upper vehicle support portion is configured to support the base frame on a portion of the vehicle being located above a portion which is contacted by the at least one lower vehicle support portion and below the upper portion of the vehicle to which the attachment device is coupled.

2. The load carrier according to claim 1, wherein the at least one lower vehicle support portion is coupled to the cross beam at a first end portion and supportable on the vehicle at a vehicle coupling portion thereof, and wherein the load carrier further comprises an adjustment mechanism for adjusting a distance between the first end portion and the vehicle coupling portion.

3. The load carrier according to claim 1, wherein the attachment device comprises:
an engagement device configured to engage an upper portion on a trunk lid of the vehicle; and
a force transfer member coupled to the engagement device at a first end and coupled to the tightening mechanism at a second end.

4. The load carrier according to claim 3, wherein the force transfer member comprises a wire or a strap, and wherein the engagement device is a hook.

5. The load carrier according to claim 1, wherein the at least one lower vehicle support portion comprises a vehicle coupling portion configured to support the load carrier on a lower edge region of a trunk lid of the vehicle.

6. The load carrier according to claim 1, wherein a length of the at least one upper vehicle support portion is shorter than a length of the at least one lower vehicle support portion, and wherein the at least one upper vehicle support portion is inclined with respect to a vertical plane, when the load carrier is mounted on the vehicle, at an inclination which is greater than an inclination of the at least one lower vehicle support portion with respect to the vertical plane.

7. A load carrier mountable on a rear of a vehicle, comprising:
a base frame comprising a cross beam having a mounting portion;
an adapter mounted on the mounting portion of the cross beam; and
a load support arrangement hingedly coupled to the cross beam at the mounting portion by the adapter,
wherein the mounting portion of the cross beam has an outer peripheral contour which at least partially deviates from a circular shape, and
wherein the adapter defines an outer contour which at least partially compensates for the deviation of the outer peripheral contour from the circular shape, such that a rounded guiding contour for supporting the load support arrangement on the mounting portion is provided.

8. The load carrier according to claim 7, wherein the mounting portion of the cross beam comprises an asymmetric cross section.

9. The load carrier according to claim 8, wherein the mounting portion of the cross beam comprises a supporting portion defining an outer peripheral contour which follows the circular shape and is configured to rotatably support a holder connectable to the load support arrangement at a coupling portion, and wherein the supporting portion and the outer contour of the adapter commonly define the rounded guiding contour for supporting the holder.

10. The load carrier according to claim 9, wherein the holder comprises an engaging portion configured to be releasably engaged with a corresponding engaging recess formed on the cross beam or with a corresponding engaging recess formed on the supporting portion, and wherein the engaging portion and the engaging recess are configured to be spline engaged.

11. The load carrier according to claim 10, wherein the holder further comprises an operating member operatively coupled to the engaging portion for moving the engaging portion between an engaging position in which the engaging portion protrudes from an inner surface of the holder for an engagement with the engaging recess and a release position in which the engaging portion is retracted and disengaged from the engaging recess.

12. The load carrier according to claim 7, wherein the mounting portion comprises a partially polygonal shape.

13. A load carrier mountable on a rear of a vehicle, comprising:
a base frame comprising:
a cross beam;
at least one lower vehicle support portion coupled to the cross beam at a first end portion and configured to be supported on the vehicle at a vehicle coupling portion; and
an upper vehicle support portion configured to support the base frame on the vehicle at a position above the vehicle coupling portion,
wherein the at least one lower vehicle support portion comprises an adjustment mechanism configured to adjust a distance between the first end portion and the vehicle coupling portion, and
wherein the upper vehicle support portion is non-pivotably fixed to the at least one lower vehicle support portion at a specific angle.

14. The load carrier according to claim 13, wherein the at least one lower vehicle support portion is non-translatory movably coupled to the cross beam and non-rotatably movably coupled to the cross beam.

15. The load carrier according to claim 14, wherein the upper vehicle support portion is fixedly mounted to the at least one lower vehicle support portion and inclined with respect to the at least one lower vehicle support portion so that the cross beam is located at an uppermost portion of the base frame when the load carrier is mounted on the vehicle.

16. The load carrier according to claim 15, wherein the at least one lower vehicle support portion is configured as an elongated unit extending in a straight manner.

17. The load carrier according to claim 13, further comprising a connecting member, which couples the upper vehicle support portion, the at least one lower vehicle support portion, and the cross beam to each other, wherein the connecting member is formed such that the at least one lower vehicle support portion and the upper vehicle support portion extend from a same point at an angle smaller than 90 degrees.

18. The load carrier according to claim 17, wherein the connecting member comprises a first accommodating section configured to accommodate the first end portion of the at least one lower vehicle support portion and a second accommodating section configured to accommodate an end portion of the cross beam, and wherein the first end portion of the at least one lower vehicle support portion and the cross beam are fixed to the connecting member.

19. The load carrier according to claim 17, wherein the connecting member is integrally formed from a plastic material.

20. The load carrier according to claim 13, wherein the adjustment mechanism comprises a locking mechanism configured to releasably arrest the vehicle coupling portion relative to the first end portion, and wherein the locking mechanism is configured to lock a movement of the vehicle coupling portion relative to the first end portion.

21. The load carrier according to claim 20, wherein the at least one lower vehicle support portion comprises an upper portion and a lower portion, wherein the locking mechanism comprises an engaging member movably coupled to the upper portion and an engagement section provided on the lower portion, and wherein the engaging member is rotatably coupled to the upper portion.

22. The load carrier according to claim 21, wherein the locking mechanism comprises a pivotable operating member which is pivotable about a pivot axis extending parallel with, diagonal, or transversal to an extension direction of the at least one lower vehicle support portion.

23. The load carrier according to claim 20, further comprising a tightening mechanism configured to retract an attachment device, wherein the attachment device is configured to couple the load carrier to an upper portion of the vehicle, and wherein the tightening mechanism and the locking mechanism are configured as independent mechanisms so that both mechanisms are configured to be operated independently from each other to allow tightening and locking as separate steps.

24. The load carrier according to claim 13, wherein a length of the upper vehicle support portion is shorter than a length of the at least one lower vehicle support portion.

25. The load carrier according to claim 13, wherein the upper vehicle support portion is inclined with respect to a vertical plane when the load carrier is mounted on the vehicle at an inclination which is greater than an inclination of the at least one lower vehicle support portion.

26. The load carrier according to claim 13, wherein the upper vehicle support automatically adapts to a contact portion on the vehicle on which the upper vehicle support is to be supported.

27. The load carrier according to claim 26, wherein the upper vehicle support comprises a contact that is pivotable about two pivot axes.

\* \* \* \* \*